United States Patent [19]
Hwang

[11] Patent Number: 5,822,689
[45] Date of Patent: Oct. 13, 1998

[54] CIRCUIT AND METHOD USING DATA SYNCHRONIZATION FOR BATTERY POWER CONSERVATION IN A PAGING RECEIVER

[75] Inventor: Seon-Woong Hwang, Kyungsangnam-do, Rep. of Korea

[73] Assignee: SamSung Electronics Co., Ltd., Kyungki-do, Rep. of Korea

[21] Appl. No.: 544,801

[22] Filed: Oct. 18, 1995

[30] Foreign Application Priority Data

Oct. 19, 1994 [KR] Rep. of Korea ................. 1994-26760

[51] Int. Cl.$^6$ ...................................................... H04B 1/16
[52] U.S. Cl. ............... 455/343; 340/825.14; 340/825.44; 340/825.2
[58] Field of Search ................... 455/38.3, 57.1, 455/343, 89, 127, 228, 574; 340/825.44, 311.1, 825.14, 825.2

[56] References Cited

U.S. PATENT DOCUMENTS

| | | | |
|---|---|---|---|
| 4,663,623 | 5/1987 | Lax et al. ................................. | 455/343 |
| 4,961,073 | 10/1990 | Ddrapac et al. . | |
| 5,144,296 | 9/1992 | DeLuca et al. ......................... | 455/343 |
| 5,230,084 | 7/1993 | Nguyen . | |
| 5,233,344 | 8/1993 | Ohga . | |
| 5,251,325 | 10/1993 | Davis et al. . | |
| 5,274,843 | 12/1993 | Murai et al. . | |
| 5,296,849 | 3/1994 | Ide . | |
| 5,303,420 | 4/1994 | Jang ......................................... | 455/343 |
| 5,376,929 | 12/1994 | Rakalta et al. . | |
| 5,376,975 | 12/1994 | Romero et al. . | |
| 5,381,133 | 1/1995 | Erhart et al. . | |
| 5,382,949 | 1/1995 | Mock et al. . | |
| 5,384,564 | 1/1995 | Wycoff et al. . | |
| 5,392,457 | 2/1995 | Davis et al. . | |
| 5,459,457 | 10/1995 | Sharpe .................................. | 455/38.3 |
| 5,475,877 | 12/1995 | Adachi ................................... | 455/343 |

*Primary Examiner*—Edward F. Urban
*Attorney, Agent, or Firm*—Robert E. Bushnell, Esq.

[57] ABSTRACT

A battery saving circuit in a paging receiver operates in an idle mode and a batch mode. A power supply section generates operating power for the paging receiver. A receiving section receives paging information and converts the paging information into digital signals. A switching section provides operating power to the receiving section in response to a battery supply signal. A wordsync pattern detector connected to the receiving section detects wordsync periods during the batch mode, analyzes digital signals received at a starting interval of the wordsync period, and generates a wordsync pattern detection signal when wordsync pattern data is detected. The wordsync pattern data is made up of a predetermined number of bits within the digital signals received during the starting interval of the wordsync period. Operating power is provided during the starting interval of the wordsync period and is interrupted when the wordsync pattern detection signal is generated. Data received after the wordsync period is synchronized based on an ending position of the wordsync period.

26 Claims, 30 Drawing Sheets

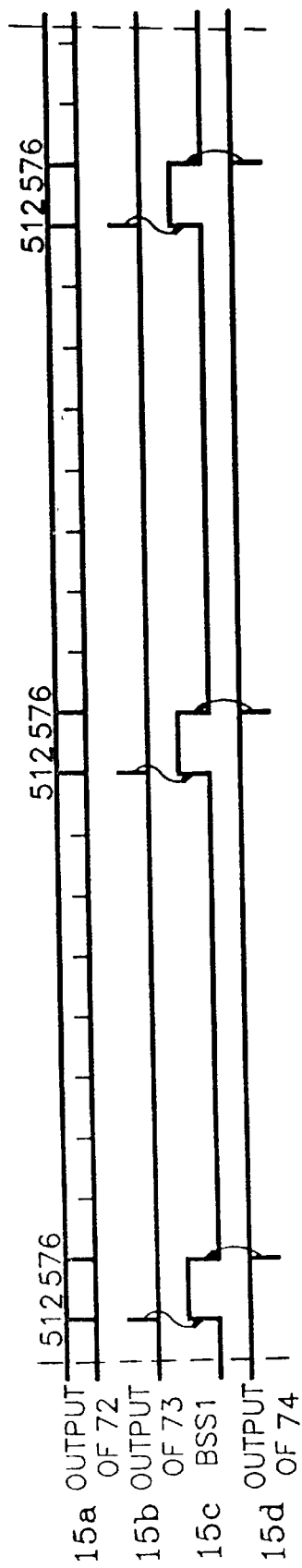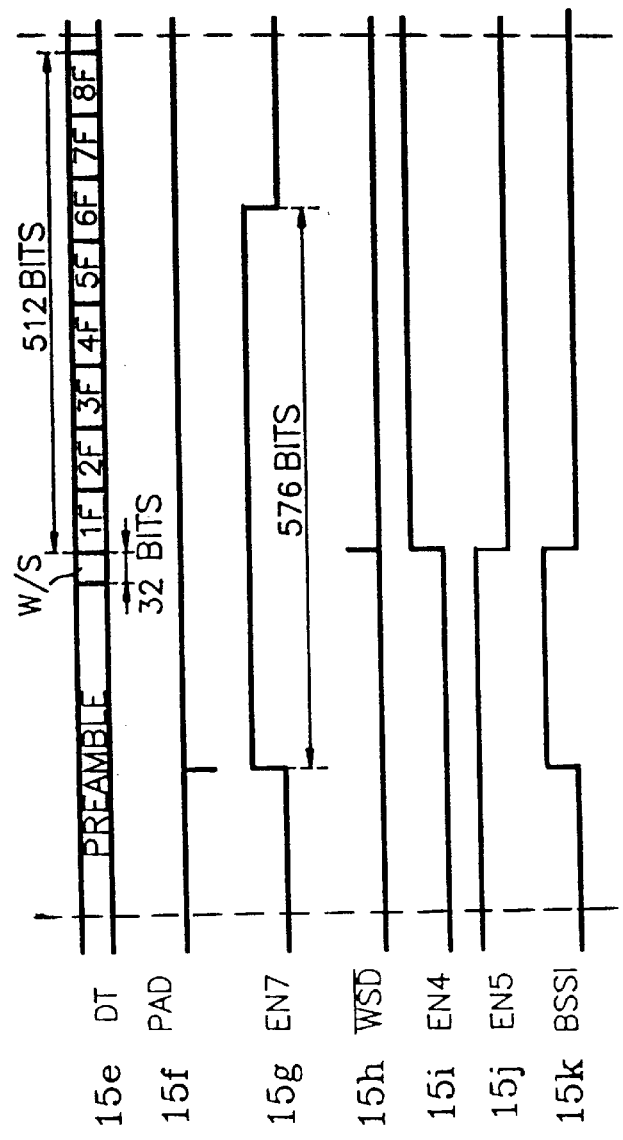
FIG. 15A
FIG. 15B

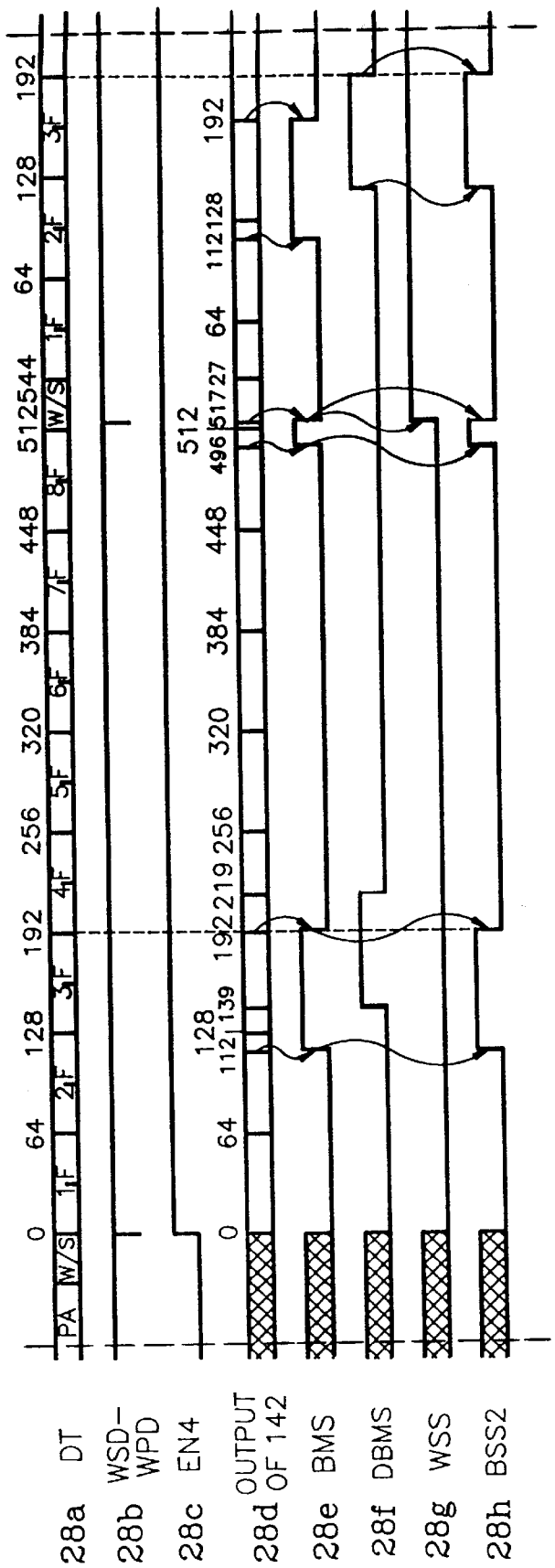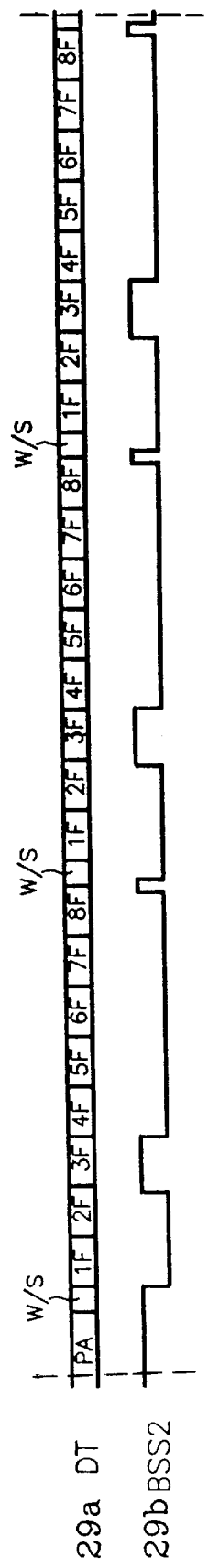
FIG. 28
FIG. 29

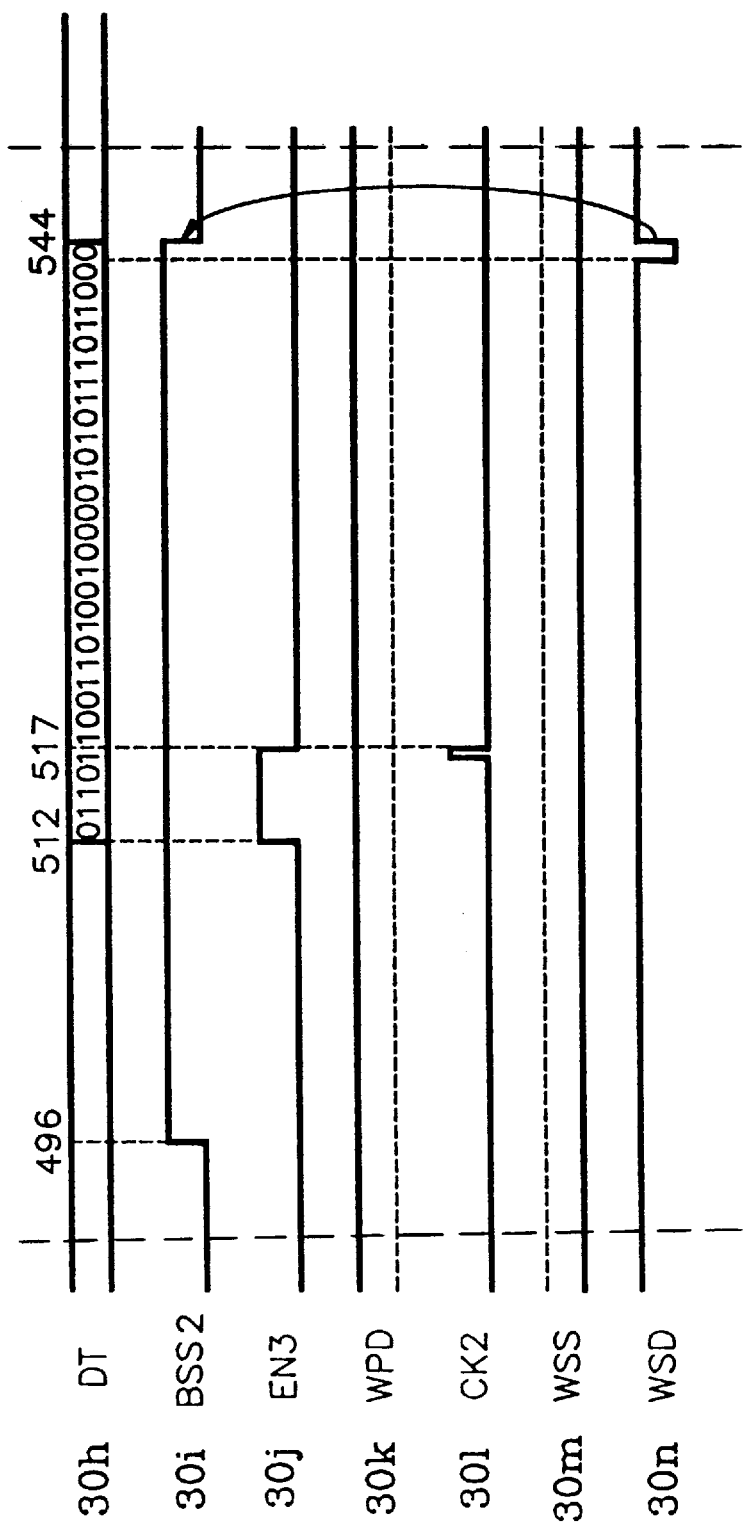

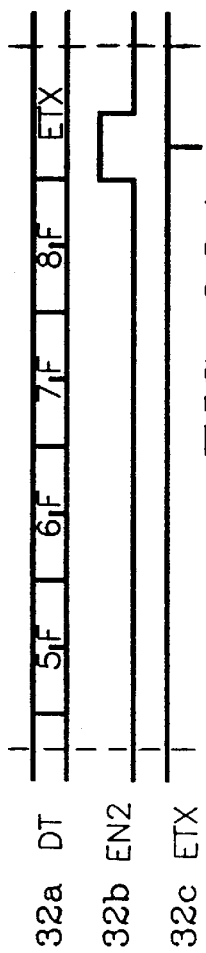
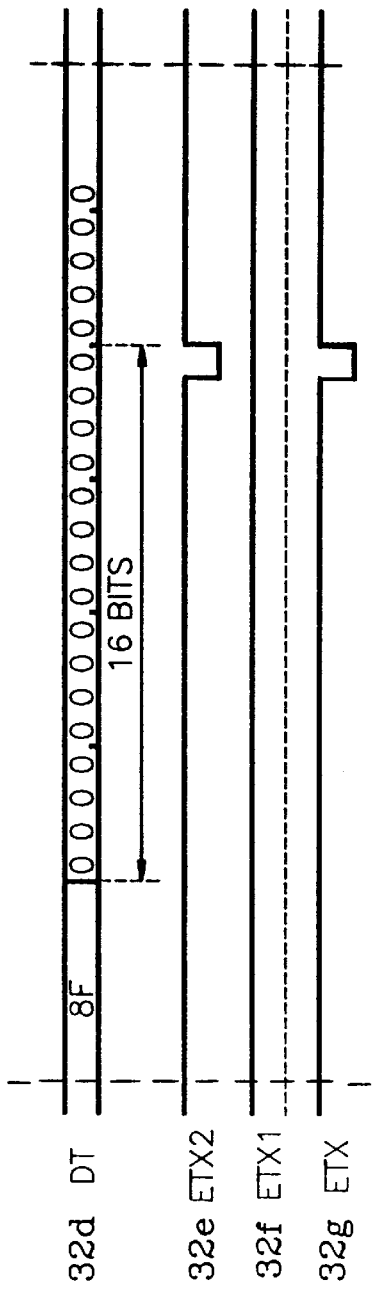
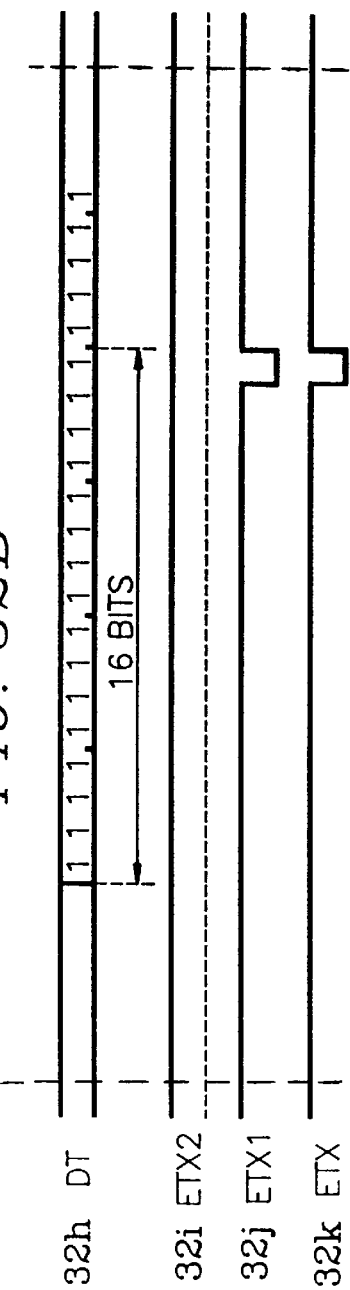
FIG. 32A
FIG. 32B
FIG. 32C

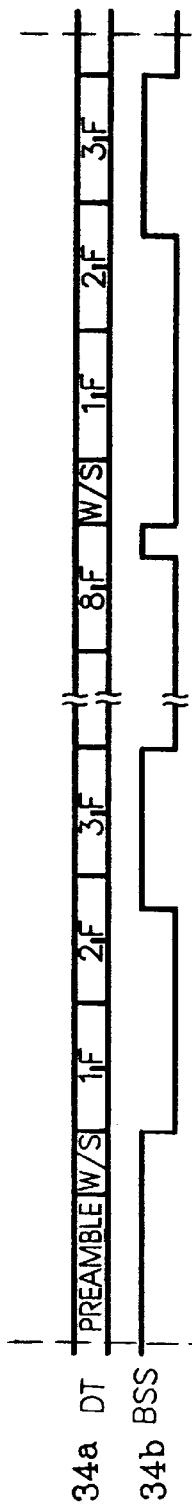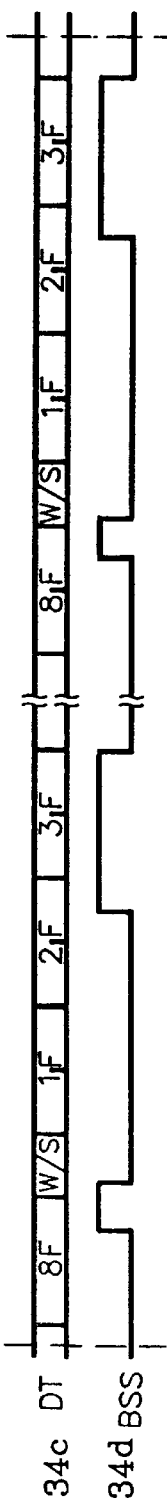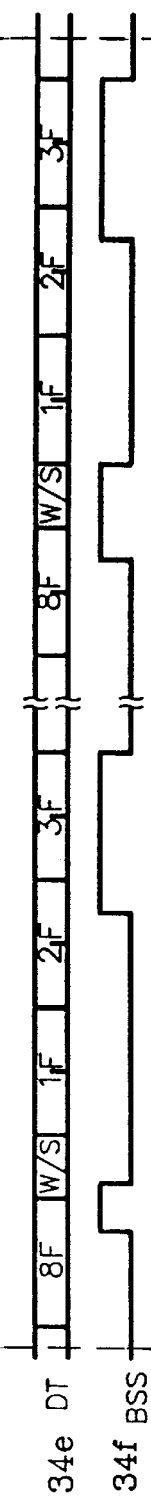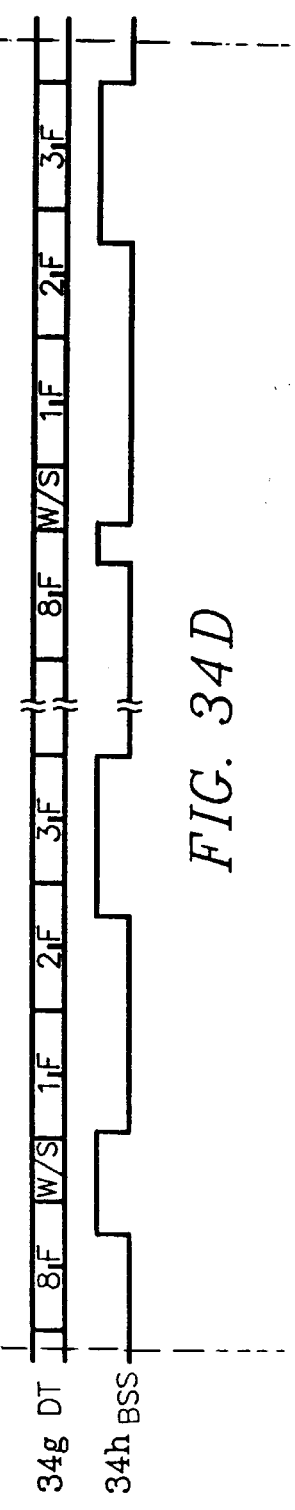
FIG. 34A
FIG. 34B
FIG. 34C
FIG. 34D

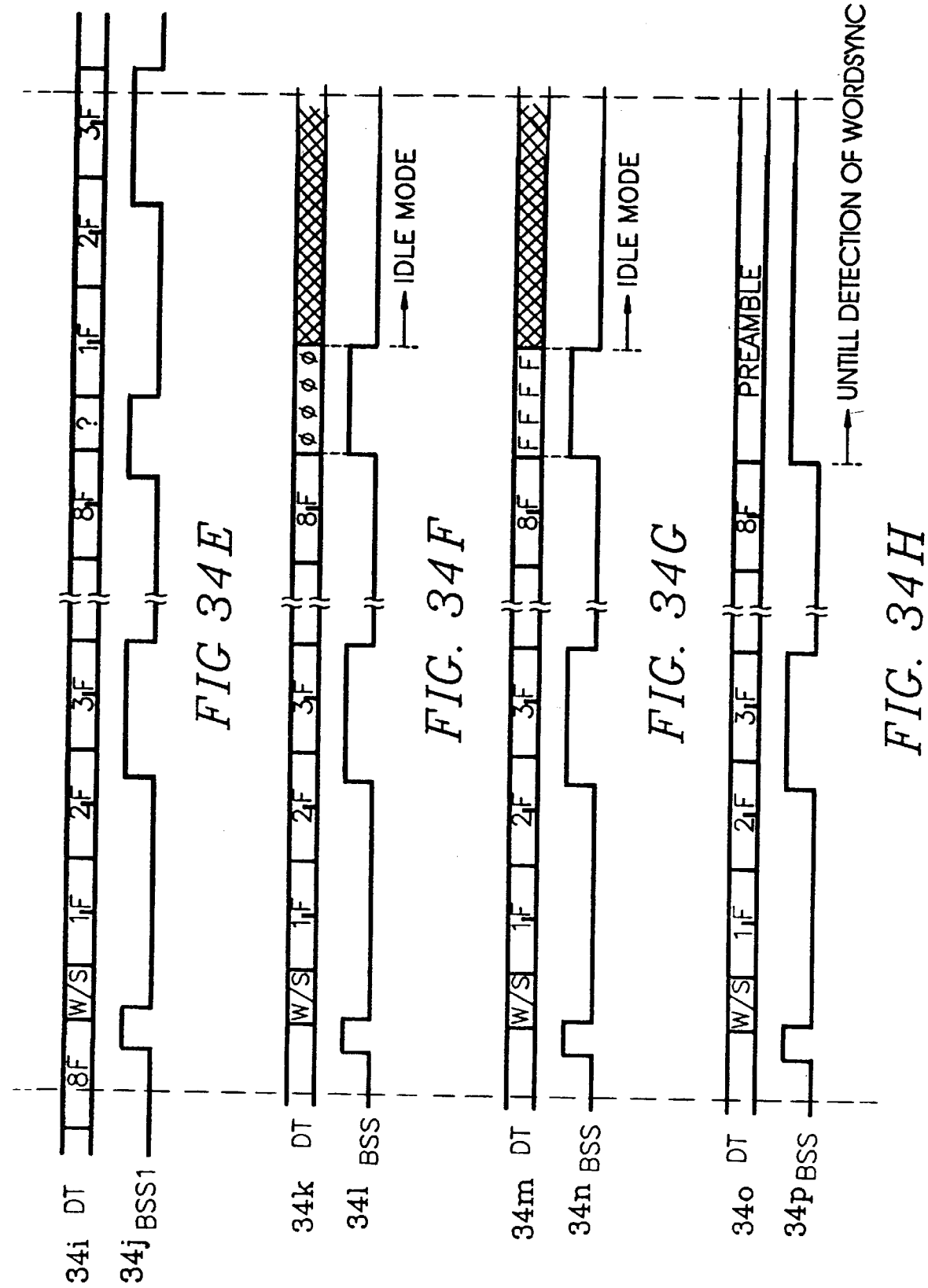

CIRCUIT AND METHOD USING DATA SYNCHRONIZATION FOR BATTERY POWER CONSERVATION IN A PAGING RECEIVER

CROSS-REFERENCE TO RELATED APPLICATIONS

This application makes reference to, incorporates the same herein, and claims all benefits accruing under 35 U.S.C. §119 from an application for Battery Saving Circuit And Method In A Paging Receiver earlier filed in the Korean Industrial Property Office on 19 Oct. 1994 and there assigned Ser. No. 26760/1994.

BACKGROUND OF THE INVENTION

The present invention relates to a battery saving circuit in a paging receiver and a method for reducing battery usage therein, and more particularly, to a battery saving circuit and a method for conserving battery power in a paging receiver while executing a batch mode.

In general, a paging receiver receives and analyzes paging information having a specific pattern or format, and if the paging information corresponds to the particular paging receiver, an alerting operation for informing a user of the information is executed. Preferably, paging receivers are designed to include low energy consuming components. However, to achieve desired performance results, paging receivers typically employ high energy consuming components. Accordingly, it desirable to selectively provide operating power to the components of the paging receiver. This practice is often called battery saving.

One prior art reference that employs a battery saving technique is disclosed in U.S. Pat. No. 5,376,975 entitled Method And Apparatus For Preamble Battery Saving In Selective Call Receivers issued to Romero et al. on 27 Dec. 1994. In Romero et al. '975, a preamble detector detects a preamble signal that accompanies a Post Office Code Standardization Advisory Group (POCSAG). A battery saving circuit selectively activates and deactivates receiver circuitry while the preamble signal is being received. Since the preamble signal is commonly known to occupy 576 bits, this battery saving technique is able to provide a modicum of power conservation. I note, however, that conventional art, such as Romero et al. '975, fails to provide sufficient power conservation during the reception of data which follows the preamble signal. Accordingly, I believe that a battery saving feature for a paging receiver can be implemented to provide an even greater degree of power conservation.

SUMMARY OF THE INVENTION

It is therefore an object of the present invention to provide an improved battery saving circuit and method for a paging receiver.

It is another object to provide a battery saving circuit and method for a paging receiver in which, when wordsync pattern data comprised of a predetermined number of initial bits of wordsync data is detected during a wordsync period, power is interrupted during a remaining portion of the wordsync period, and synchronization is achieved based on a known ending point of the wordsync period, thereby providing a high degree of power saving efficiency.

It is still another object to provide a battery saving circuit and method in a paging receiver in which, when wordsync pattern data comprised of a predetermined number of initial bits of wordsync data is not detected during a wordsync period, power is maintained throughout the wordsync period, and synchronization is achieved based on the ending point of the wordsync period, thereby providing a high degree of power saving efficiency.

It is still yet another object to provide a battery saving circuit and method in a paging receiver in which, when an allowable number of error bits are detected during a wordsync period, power is maintained throughout the wordsync period and synchronization is achieved based on the ending point of the wordsync period.

It is a further object to provide a battery saving circuit and method in a paging receiver in which, even though wordsync data is not detected during a wordsync period, power is maintained throughout the wordsync period and synchronization is achieved based on the ending point of the wordsync period.

It is still a further object to provide a battery saving circuit and method in a paging receiver in which, when wordsync data is not detected during a wordsync period in a batch mode, preamble data is detected and the batch mode is continuously performed.

It is yet a further object to provide a battery saving circuit and method in a paging receiver in which, when wordsync data is not detected during a wordsync period in a batch mode, data indicating an end of transmission is detected, the batch mode is terminated and an idle mode is executed.

To achieve these and other objects, the present invention provides a novel battery saving circuit and method for a paging receiver. A controller generates various enable signals necessary for controlling the supply of operating power in the paging receiver. A preamble detector detects received data and generates a preamble detection signal when a preamble signal is detected. A wordsync detector analyzes the received data and generates a wordsync detection signal when wordsync data is detected. A pattern detector analyzes the received data and generates a wordsync pattern detection signal when wordsync pattern data is detected. A batch mode executing unit counts the number of batch mode periods, and is initialized in response to the wordsync detection signal or the wordsync pattern detection signal. An idle mode executing unit enables an idle mode to be executed in response to a signal indicating the end of data transmission, and disables the idle mode in accordance with the preamble detection signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIGS. 15A and 15B are charts showing timing characteristics of the idle mode executing unit shown in FIG. 14;

FIG. 28 is a chart showing timing characteristics of controlling the battery supply in the batch mode according to the principles of the present invention;

FIG. 29 is a chart showing timing characteristics of the second battery supply signal during the batch mode according to the principles of the present invention;

FIGS. 30A and 30B are charts showing timing characteristics of detecting the wordsync data according to the principles of the present invention. FIG. 30A shows the operation of detecting the wordsync data upon receiving normal wordsync data, and FIG. 30B shows the operation of detecting the wordsync data when the received wordsync data contains the allowable number of error bits;

FIG. 32A is a chart showing timing characteristics of the transmission-terminating detector shown in FIG. 31;

FIG. 32B is a chart showing timing characteristics of operations upon receiving the transmission-terminating data in a first manner;

FIG. 32C is a chart showing timing characteristics of operations upon receiving the transmission-terminating data in a second manner;

FIGS. 34A to 34H are charts showing timing characteristics of controlling the battery supply signal in accordance with the state of data received during the wordsync period in the paging receiver constructed according to the principles of the present invention.

DETAILED DESCRIPTION OF THE PREFERRED EMBODIMENTS

Figure 1:
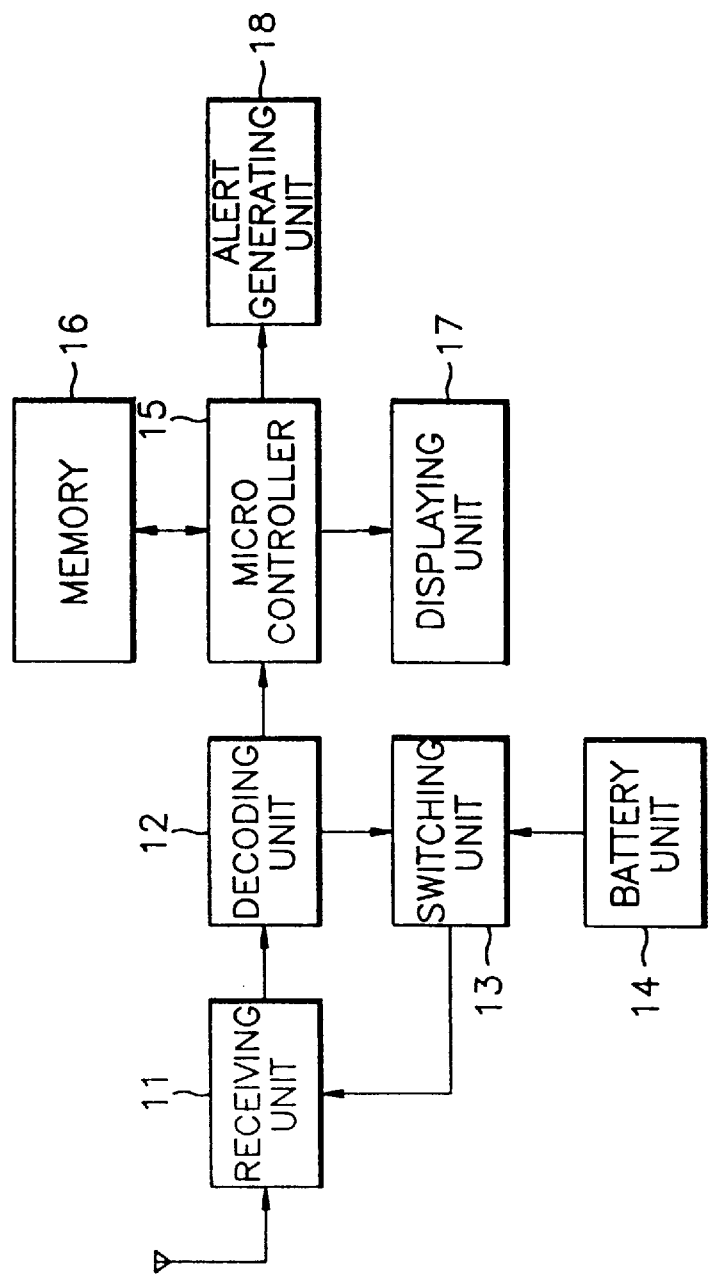
FIG. 1 is a block diagram showing a general configuration of a paging receiver.

Turning now to the drawings and referring to FIG. 1, a block diagram showing a general configuration of a paging receiver is illustrated. In FIG. 1, the paging receiver includes a receiving unit 11, a decoding unit 12, a switching unit 13, a battery unit 14, a memory 16, a microcontroller 15, a displaying unit 17, and an alert generating unit 18. Receiving unit 11 receives paging information and performs frequency conversion, demodulation, and waveform shaping operations on the paging information. That is, receiving unit 11 provides the paging information, which is converted into digital data, to decoding unit 12. Decoding unit 12 decodes the received data and sets an operational mode of the paging receiver. In other words, decoding unit 12 controls the supply of operational power according to a constant time period in order to detect preamble data during an idle mode, and to detect wordsync data and established frame data during a batch mode. Decoding unit 12 decodes the detected frame data and performs a data conversion operation. Microcontroller 15 processes the received data and controls the alerting operation. Alert generating unit 18 generates an alert signal, for example, a tone signal or a vibration signal, for informing the user of his called state in response to an alert control signal output from microcontroller 15. Displaying unit 17 displays a message from a calling party and information regarding the operational state of the paging receiver in response to a display control signal output from microcontroller 15. Memory 16 stores inherent address information and frame information assigned to the paging receiver.

With the paging receiver described above, an increase in battery saving efficiency is desired since a battery mounted within the paging receiver is used to provide operational power. It is therefore widely known that paging receivers often have a battery saving mode for prolonging the lifetime of the battery. In FIG. 1, battery unit 14 can be a battery. Switching unit 13 is switched in accordance with a battery supply signal provided from decoding unit 12 and controls the electrical connection between battery unit 14 and receiving unit 11. Receiving unit 11 is composed of analog elements, thereby causing the paging receiver to consume large quantities of power. It is therefore appreciated that if the supply of power to receiving unit 15 is controlled in a proper manner, high power saving efficiency can be achieved.

Formats of the Post Office Code Standardization Advisory Group (POCSAG) code will now be given with reference to FIGS. 2A to 2E, prior to explaining the battery saving method in a conventional paging receiver. It is noted that the present invention utilizes the POCSAG format.

Figure 2:
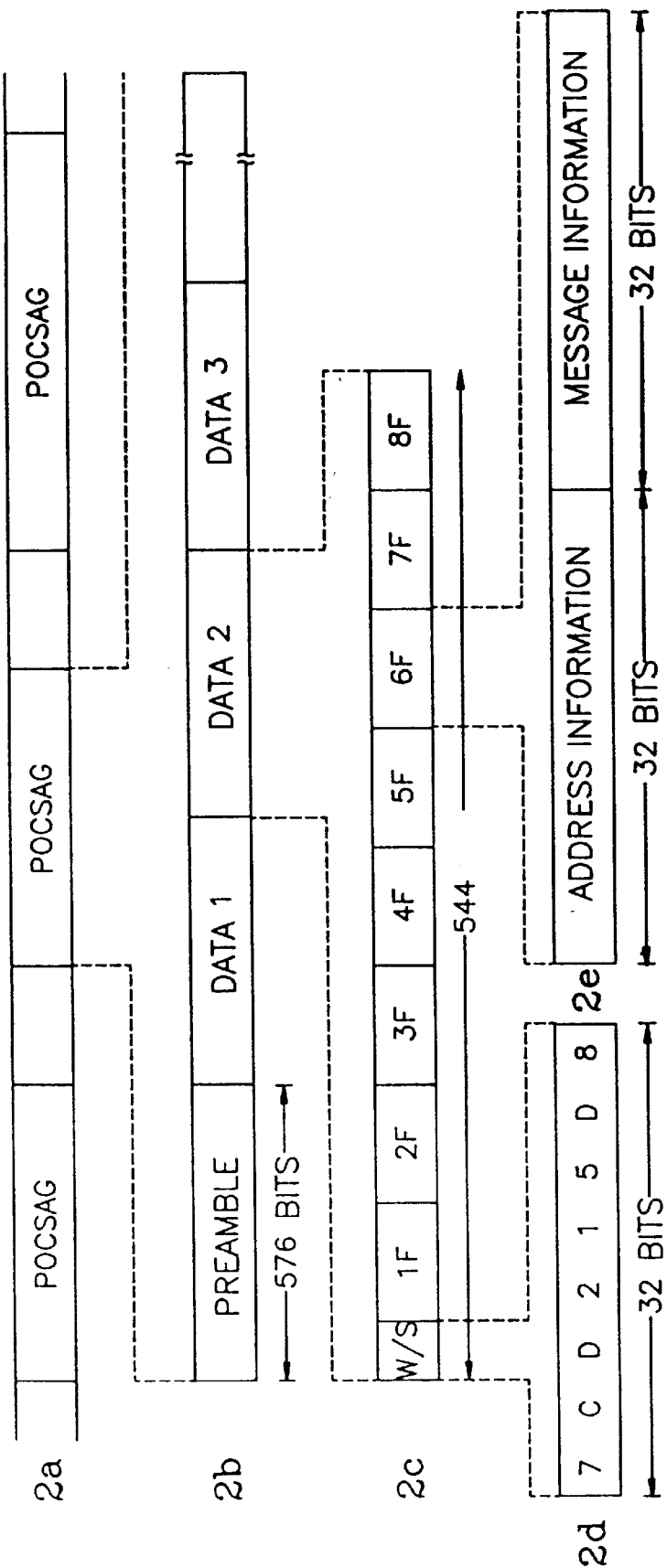
FIG. 2 is a format representative of the POCSAG code.

The POCSAG code is generated as shown in 2a of FIG. 2. A single element of POCSAG code is composed of preamble data consisting of 576 bits, and a plurality of batch data which follows the preamble data, as shown in 2b of FIG. 2. Typically, the preamble data is comprised of a reversal code where bits of logic "1"s and "0"s are repeated during the interval of 576 bits. The single element of POCSAG code contains from 30 (normal) to 60 (maximum) portions of batch data. One portion of batch data consists of 32 bits (ie., one word) of wordsync data and eight frames of data. Each of the eight data frames shown in 2c of FIG. 2 is composed of 64 bits. The wordsync data having 32 bits is comprised of "7CD215D8", as shown in 2d of FIG. 2. Each of the data frames is comprised of an address codeword of 32 bits and a message codeword of 32 bits, as shown in 2e of FIG. 2. Therefore, one portion of batch data contains an amount of data equal to 17 portions of wordsync data, i.e., 544 bits of data (17W/S data×32 bits=544 bits).

Figure 3A:
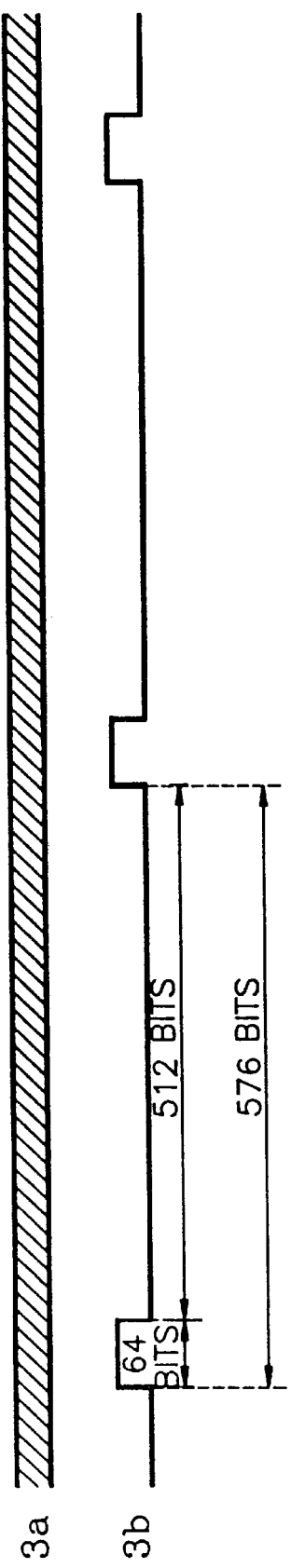
FIGS. 3A and 3B are timing charts showing characteristics of battery control during an idle mode and a batch mode in the paging receiver.
Figure 3B:
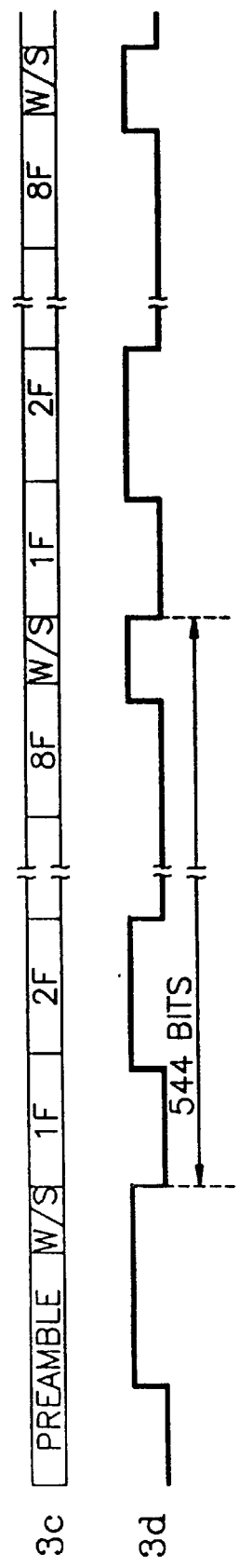

Referring to FIGS. 3A and 3B, a battery saving process performed in a conventional paging receiver will now be explained. Idle mode refers to a preamble search mode wherein the preamble data is searched for prior to receiving the POCSAG code. As previously stated, the preamble data is comprised of 576 bits having a repetitive pattern of binary "1"s and "0"s. When power is supplied during a predetermined period of time, receipt of the preamble data can be detected. That is, as shown in 3a of FIG. 3A, if the preamble data is not received, decoding unit 12 enables the idle mode to be executed. Thus, in a repetitive and sequential manner, decoding unit 12 interrupts the supply of power during a time interval corresponding to 512 bits of a 576 bit period, and turns on the power supply during a time interval corresponding to 64 bits of the 576 bit period, as shown in 3b of FIG. 3A. Hence, if the preamble data is received at an arbitrary point in time, decoding unit 12 detects the reception of the preamble data during the 64 bit period when power is provided.

The batch mode is executed by decoding unit 12 after detection of the preamble data. That is, as shown in 3c of FIG. 3B, when the POCSAG code is received, decoding unit 12 controls the supply of power, as shown in 3d of FIG. 3B, while detecting the wordsync data and a preset frame of data. In other words, decoding unit 12 supplies power to detect the 32 bits of wordsync data and 64 bits of the preset frame data for one portion of batch data. During this time, decoding unit 12 does not supply power at the precise starting points of the wordsync and preset frame data periods, but supplies power at a predetermined bit period before the starting points of the wordsync and frame data periods. This predetermined bit period is typically 8 bits or 16 bits, and enables accurate reception of the wordsync data and the preset frame data.

Therefore, in the conventional paging receiver, in order to detect the wordsync data and the frame data, the power must be supplied for a time period corresponding to at least 96 bits of data. The wordsync data serves to synchronize reception and detection of each frame of data within each of the batches of data. After detection of the wordsync data, decoding unit 12 enables a first frame of data (1F) to be synchronized at a point where the wordsync data period is terminated, and enables power to be supplied just prior to a starting point of a preset frame of data (here, 2F). Therefore, if decoding unit 12 determines the starting point of the wordsync data and synchronizes reception of the frame data that follows the wordsync data, decoding unit 12 does not have to continuously supply power during each frame. Therefore, upon reception of the POCSAG code where a number of portions of batch data are received in a serial pattern, the total amount of time during which power must be supplied can be reduced, and the paging receiver could advantageously conserve power.

If an error in the wordsync data is generated due to a fading effect of the paging receiver and the wordsync data is not detected, decoding unit 12 can not synchronize the preset frame of data corresponding to the wordsync data. In other words, if decoding unit 12 does not detect the wordsync data during the wordsync period in the batch mode, decoding unit 12 can not synchronize nor accurately detect the frame data. In this case, although an error bit is contained in the wordsync data, the error bit has to be detected in the wordsync data. To this end, decoding unit 12 first establishes the number of reference error bits for determining normal reception of wordsync data. Decoding unit 12 then detects the number of reference error bits in the wordsync data received, and if the number of detected bits is below the established number of reference error bits, decoding unit 12 determines that the wordsync data has been received. This results in improved operations in the paging receiver. However, when the wordsync data is not detected, if decoding unit 12 allows power to be supplied during the preset frame period of the batch mode and analyzes an address, continuous detection and reception of batch data is possible to improve operations in the paging receiver.

In the batch mode, when decoding unit 12 does not receive the wordsync data during the wordsync period, if the constructions for detecting the preamble data and the end of data transmission are made to analyze the data received during the wordsync period, decoding unit 12 executes the batch mode or the idle mode in accordance with the data received during the wordsync period of the corresponding portion of batch data. This contributes to improving the operations of the paging receiver.

In the following description of the present invention, numerous specific details, such as wordsync pattern data, a preset frame period, a decoding value of each detect period, etc. are set forth in order to provide a thorough understanding of the present invention. It will be understood by those skilled in the art that other embodiments of the present invention may be practiced without these specific details, or with alternative specific details, without departing from the central spirit or scope of the present invention.

The term "wordsync pattern data" as used herein refers to synchronization data for obtaining the same effect as detection of the 32 bits of wordsync data. The wordsync pattern data is composed of a predetermined number of bits at a beginning portion of the wordsync data. In the following embodiments of the present invention, it is assumed that the wordsync pattern data is comprised of the first 5 bits of the 32 bits of wordsync data. The term "wordsync period" refers to a fixed period corresponding to detection of the wordsync data of a particular batch of data. Assuming a 544-bit orientation beginning at the end of the wordsync period of a first batch of data, the present invention generally defines the wordsync period for a second batch of data immediately following the first batch, as extending from bit 512 to bit 544. Also, the term "wordsync pattern period" refers to a fixed period corresponding to detection of the wordsync pattern data of a particular portion of batch data. With 544-bit orientation described above, the wordsync pattern period extends from bit 512 to bit 517. The term "preset frame" is set by frame information stored in memory 16 of the paging receiver. In the following embodiments of the present invention, it is assumed that the preset frame is the third frame of data of a particular portion of batch data. According to the 544-bit pattern described above, it is assumed in the following embodiments of the present invention that the preset frame period extends from bit 128 to bit 192.

The terms used most frequently in describing the present invention will now be defined. Data DT is digital data output from a receiving unit. Preamble detection signal PAD is a signal generated when a preamble detector detects the preamble data in the POCSAG code. Wordsync detection signal WSD is a signal generated when a wordsync detector detects the wordsync data at the wordsync period of each portion of batch data. Transmission-termination signal ETX is a signal generated when a transmission-termination detector detects the end of data transmission at the wordsync period of an arbitrary portion of batch data of the POCSAG code. Wordsync pattern detection signal WPD is a signal generated when a pattern detector detects wordsync pattern data at every wordsync pattern period in each portion of batch data. Wordsync selection signal WSS is a signal generated in accordance with the state of the wordsync pattern detection signal for selecting power at the wordsync period. Batch mode signal BMS is a signal generated from a batch mode executing unit that executes the supply of power at the wordsync period and the preset frame period in the batch mode. Delayed batch mode signal DBMS is a delayed version of the batch mode signal BMS. Second battery supply signal BSS2 is a signal for controlling the supply of battery power during the wordsync period and the preset frame period in the batch mode. First battery supply signal BSS1 is a signal for controlling the supply of battery power in order to search the preamble in the idle mode. Battery supply signal BSS is synthesized from first and second battery supply signals BSS1 and BSS2. First clock signal CK1 represents a bit of clock data, a second clock signal CK2 is a clock signal for the WPD signal, and a third clock signal CK3 is a reference clock signal for generating various kinds of control signals and enable signals, wherein the first clock signal CK1 and the third clock signal CK3 have the same period. First enable signal EN1 is a signal for enabling the preamble detector to detect the preamble signal. Second enable signal EN2 is a signal for enabling the wordsync detector and the transmission-termination detector to detect the wordsync data and transmission-termination data, respectively. Third enable signal EN3 is a signal for enabling the pattern detector to detect the wordsync pattern data. Fourth enable signal EN4 is a signal for enabling operation of the batch mode executing unit which controls the power supply in the batch mode. Fifth enable signal EN5 is a signal for enabling operation of the idle mode executing unit which controls the power supply in the idle mode. Sixth enable signal EN6 is a signal for enabling detection of the wordsync period in the batch mode. Seventh enable signal EN7 is a signal for enabling detection of an initial wordsync period after detection of the preamble data.

An explanation of operations of the paging receiver constructed according to the principles of the present invention will now be given with reference to FIG. 4.

Figure 4:
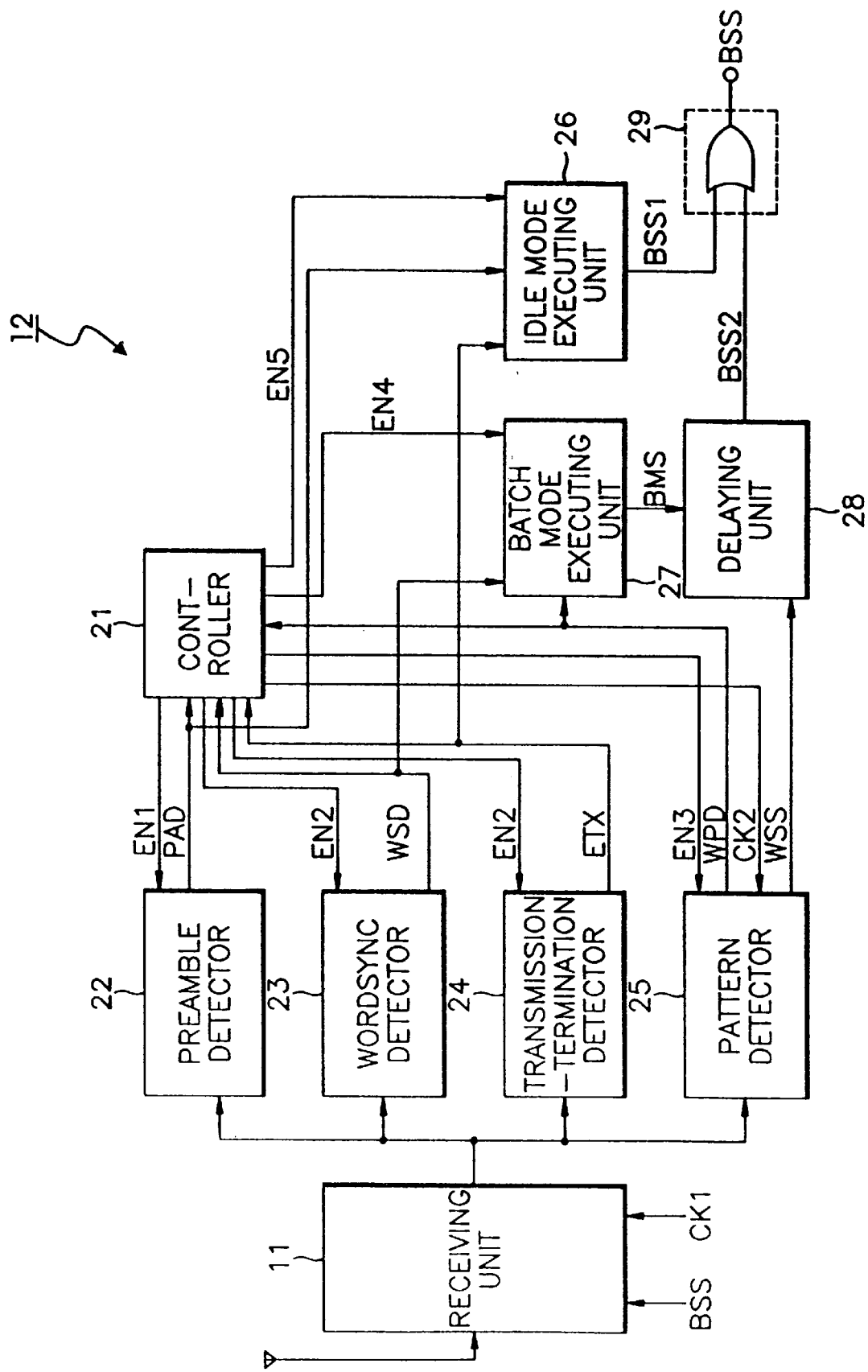
FIG. 4 is a circuit diagram showing a configuration of a decoding unit in FIG. 1 constructed according to the principles of the present invention.

FIG. 4 shows the construction in which decoding unit 12 controls the battery power supplied to receiving unit 11. It is understood in the construction that the structure decoding the received data is not described.

FIG. 4 shows the detailed circuit diagram of decoding unit 12 shown in FIG. 1, which controls the supply of electrical power from battery unit 14 to receiving unit 11. It can be understood from FIG. 4 that a circuit section for decoding the received data is omitted in the construction of decoding unit 12 of FIG. 1.

In FIG. 4, a controller 21 is provided to generate various enable signals (EN1–EN5) necessary for controlling the supply of operating power in accordance with the present invention. A preamble detector 22 is connected to receiving unit 11 and is controlled in response to a first enable signal EN1 from controller 21. Preamble detector 22 detects the received data at a period of the first enable signal EN1 during an idle mode, and generates preamble detection signal PAD when a preamble signal is detected. Preamble detection signal PAD is then applied to controller 21. Wordsync detector 23 is connected with receiving unit 11 and is controlled in response to a second enable signal EN2 from controller 21. Wordsync detector 23 also analyzes the received data in a wordsync period, which is set in accordance with second enable signal EN2, and generates wordsync detection signal WSD when a wordsync signal is detected. Wordsync detection signal WSD is then applied to controller 21. Transmission-termination detector 24 is connected with receiving unit 11, and controlled in response to second enable signal EN2. Transmission-termination detector 24 also analyzes the received data in the wordsync period, which is set in accordance with second enable signal EN2, and generates transmission-termination signal ETX when a transmission-termination signal is detected. Transmission-termination signal ETX is then applied to controller 21. Pattern detector 25 is connected to receiving unit 11 and is controlled in response to third enable signal EN3 from controller 21. Pattern detector 25 also analyzes the received data in the wordsync period, which is set in accordance with third enable signal EN3, and generates wordsync pattern detection signal WPD when a wordsync pattern signal is detected. Wordsync pattern detection signal WPD is applied to controller 21. Pattern detector 25 also latches wordsync selection signal WSS in response to second clock signal CK2 provided from controller 21. Batch mode executing unit 24 is controlled in response to fourth enable signal EN4 provided from controller 21 to count the number of batch mode periods, and is initialized in response to wordsync detection signal WSD or wordsync pattern detection signal WPD. Batch mode executing unit 24 also enables the batch mode to be executed when fourth enable signal EN4 is generated from controller 21, generates a wordsync period signal and a frame period signal, and generates batch mode signal BMS to be initialized when the wordsync detection signal WSD and the wordsync pattern detection signal WPD are generated from controller 21.

Delaying unit 28 receives the batch mode signal BMS from batch mode executing unit 27 and delays the batch mode signal BMS for a predetermined period of time to generate the delayed batch mode signal DBMS. Delaying unit 28 is also provided to select either the batch mode signal BMS or the delayed batch mode signal DBMS, which is generated as second battery supply signal BSS2. Idle mode executing unit 26 is enabled in response to fifth enable signal EN5 provided from controller 21 to receive preamble detection signal PAD and transmission-termination signal ETX. Idle mode executing unit 26 also enables an idle mode to be executed in accordance with transmission-termination signal ETX, and disables the idle mode from being executed in accordance with preamble detection signal PAD. In addition, idle mode executing unit 26 generates first battery supply signal BSS1, which turns ON/OFF according to a constant period, so as to detect the preamble signal during execution of the idle mode. Logic circuit unit 29 generates battery supply signal BSS, which is used to control the supply of power to receiving unit 11 based on an OR logic function.

Figure 5:
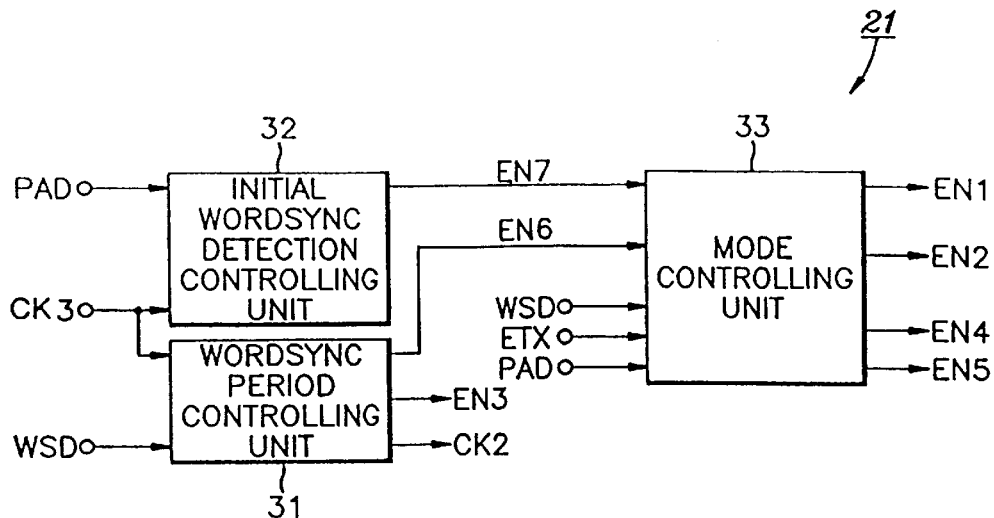
FIG. 5 is a circuit diagram showing a configuration of a controller in FIG. 4 for generating each of the enable signals for controlling a battery supply according to the principles of the present invention.

Hereinafter, the construction and operation of controller 21 shown in FIG. 4 will be described with reference to FIGS. 5 through 13. Controller 21 is comprised of an initial wordsync detection controlling unit 32, a wordsync period controlling unit 31 and a mode controlling unit 33, as shown in FIG. 5. 11a through 11k of FIG. 11 represent timing characteristics of controller 21 when the idle mode is changed to the batch mode.

Figure 7:
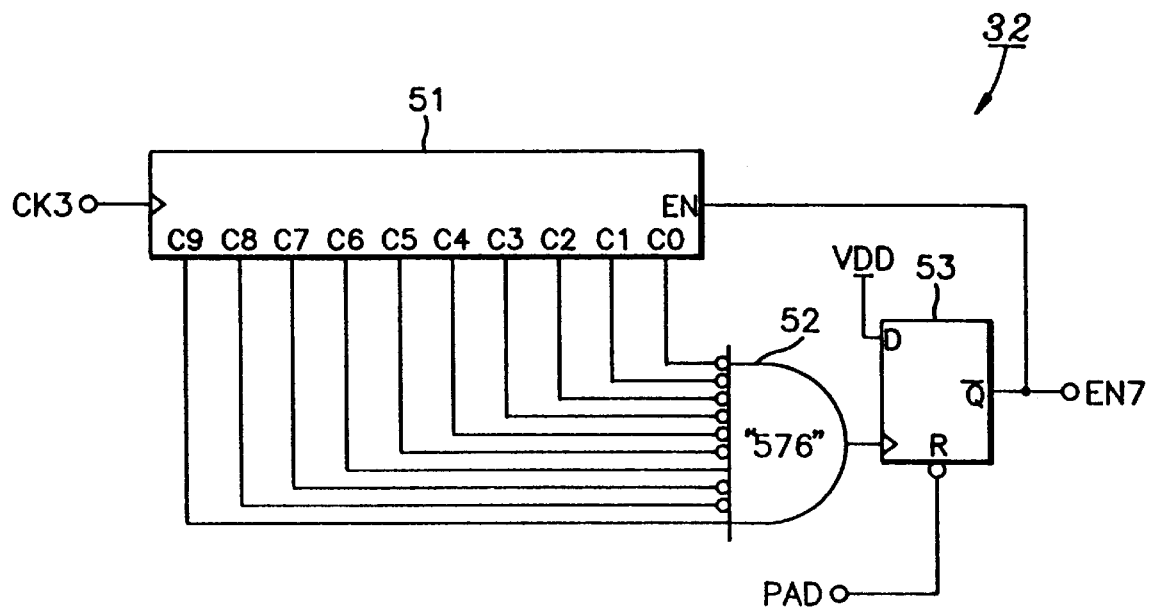
FIG. 7 is a detailed circuit diagram showing an initial wordsync detection controlling unit in FIG. 5 for generating the enable signal during the wordsync period.

First, operation of initial wordsync detection controlling unit 32 will be described. As shown in FIG. 7, if preamble detection signal PAD, shown as 11b of FIG. 11, is generated from preamble detector 22 shown in FIG. 4, a flip-flop 53 is reset to be able to output seventh enable signal EN7, shown as 11c of FIG. 11, at a binary high level through an output terminal $\overline{Q}$. Then, a counter 51 is enabled in response to seventh enable signal EN7 and starts to count the number of clock pulses of third clock signal CK3. Third clock signal CK3 is the same as first clock signal CK1 in bits of the received data DT. Output signals of counter 51 are applied to a decoder 52. Decoder 52 is triggered to output a binary high level is signal when the output signal of counter 51 is the same value as the number of bits in the preamble signal, e.g. 576 (1001000000'B). The binary high level signal from decoder 52 is applied to a clock terminal CK of flip-flop 53. Thus, initial wordsync detection controlling unit 32 generates seventh enable signal EN7 at a binary high level signal, shown by 11c of FIG. 11, in a period of 576 bits in order that wordsync detection signal WSD of a corresponding POCSAG code can be detected in wordsync period controlling unit 31 when preamble detection signal PAD is applied to initial wordsync detection controlling unit 32. Then, since preamble detector 22 can generate the PAD signal at any position during receipt of the preamble signal comprised of 576 bits, operation is performed to extend and compensate the wordsync period in initial wordsync detection controlling unit 32 when the idle mode is changed to the batch mode.

Figure 9:
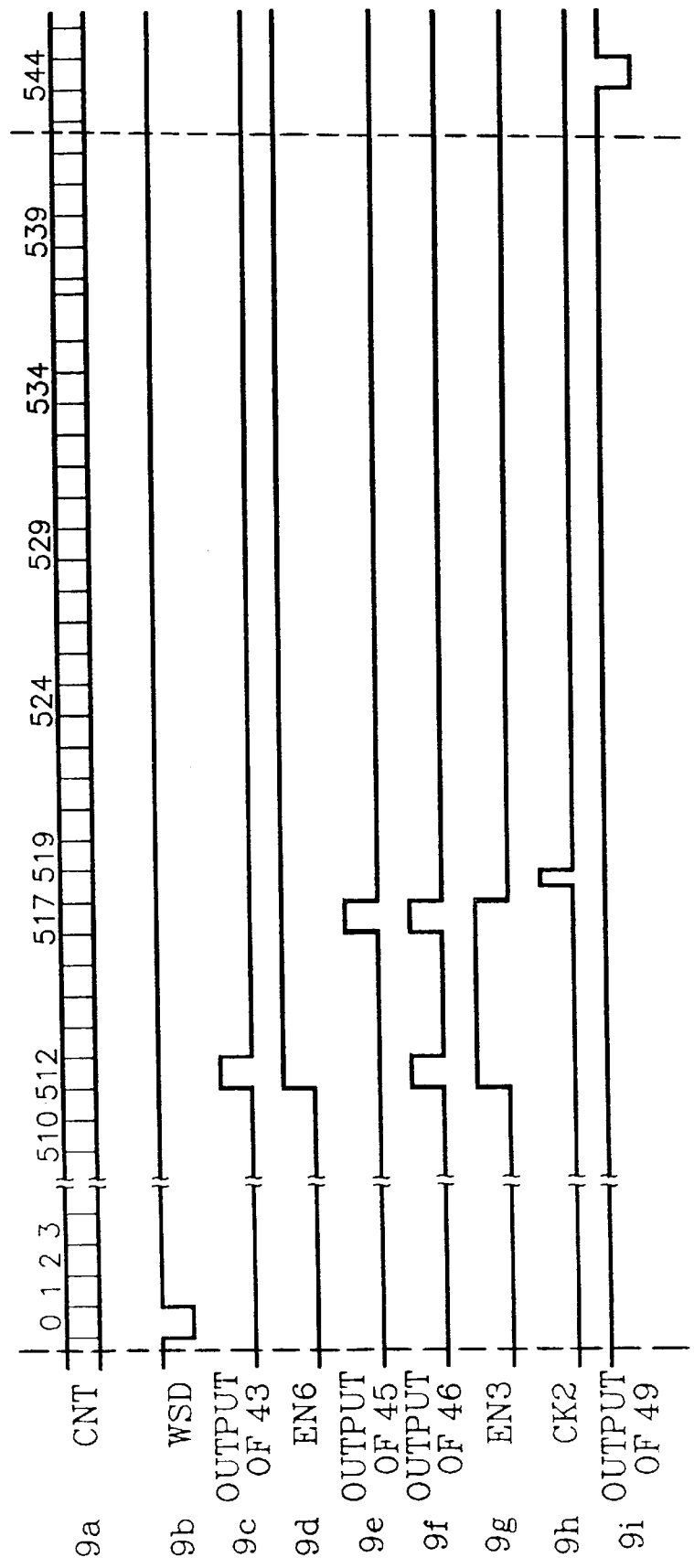
FIG. 9 is a chart showing timing characteristics of the wordsync period controlling unit of FIG. 6.

Operation of wordsync period controlling unit 31 which generates a wordsync period signal and a wordsync pattern period signal will now be described with reference to FIGS. 6 and 9. 9a through 9i of FIG. 9 represent timing characteristics of the wordsync period controlling unit 31 shown in FIG. 6.

Figure 6:
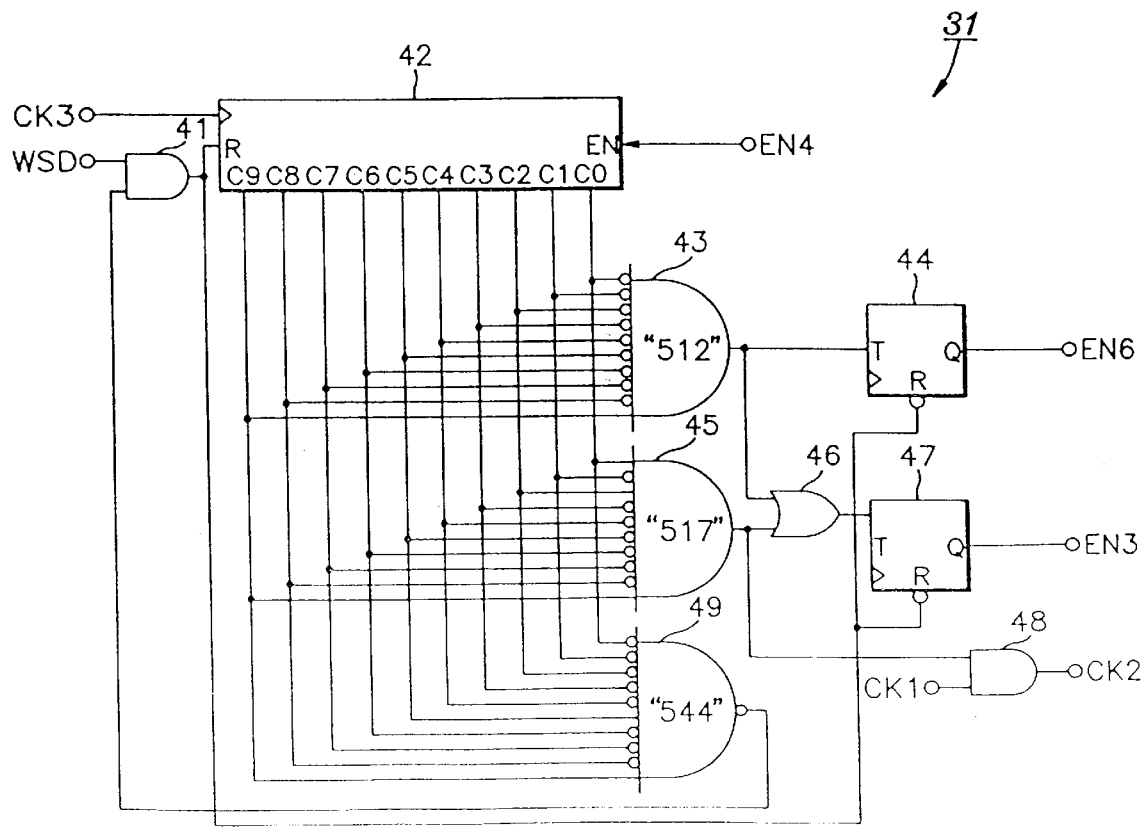
FIG. 6 is a detailed circuit diagram showing a wordsync period controlling unit in FIG. 5 for generating the enable signal during the wordsync period.

As shown in FIG. 6, a counter 42 is comprised of a five hundred forty four counter capable of counting one batch period. Counter 42 receives an output signal provided from a decoder 49 for decoding the number "544" or the wordsync detection signal WSD from wordsync detector 23, through AND gate 41, as a clear signal. Counter 42 also receives fourth enable signal EN4 necessary for enabling the batch mode through an enable terminal EN. Therefore, when the batch mode is executed, counter 42 enables generation of a sixth enable signal EN6 for the wordsync period signal and third enable signal EN3 for the wordsync pattern period signal.

If wordsync detection signal WSD shown by 9b of FIG. 9 is received, or if a signal representing that the output signal of counter 42 is "544" is provided from decoder 49, counter 42 is reset and starts to again count according to third clock signal CK3. Also, flip-flops 44 and 47 are reset to each output binary low level signals. Then, the counting operation of counter 42 is continuously performed.

In addition, if the output signal of counter 42 is "512", the output signal is defined by the starting position of the wordsync period. Then, a decoder 43 detects the starting position thereof and generates a pulse corresponding to a binary high level signal, as shown by 9c of FIG. 9. Flip-flop 44 is then toggled in response to the output signal of decoder 43 to output a binary high level signal. The output signal of decoder 43 is applied to one input terminal of an OR gate 46, and thus OR gate 46 generates a binary high level signal shown by 9f of FIG. 9. Therefore, flip-flop 47 is also toggled in response to the output signal of OR gate 46 to output third enable signal EN3 as a binary high level signal as shown by 9g of FIG. 9.

In the above state, if the output of counter 42 is "517", the position of the wordsync pattern period is regarded as an ending position. Since it is assumed in this embodiment that the wordsync pattern data is defined by five bits at the starting position of the wordsync data, the wordsync pattern period becomes the completion position of the wordsync pattern data at the starting position of the wordsync period. Therefore, it can be understood that the wordsync pattern period is defined between "512" and "517" by the output of counter 42. When the output of counter 42 becomes "517", decoder 45 detects the timing to generate a binary high level signal as shown by 9e of FIG. 9. The OR gate 46 also generates a binary high level signal, shown by 9f of FIG. 9, in response to the output of decoder 45. Flip-flop 47 is again toggled in response to the output of OR gate 46 to generate a binary low level signal, as shown by 9g of FIG. 9. Thus, it can be understood that the output signal of flip-flop 47, i.e. the binary low level signal shown by 9g of FIG. 9, is regarded as third enable signal EN3 necessary for determining the wordsync pattern period. An AND gate 48 generates second clock signal CK2, as shown by 9h of FIG. 9, at the completion position of the wordsync pattern period. The second clock signal CK2 is provided when the wordsync pattern detection signal is detected by pattern detector 25 to latch the detected WPD signal.

As above described, after generation of the wordsync pattern period signal, if the output of counter 42 becomes "544", or if wordsync detection signal WSD is generated, AND gate 41 outputs a binary low level signal to reset flip-flops 44 and 47 and counter 42. The position where the output of flip-flop 44 is reset, as shown by 9d of FIG. 9, is defined as the completion position of the wordsync period. Therefore, the output of flip-flop 42 is maintained between "512" and "544", and thus defined as the wordsync period of the respective batch of data.

Figure 10:
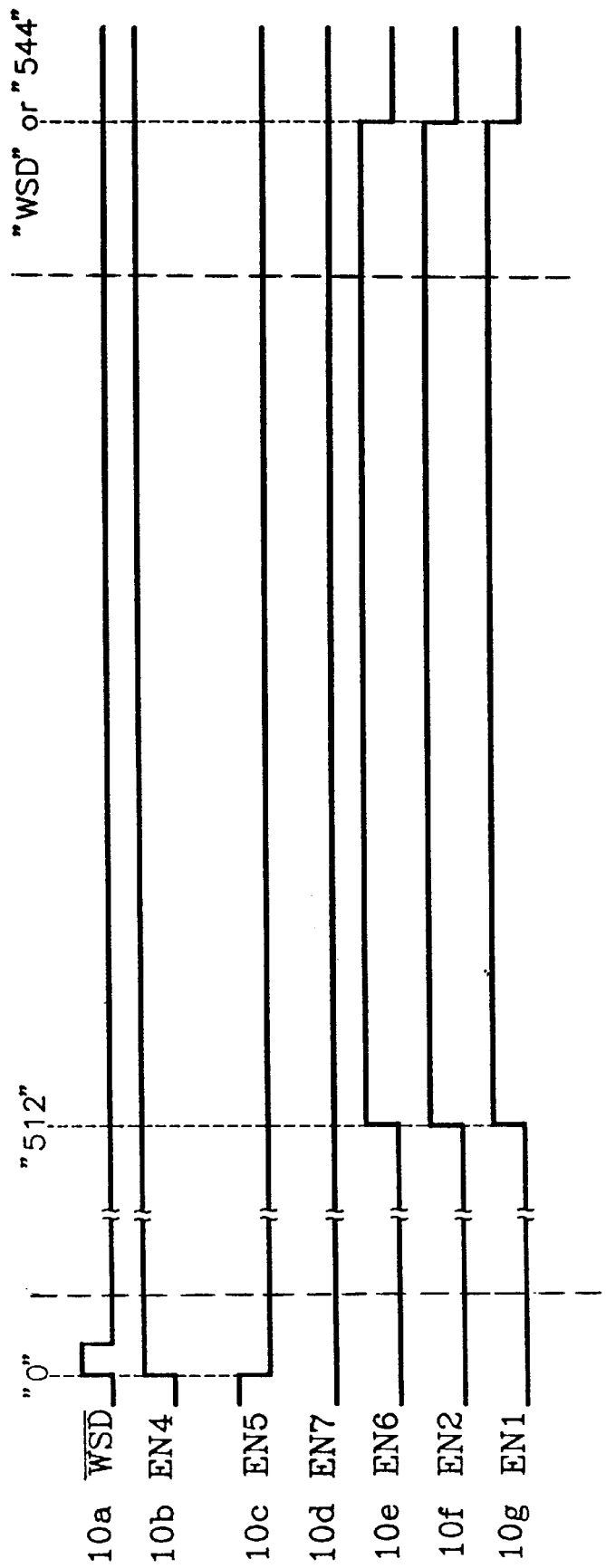
FIG. 10 is a chart showing timing characteristics of the mode controlling unit of FIG. 8.
Figure 11:
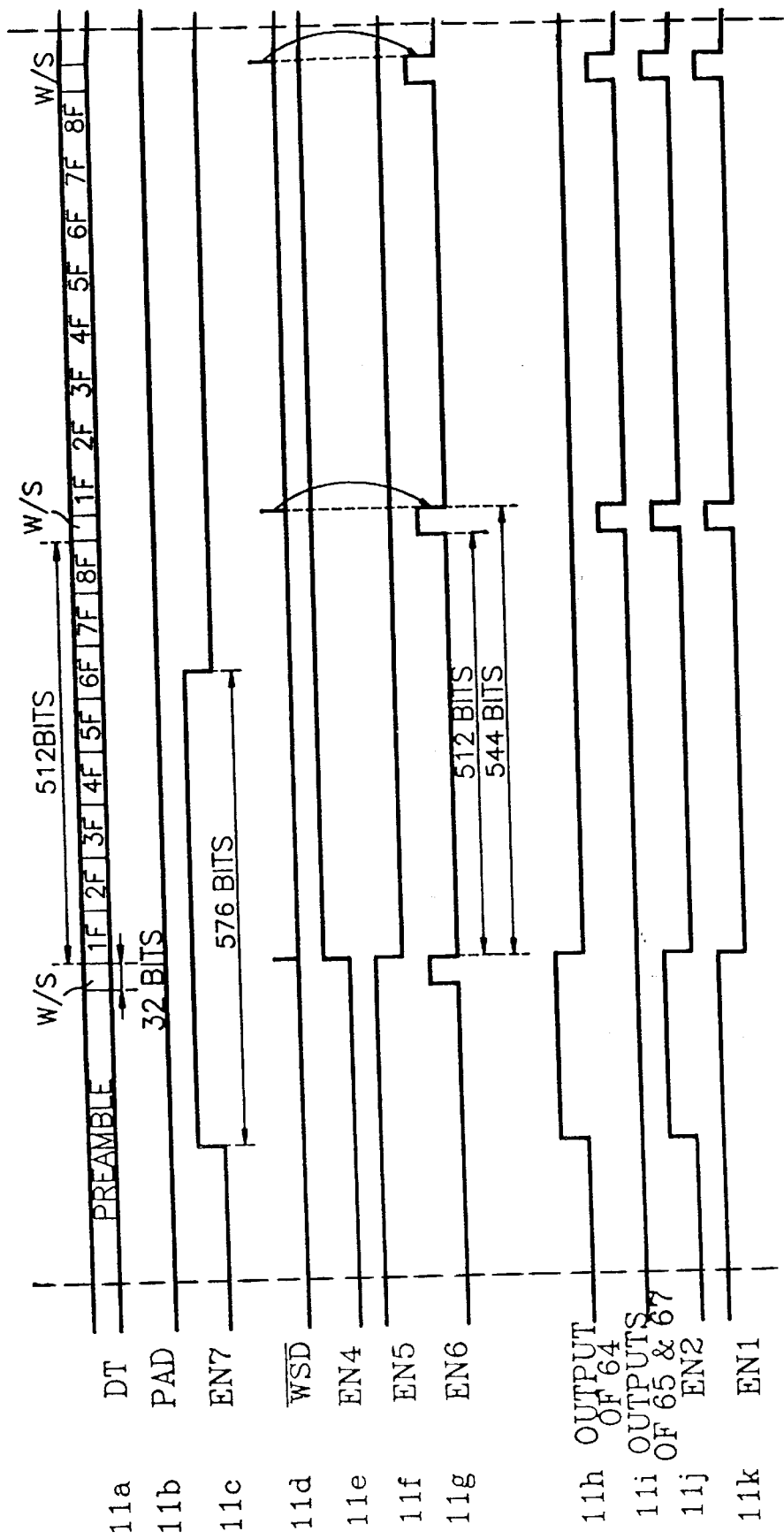
FIG. 11 is a chart showing timing characteristics of components shown in FIG. 5 to FIG. 8 when converting from the idle mode to the batch mode.

Next, operation of mode controlling unit 33 will be described with reference to FIGS. 8 and 10. 10a through 10g of FIG. 10 represent timing characteristics of mode controlling unit 33 shown in FIG. 8.

Figure 8:
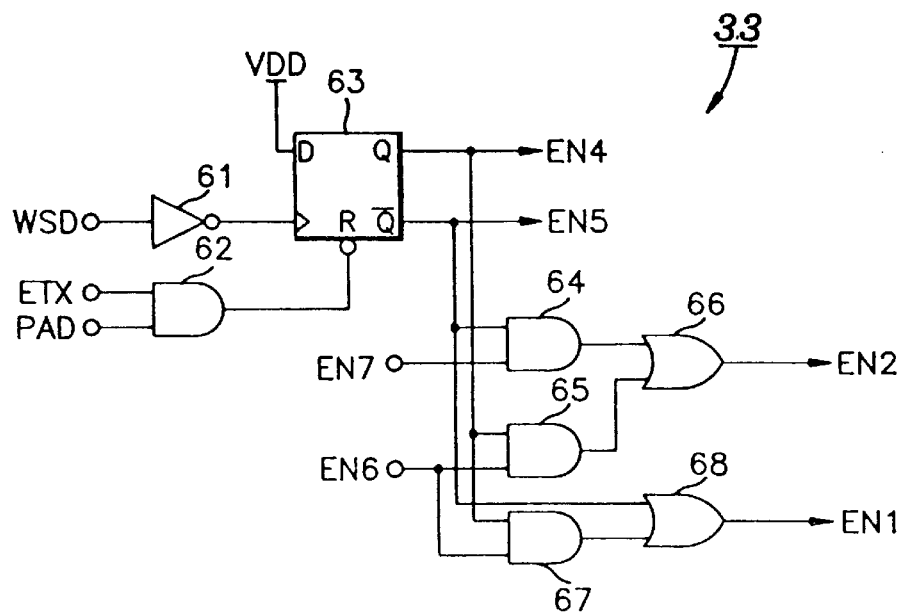
FIG. 8 is a circuit diagram showing a mode controlling unit in FIG. 5 for generating each of the enable signals in the idle mode and batch mode.

As shown in FIG. 8, if a preamble signal is detected during execution of the idle mode and then a wordsync signal corresponding to the starting position is detected, the wordsync detection signal WSD is generated. Then, an inverts 61 inverts the wordsync detection signal WSD to generate a binary high level signal shown by 10a of FIG. 10. A flip-flop 63 receives the inverted signal through a clock terminal thereof and generates fourth and fifth enable signals EN4 and EN5 shown by 10b and 10c of FIG. 10, respectively. Fourth enable signal EN4 is provided to enable the batch mode, and fifth enable signal EN5 is provided to enable the idle mode. Therefore, when wordsync detection signal WSD is generated, the batch mode is disabled and the idle mode is enabled.

An AND gate 64 receives seventh and fifth enable signals EN7 and EN5 so that the initial wordsync period can be enabled, and carries out a logic signal on the basis of an AND logic function. Thus, after generation of the preamble detection signal PAD, AND gate 64 outputs second enable signal EN2 necessary for detecting the initial wordsync until fifth enable signal EN5 is inverted to a binary low level signal. AND gate 65 receives sixth and fourth enable signals EN6 and EN4 and performs an AND logic function. Then, if the batch mode is carried out by fourth enable signal EN4 being changed to a binary high level signal, AND gate 65 generates second enable signal EN2 in accordance with sixth enable signal EN6 of the wordsync period from the wordsync period controlling unit 31. An OR gate 66 performs an OR logic function on the outputs of AND gates 64 and 65 to generate second enable signal EN2 corresponding to the wordsync period of the respective batch, as shown by 10f of FIG. 10. Second enable signal EN2 is provided to periodically enable wordsync detector 23 and transmission-termination detector 24 to be operated.

Also, an AND gate 67 receives the fourth and sixth enable signals EN4 and EN6 and performs an AND logic function thereon to generate first enable signal EN1 maintaining a binary high level in the wordsync period of the batch mode. An OR gate 68 receives fifth enable signal EN5 and the output of AND gate 67 and performs an OR logic function thereon to generate first enable signal EN1. First enable signal EN1 is provided to enable preamble detector 22 of FIG. 4 to be operated.

Next, operation of controller 21 when the idle mode is changed to the batch mode will be described with reference to FIGS. 6, 7, 8, and 11. 11a through 11k of FIG. 11 represent timing characteristics of controller 21 when the idle mode is changed to the batch mode.

During the idle mode, flip-flop 63 outputs fourth enable signal EN4 at a binary low level and fifth enable signal EN5 at a binary high level. The output of OR gate 68 is maintained at a binary high level, as shown by 11k of FIG. 11, in accordance with fifth enable signal EN5 at a binary high level. Thus, during the idle mode, preamble detector 22 detects whether or not the preamble signal is received in response to first enable signal EN1, as shown by 11k of FIG. 11. Since fourth enable signal EN4 is at a binary low level and seventh enable signal EN7 is not yet generated, OR gate 66 outputs second enable signal EN2 at a binary low level, as shown by 11j of FIG. 11.

During the idle mode, if preamble detector 22 generates the preamble detection signal PAD, flip-flop 53 of FIG. 7 is reset, and seventh enable signal EN7 is changed to a binary high level. Then, seventh enable signal EN7 is maintained at a binary high level for a period of 576 bits by the operation of counter 51 and decoder 52 after generation of preamble detection signal PAD, as shown by 11c of FIG. 11. The AND gate 64 for receiving the fifth and seventh enable signals EN5 and EN7 outputs a binary high level signal, as shown by 11h of FIG. 11. The OR gate 66 also outputs second enable signal EN2 at a binary high level by the output of AND gate 64. Therefore, after detection of the preamble signal, second enable signal EN2 is activated so that the starting position of the wordsync signal can be detected.

In the above described state, wordsync detector 23 analyzes the received data and starts to detect the wordsync signal. If wordsync detector 23 detects the wordsync signal, it generates wordsync detection signal WSD. Then, inverter 61 outputs an inverted wordsync detection signal $\overline{WSD}$. In accordance with the inverted wordsync signal $\overline{WSD}$, flip-flop 63 generates fourth enable signal EN4 at a binary high level and fifth enable signal EN5 at a binary low level. This operation is continuously maintained until preamble detection signal PAD or transmission-termination signal ETX is generated. As described above, when wordsync detection signal WSD is generated, sixth enable signal EN6, shown by 11g of FIG. 11, is generated in the wordsync period of each batch of data. The sixth enable signal EN6, shown by 11i of FIG. 11, is commonly applied to OR gates 66 and 68 through AND gates 65 and 67, respectively. Thus, during the batch mode, second and first enable signals EN2 and EN1 provided from OR gates 66 and 68 are maintained, as shown by 11j and 11k of FIG. 11. Also, during the batch mode, preamble detector 22, wordsync detector 23 and transmission-termination detector 24 are enabled during the wordsync period of each batch to analyze the received data. Pattern detector 25 is also enabled from the beginning to the end of the wordsync pattern period, and thus detects whether or not the wordsync pattern signal is received.

Figure 12:
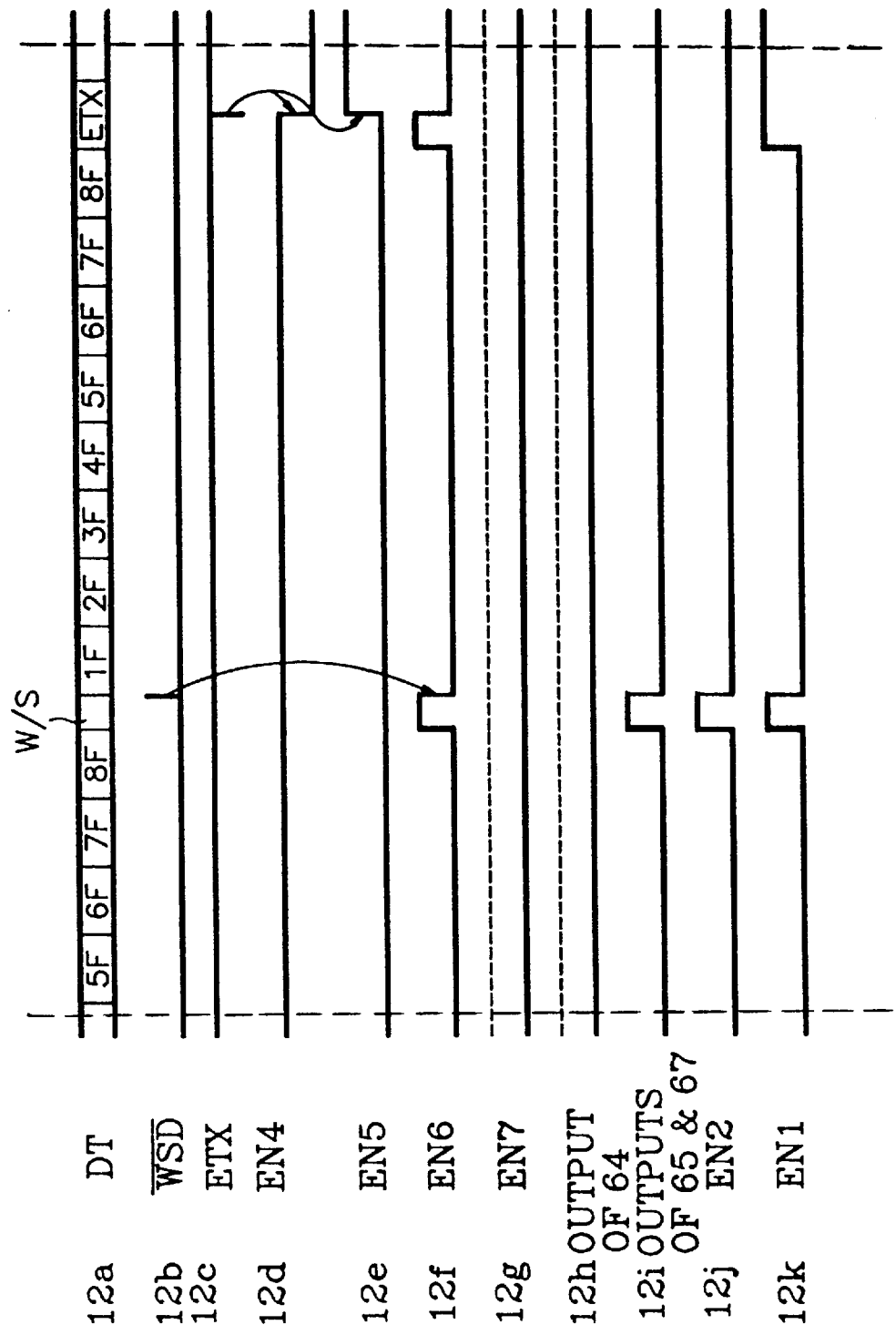
FIG. 12 is a chart showing timing characteristics of components shown in FIG. 5 to FIG. 8 when converting from the batch mode to the idle mode.

Hereinafter, the operation of controller 21 when the batch mode is changed to the idle mode in accordance with transmission-termination signal ETX will now be described with reference to FIGS. 6, 7, 8, and 12. 12a through 12k of FIG. 12 represent timing characteristics of controller 21 when the batch mode is changed to the idle mode.

If transmission-termination signal ETX, shown by 12c of FIG. 12, is generated by transmission-termination detector 24, flip-flop 63 is reset in response to the output of an AND gate 62 to output fourth enable signal EN4 at a binary low level and fifth enable signal EN5 at a binary high level, as shown by 12d and 12e of FIG. 12, respectively. That is, during the batch mode, the wordsync detection signal WSD is not generated in the wordsync period and transmission-termination signal ETX is set so that the batch mode can be changed to the idle mode. Second enable signal EN2 is changed to a binary low level, as shown by 12j of FIG. 12, and first enable signal EN1 is changed to a binary high level. As a result, detection of the preamble signal is enabled.

Figure 13:
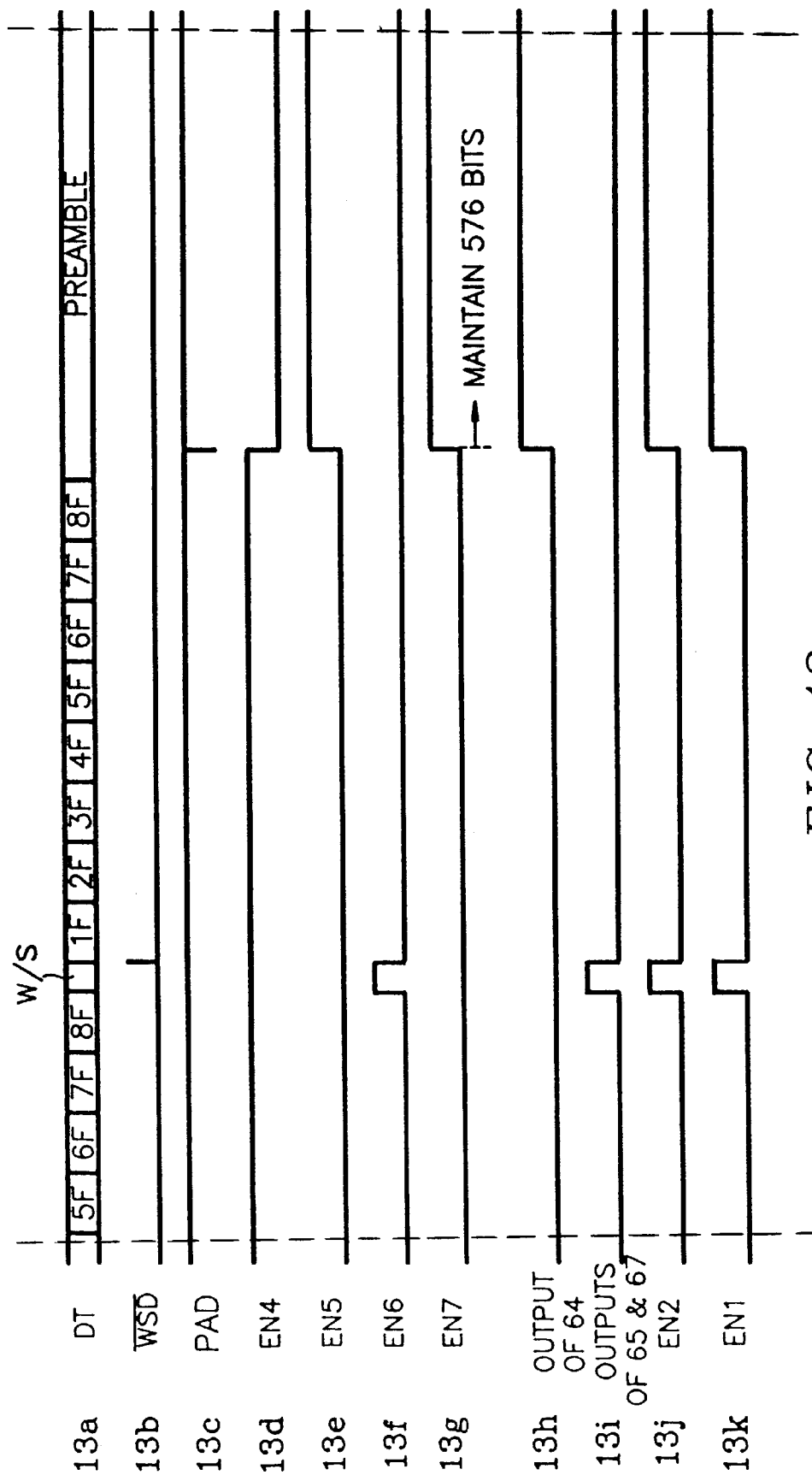
FIG. 13 is a chart showing timing characteristics of components shown in FIG. 5 to FIG. 8 when detecting the preamble data in the batch mode.

Hereinafter, the operation of controller 21 when the preamble detection signal PAD is received during the batch mode will be described with reference to FIGS. 6, 7, 8 and 13. 13a through 13k of FIG. 13 represent timing characteristics of controller 21 when detecting preamble data in the batch mode.

As described above, since during the batch mode the first enable signal EN1 is activated in the wordsync period, preamble detector 22 is also enabled. In the wordsync period, if wordsync detection signal WSD, shown by 13b of FIG. 13, is not detected and preamble detection signal PAD, shown by 13c, is detected, flip-flop 63 of FIG. 8 is reset. Then, fourth enable signal EN4 is changed to a binary low level, as shown by 13d of FIG. 13, and fifth enable signal EN5 is changed to a binary high level, as shown by 13e of FIG. 13. As a result, the batch mode is changed to the idle mode. Seventh enable signal EN7 is activated by preamble detection signal PAD to be changed to a binary high level, as shown by 13g of FIG. 13. The output of AND gate 64 is then changed to a binary high level, as shown by 13h of FIG. 13, and OR gate 66 also outputs second enable signal EN2 at a binary high level, as shown by 13j is of FIG. 13. Therefore, the starting position of the wordsync signal following the preamble signal can be detected.

Hereinafter, the operation of the circuit shown in FIG. 4 will be described in accordance with the output signals of controller 21.

First, operation of idle mode executing unit 26 which controls the supply of power during the idle mode will be described with reference to FIGS. 14, 15A and 15B. 15a through 15k of FIGS. 15A and 15B represent timing characteristics of the idle mode executing unit 26 shown in FIG. 14.

Figure 14:
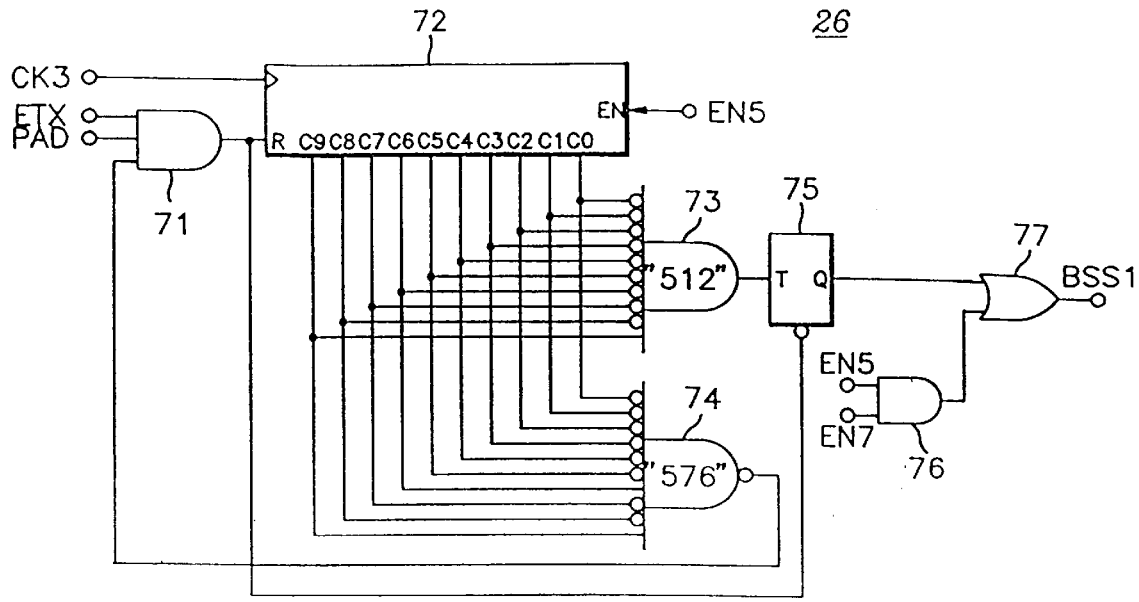
FIG. 14 is a detailed circuit diagram showing an idle mode executing unit in FIG. 4 for controlling a battery supply in the idle mode.

A counter 72 shown in FIG. 14 is operated during the idle mode, but not during the batch mode. Counter 72 is reset in response to transmission-termination signal ETX or preamble detection signal PAD occurring upon a change from the idle mode, and then counts the number of pulses of third clock signal CK3. Decoder 73 receives the output of counter 72 and generates a binary high level signal, shown by 15b of FIG. 15A, when the output of counter 72 is equal to "512", as shown by 15a of FIG. 15A. Flip-flop 75 is toggled in response to the output of decoder 73 to latch a binary high level signal, shown by 15c of FIG. 15A. Decoder 74 receives the output of counter 72 and generates a binary low level signal, as shown by 15d of FIG. 15A, when the output of counter 72 is equal to "576", as shown by 15a of FIG. 15A. The output of decoder 74 is provided to AND gate 71. Then, a binary low level signal is commonly applied to resetting terminals of counter 72 and flip-flop 75. Counter 72 is reset, as shown by 15a of FIG. 15A, and starts to perform a counting operation. The output of flip-flop 75 is changed from a binary high level to a binary low level.

As shown by 15c of FIG. 15A, flip-flop 75 generates a binary high level signal while the output of counter 72 is equal to a value between "512" and "576". The output of flip-flop 75 is maintained at a binary low level for the first 512 bits of the 576 bits, and at the binary high level for the 64 bit period between bit 512 and bit 576. This is because the preamble signal is a reversal code composed of 576 bits. In the idle mode, if a power source is supplied for a period of 64 bits of the 576 bits, the preamble signal can be received in any state. That is, if power is turned off for a period of 512 bits, and turned on for a period of 64 bits, the preamble signal can be stably detected even when it is spontaneously received. The output of flip-flop 75 is provided through OR gate 77 to OR gate 29 (see FIG. 4) as first battery supply signal BSS1. The output of OR gate 29, which is based on first battery supply signal BSS1, is applied to switching unit 13 of FIG. 1 as battery supply signal BSS. As a result, receiving unit 11 is supplied with power, as shown by 15c of FIG. 15A, through switching unit 13 during the idle mode, which is necessary for detecting the preamble signal in accordance with first battery supply signal BSS1.

During the idle mode, if preamble detection signal PAD is generated, as shown by 15e of FIG. 15B, initial wordsync detection controlling unit 32 outputs seventh enable signal EN7, as shown by 15g of FIG. 15B. Then, fifth enable signal EN5 is maintained at a binary high level, as shown by 15j of FIG. 15B. An AND gate 76 (see FIG. 14) receives the fifth and seventh enable signals EN5 and EN7, and outputs a binary high level signal, as shown by 15k of FIG. 15B. In turn, OR gate 77 outputs first battery supply signal BSS1, as shown by 15k of FIG. 15B. After detection of the preamble signal, first battery supply signal BSS1 must be maintained at a binary high level (an ON state) until wordsync detection signal WSD is received.

Furthermore, after detection of the preamble signal, if the wordsync detection signal WSD is received when the first battery supply signal BSS1 is in the ON state, mode controlling unit 33 generates fifth enable signal EN5 at a binary low level, as shown by 15j of FIG. 15B, to complete the idle mode. At the same time, mode controlling unit 33 generates fourth enable signal EN4 at a binary high level to enable the batch mode to be executed. The AND gate 76 then outputs a binary low level signal since fifth enable signal EN5 is at a binary low level, and first battery supply signal BSS1 output from OR gate 77 switches to a binary low level (an OFF state), as shown by 15k of FIG. 15B.

Accordingly, when preamble detection signal PAD is detected, the first battery supply signal BSS1 is maintained at a binary high level (ON state), and is switched to a binary low level (OFF state) when the wordsync detection signal WSD is generated.

Figure 16:
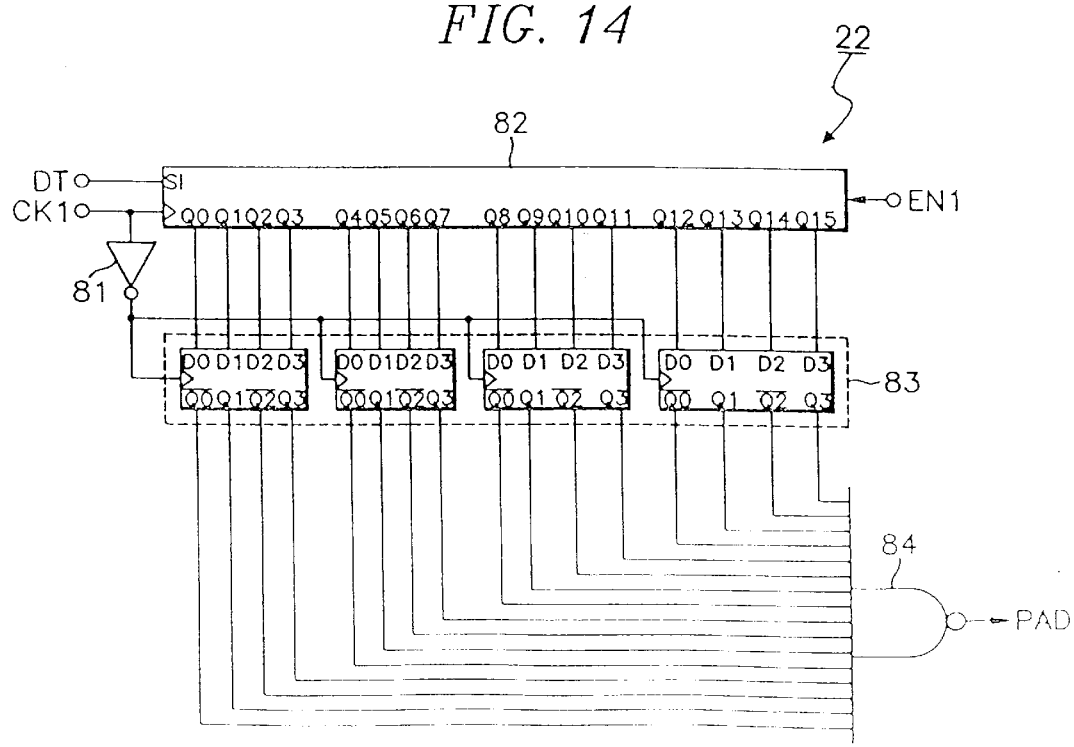
FIG. 16 is a circuit diagram showing the preamble detector in FIG. 4 for detecting the preamble data in the POCSAG code.
Figure 17:
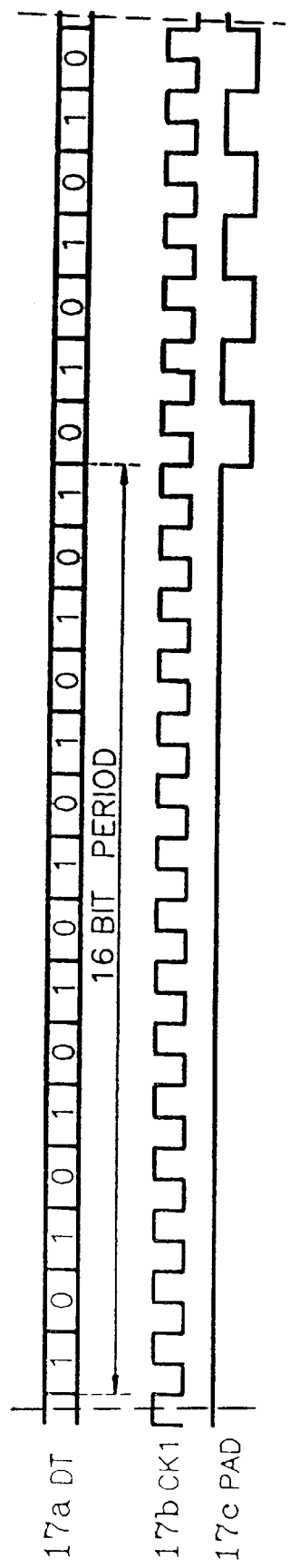
FIG. 17 is a chart showing timing characteristics of the preamble detector shown in FIG. 16.

Hereinafter, the operation for detecting the preamble signal during the idle mode will be described with reference to FIGS. 16 and 17. 17a through 17c of FIG. 17 represent timing characteristics of preamble detector 22 shown in FIG. 16.

A shift register 82 has an input terminal SI provided with data DT from receiving unit 11, a clock terminal receives first clock signal CK1, and an enable terminal receives first enable signal EN1. First enable signal EN1 is always activated during the idle mode, and is activated only at the wordsync period during the batch mode. The preamble signal is composed of 576 bits, and receiving unit 11 is in an ON state only for a period of 64 bits out of these 576 bits in the idle mode. Thus, since receiving unit 11 can only be operated for a period of 64 bits, preamble detector 22 is capable of receiving a maximum number of bits in the preamble signal, e.g. 64 bits. In this embodiment, it is assumed that the preamble signal is received when 16 bits of the preamble signal are detected. Therefore, shift register 82 is a 16-bit shift register.

Shift register 82 receives the data DT, shown by 17a of FIG. 17, from receiving unit 11 to shift and store the data DT in response to first clock signal CK1. A latch 83 latches and outputs 16-bit data, which is supplied through parallel output terminals Q15–Q0 of shift register 82, in response to first clock signal CK1, shown by 17b of FIG. 17. Latch 83 receives first clock signal CK1 through an inverter 81. Since the preamble signal is the reversal code, latch 83 outputs odd-bit data of the 16-bit data through inverting output terminals, and outputs an even-bit data through non-inverting output terminals. When the preamble signal of the reversal code is received, all outputs of latch 83 are at a binary high or a binary low level. A NAND gate 84 receives the 16-bit signal from latch 83 and performs a NAND logic function thereon to output a logic signal. For example, if shift register 82 outputs a 16-bit signal of "1010101010101010101", latch 83 outputs "1111111111111111". As a result, NAND gate 84 generates preamble detection signal PAD at a binary low level, as shown by 17c of FIG. 17.

Figure 22:
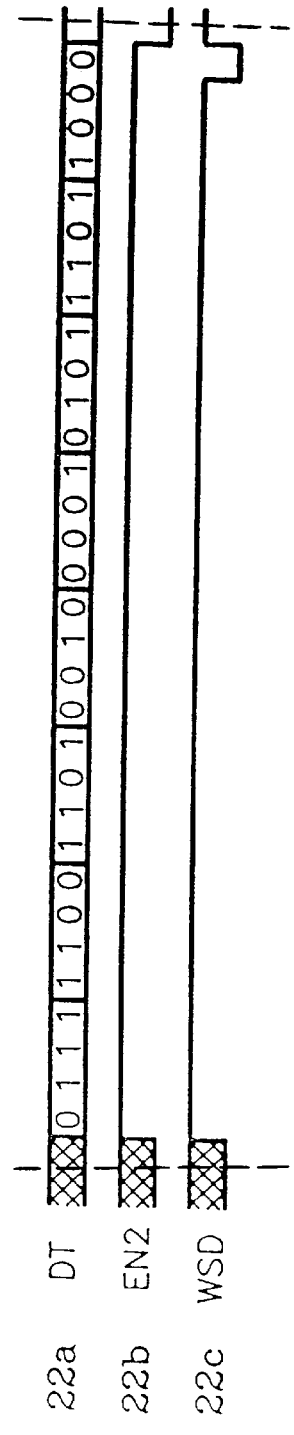
FIG. 22 is a chart showing timing characteristics for generating the wordsync detection signal in the wordsync detector of FIG. 18.

Hereinafter, an operation for detecting the wordsync signal in the wordsync period of the first portion of batch data after detection of the preamble signal will be described with reference to FIGS. 18 through 22. 22a through 22c of FIG. 22 represent timing characteristics of wordsync detector 23 shown in FIG. 18.

The wordsync signal is 32 bits of data composed of "7CD215D8H" in the POCSAG code. Decoding unit 12 of the paging receiver decodes the received information in synchronization with the word of the frame data when the wordsync signal is detected. Therefore, if the wordsync signal is accurately detected, paging information can be accurately provided.

Figure 18:
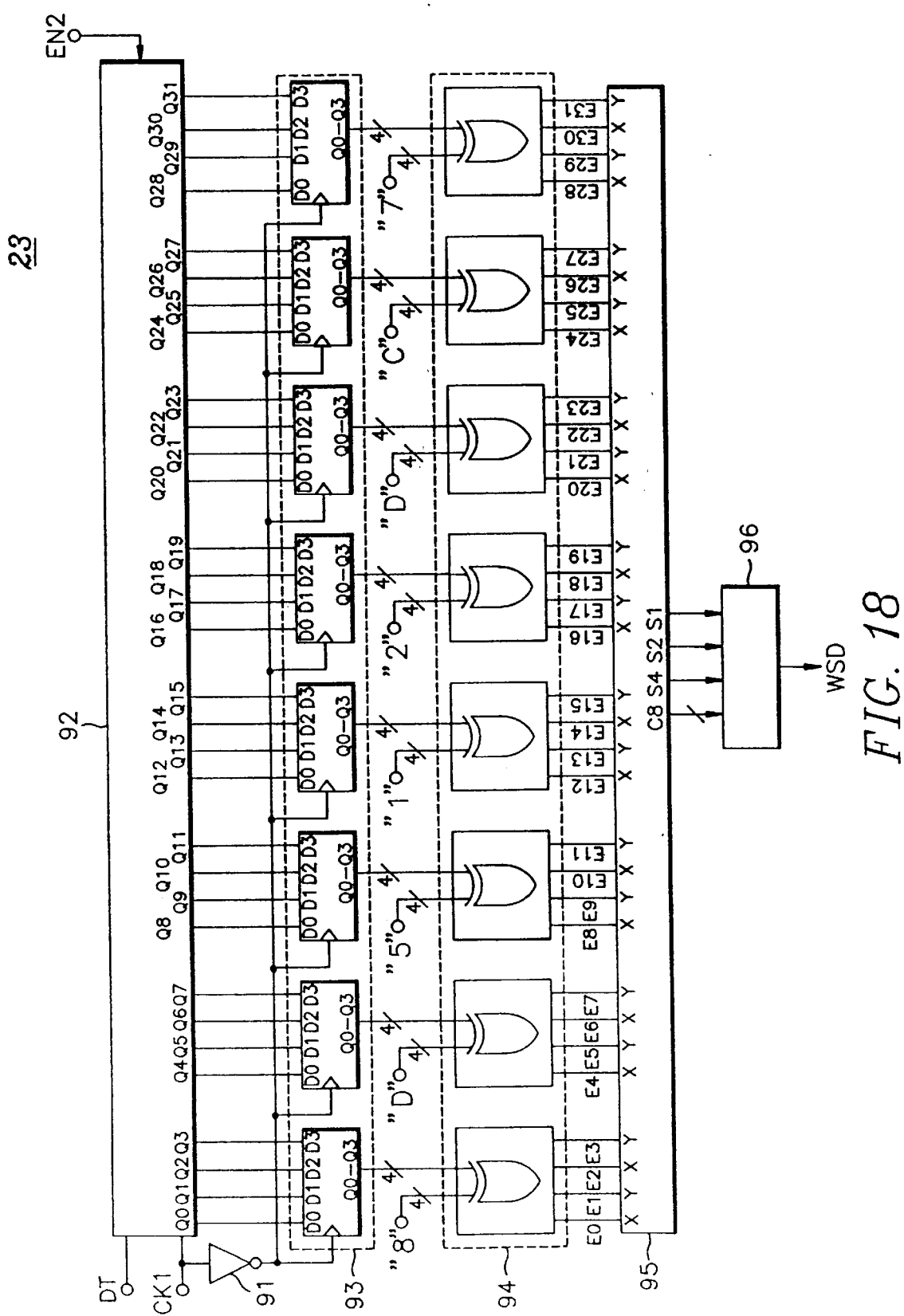
FIG. 18 is a circuit diagram showing a configuration of the wordsync detector in FIG. 4 which is enabled during the wordsync period of each batch of the POCSAG code.

In FIG. 18, a shift register 92 is comprised of a 32-bit shift register. When a preamble signal is detached, second enable signal EN2 to be provided to shift register 92 is maintained at a binary high level until the wordsync signal of the first batch of data is detected after detection of the preamble signal, and thereafter at a binary high level in the wordsync period of the respective batch of data. Shift register 92 shifts and stores the data DT, as shown by 22a of FIG. 22, received from receiving unit 11 in response to first clock signal CK1, and a latch 93 latches the output of shift register 92 in response to first clock signal CK1 received through an inverter 91. Then, 32 bits of parallel data are provided from latch 93 to a comparator 94.

Comparator 94 is comprised of 32 exclusive-OR gates and compares the parallel data from latch 93 with the 32 bits of wordsync data. From the result of the comparison, it can be determined whether or not the received signal is the wordsync signal.

If there is an error while receiving the POCSAG code, the wordsync signal can be detected during synchronization of the word. As a result, it is impossible to provide a paging service. In order to compensate for this, even if the wordsync signal has several error bits below the predetermined number of error bits when it is detected, the several error bits are regarded as part of the wordsync signal. Thus, the paging service can be provided even under adverse conditions.

An error detector 95 detects the 32 bits of comparison data E31–E0 from comparator 94 and performs an addition function thereon to output an error detecting signal, which can be produced on the basis of adding bit signals having a binary high level in the comparison data. Thus, if the output of error detector 95 is analyzed, the number of bits having a different value between the 32-bit comparison data and the 32-bit wordsync data can be detected.

Figure 19:
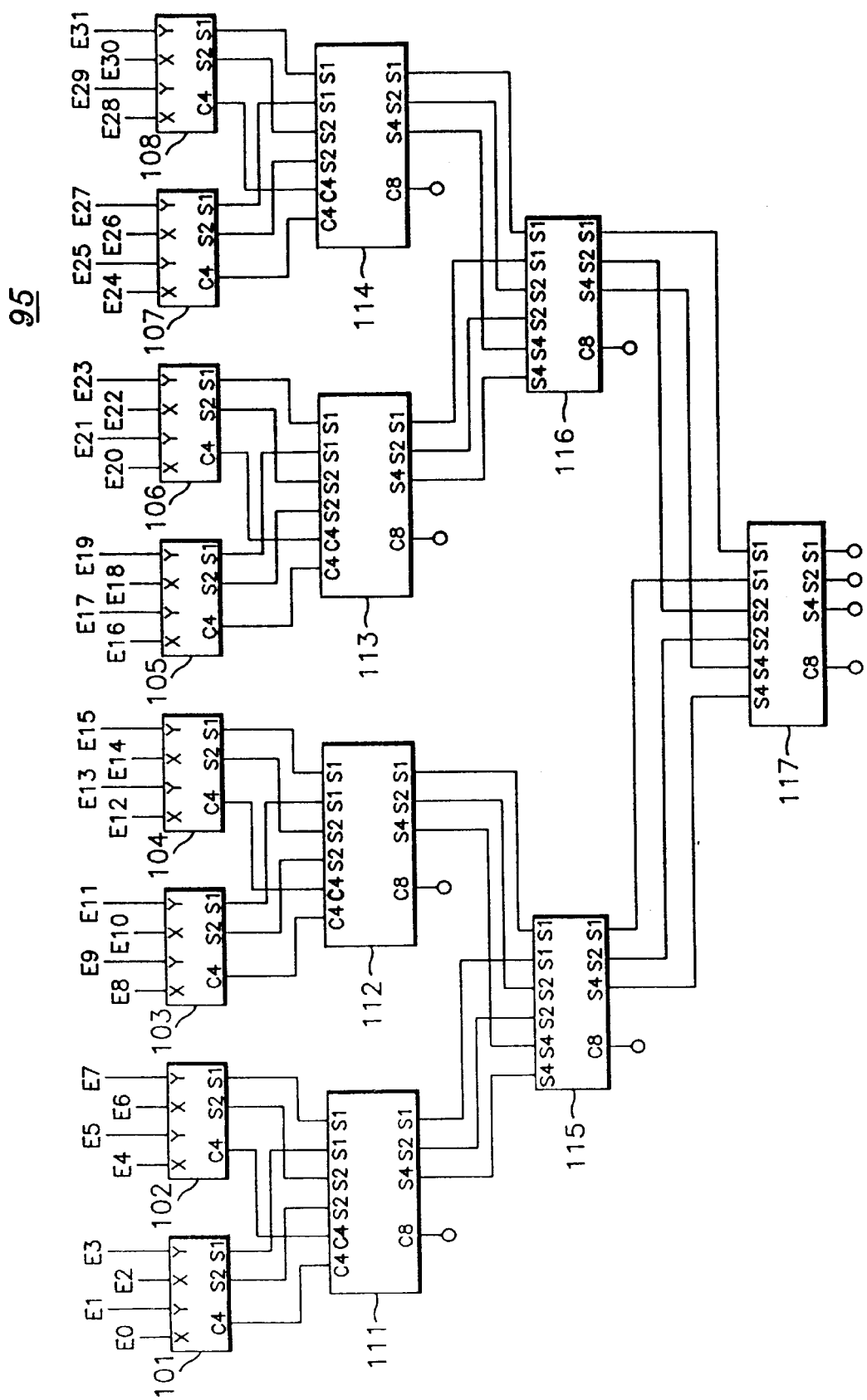
FIG. 19 is a circuit diagram showing a configuration of an error detecting unit for adding error bits in the wordsync detector of FIG. 18.
Figure 20A:
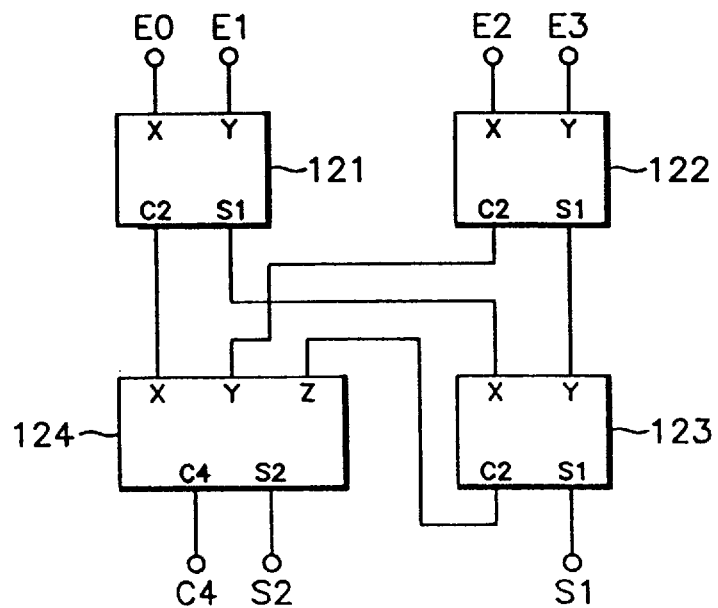
FIG. 20A is a circuit diagram showing a configuration of a first adding unit in the error detecting unit of FIG. 19.
Figure 20B:
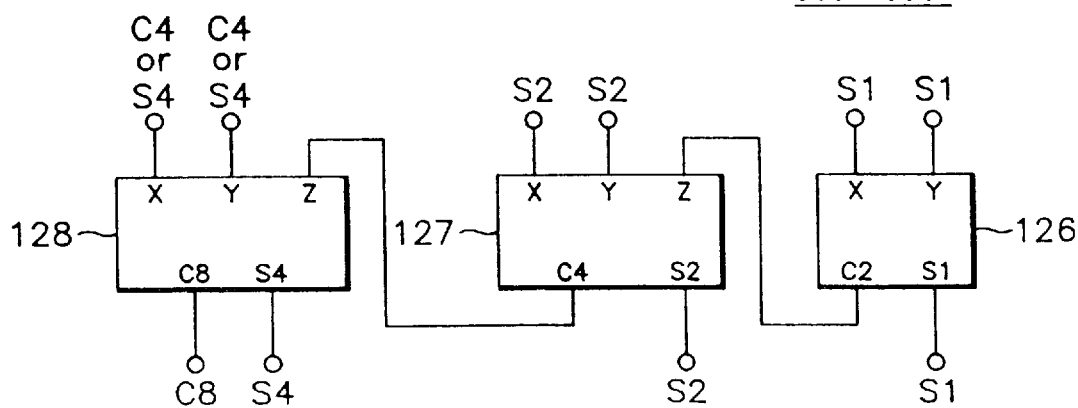
FIG. 20B is a circuit diagram showing configurations of second to fourth adding units in the error detecting unit of FIG. 19.

Error detector 95 can be constituted by a number of circuit components, as shown in FIG. 19. Circuit components 101–108 of a first adding section of FIG. 19 can be constituted by three half-adders 121–123 and a full adder 124, as shown in FIG. 20A. Circuit component 111–117 of second, third and fourth adding sections can be constituted by a half-adder 126 and two full adders 127 and 128, as shown in FIG. 20B.

Referring to FIG. 20A, half-adders 121–122 receive 4 bits of the 32 bits of comparison data from comparator 94. Respective output signals supplied through half-adders 121–122 are applied to input terminals x, y of half-adder 123. Respective carry signals supplied through half-adders 121–123 are applied to input terminals x, y and z of full adder 124.

With the first adding section constituted by the circuit components each having the above described circuit construction shown in FIG. 20A, if all bits of the 4-bit comparison data received are error bits, i.e. at a binary high level, full adder 124 outputs a binary high level signal through a carry terminal C4. Also, if three bits of the 4-bit comparison data are error bits, full adder 124 and half-adder 123 output binary high level signals through output terminals S2 and S1, respectively. When two bits of the 4-bit comparison data are error bits, full adder bit of tuts a binary high level signal, and when one bit of the 4-bit comparison data is an error bit, half-adder 123 outputs a binary high level signal through an output terminal S1. As a result, each of the circuit components 101–108 of the first adding section receives 4-bits of the 32 bits of comparison data. The first adding section then performs an adding function to generate data representing a number of the error comparison data.

Also, circuit components 111–114 of the second adding section receive output signals from circuit components 101–108 and add them based on an adding function to generate data representing the number of the error comparison data. Similarly, circuit components 115–116 of the third adding section receives the output signals from circuit components 111–114 and add them based on an adding function to generate data representing the number of the error comparison data. The fourth adding section 117 also generates data representing the sum of the error comparison data of the 32 bits of comparison data. In this embodiment, if less than four error bits are produced from the 32-bit wordsync data, the wordsync data received is regarded as accurate data.

Hereinafter, the operations of the second, third and fourth adding sections will be described with reference to FIG. 20B.

As shown in FIG. 20B, half-adder 126 receives signals S1 supplied from half-adders in the previous stage and performs an adding function thereon. Full adder 127 receives signals S2 supplied from full adders in the previous stage and a carry signal supplied from half-adder 126 and performs the adding function thereon. Full adder 128 also receives signals S4 supplied from full adders in the previous stage and a carry signal C4 supplied from full adder 127 and performs the adding function thereon.

Thus, circuit component 111 in the second adding section adds the error comparison data from circuit components 101 and 102 of the first adding section. That is, circuit component 111 adds the error comparison data of comparison data E0–E7. Similarly, circuit components 112, 113 and 114 in the second adding section add the error comparison data of the comparison data E8–E15, E16–E23, E24–E31, respectively. If the 8-bit comparison data is then in an error state, full adder 128 outputs a binary high level signal through an output terminal C8. In this embodiment, when less than 4 bits of the 32-bit wordsync signal are error bits, the wordsync signal is regarded as the normal 32-bit wordsync signal. When more than 4 bits of the 32-bit wordsync signal are error bits, it is determined that the wordsync signal is not detected. Thus, if a binary high level signal is generated from output terminal C8 of full adder 128, an error determining section 96 (see FIG. 18) determines whether the received data DT is the wordsync signal based on whether or not it receives a binary high level signal.

In addition, the third adding section receives the output signals from the second adding section and performs the same adding computation as that of the second adding section. Similarly, the fourth adding section receives the output signals from the third adding section and performs the same adding computation as that of the third adding section. In the circuit construction of FIG. 20B, if the error comparison data of more than 8 bits is detected, a binary high level signal is produced from carry terminal C8 of full adder 128. Then, a signal indicative of the error comparison data of more than 4 bits is generated from output terminal S4 of full adder 128, a signal indicative of the error comparison data is of more than 2 bits is generated from output terminal S2 of full adder 127, and a signal indicative of the error comparison data of at least one bit is generated from output terminal S1 of half-adder 126.

Hereinafter, the operation of error determining section 96 will be described with reference to FIG. 21.

Error determining section 96 of FIG. 18 generates wordsync detection signal WSD when the comparison signal received from error detector 95 is less than four bits. When error determining section 96 receives at least one binary high level signal from carry terminals C8 of the second, third and fourth adding sections, wordsync detection signal WSD is not generated. If all of the signals from carry terminals C8 of the second through fourth adding sections are at a binary low level, it is determined by decoding the output signals S1, S2, S4 of fourth adding section 117 whether or not wordsync detection signal WSD is generated.

Figure 21:
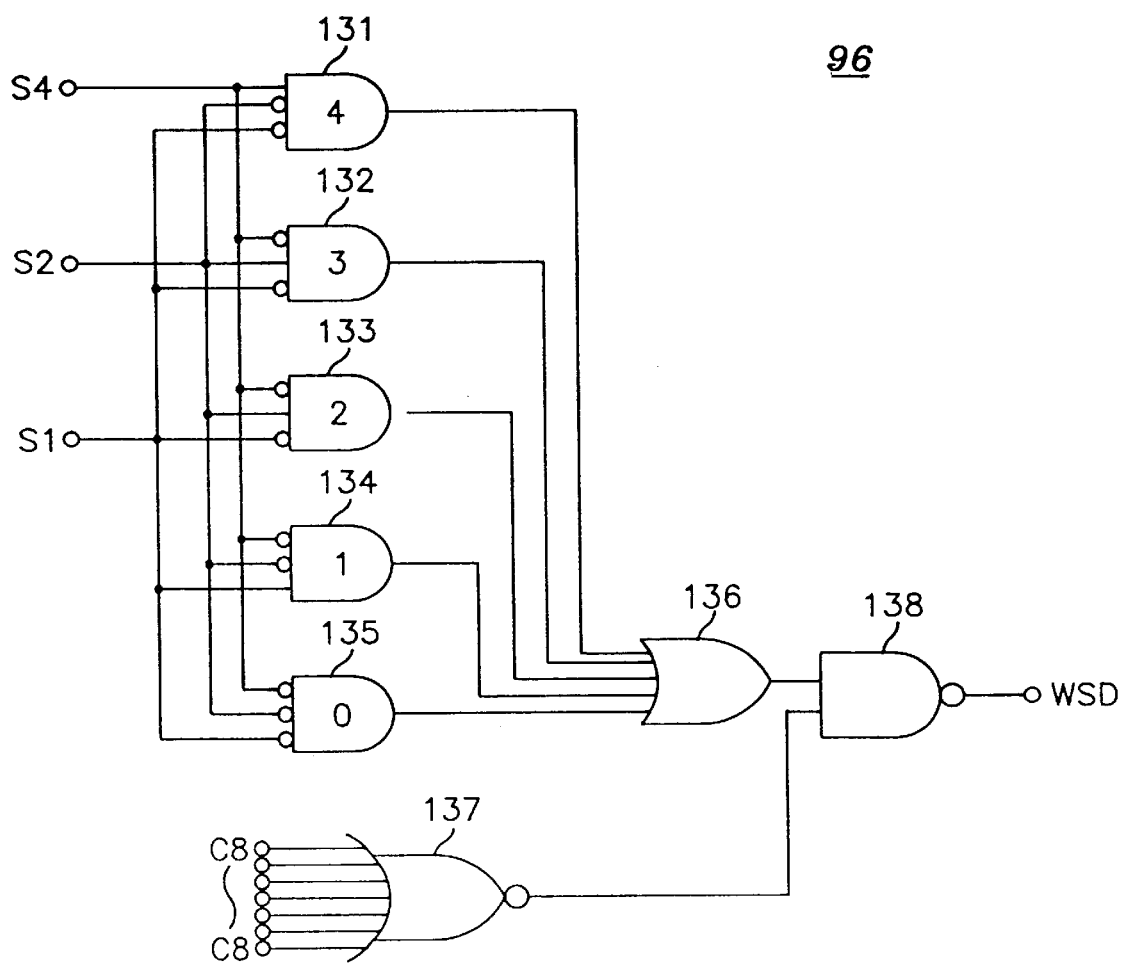
FIG. 21 is a circuit diagram showing a configuration of an error discriminating unit in FIG. 18 for discriminating whether the wordsync detecting signal is generated, and decoding the number of error bits added in the wordsync detector.

Referring to FIG. 21, a NOR gate 137 having seven input terminals receives the output signals C8 from the second, third and fourth adding sections and performs a NOR logic function thereon. If at least one input signal to NOR gate 137 is at a binary high level, NOR gate 137 outputs a binary low level signal. Also, if all the input signals of NOR gate 137 are at a binary low level, NOR gate 137 outputs a binary high level signal.

Decoders 131–135 receive and decode output signals S4, S2, S1 from fourth adding section 117. One decoder of the decoders 131–135 generates a binary high level signal when less than four error bits are detected in the wordsync signal. If more than five error bits are detected, all of the decoders 131–135 output binary low level signals. An OR gate 136 outputs a binary high level signal based on the OR logic function when at least one of the decoders 131–135 outputs a binary high level signal.

Additionally, a NAND gate 138 receives the output signals from OR gate 136 and NOR gate 137 and generates wordsync detection signal WSD at a binary low level indicative of detection of the wordsync signal when the output signals from OR gate 136 and NOR gate 137 are both at a binary high level. Similarly, NAND gate 138 generates the wordsync detection signal WSD at a binary high level indicative of no detection of the wordsync signal when at least one of the output signals from OR gate 136 and NOR gate 137 is at a binary low level.

Accordingly, when the second enable signal EN2 is activated in the wordsync period as shown by 22b of FIG. 22, shift register 92 stores the received data DT in response to first clock signal CK1. If the stored 32-bit wordsync signal is determined to be a normal wordsync signal, error determining section 96 generates the wordsync detection signal WSD shown by 22c of FIG. 22.

In this embodiment of the present invention, the wordsync pattern signal is provided to detect the wordsync signal. The term "wordsync pattern signal" refers to a specific portion of the 32-bit wordsync signal. In the present embodiment it is assumed that the wordsync pattern signal is composed of the first five bits of the wordsync signal, e.g. "01111".

Figure 27A:
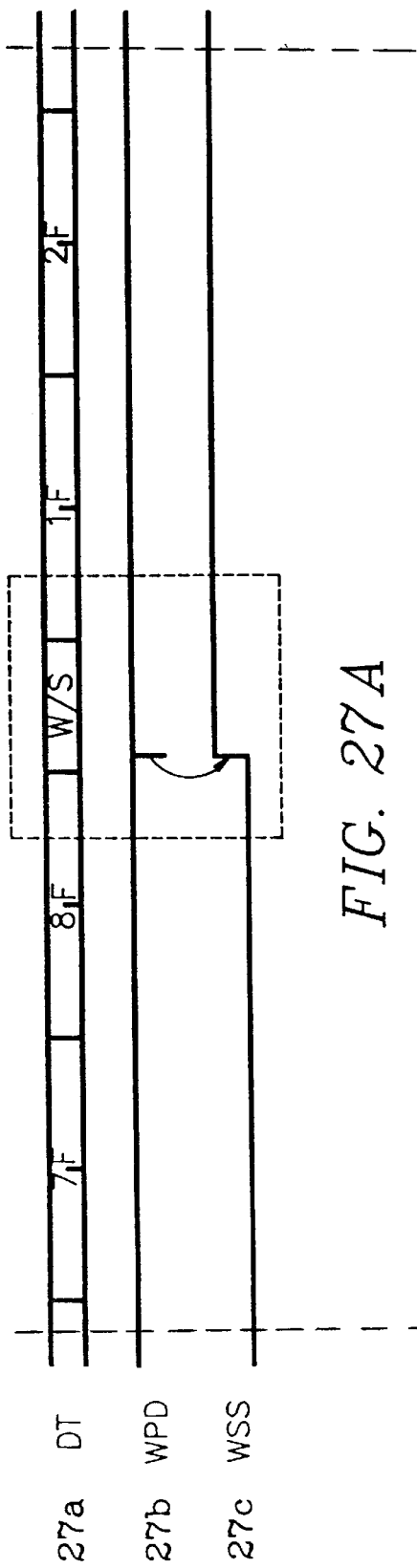
FIGS. 27A and 27B are charts showing timing characteristics of the pattern detector in FIG. 25.
Figure 27B:
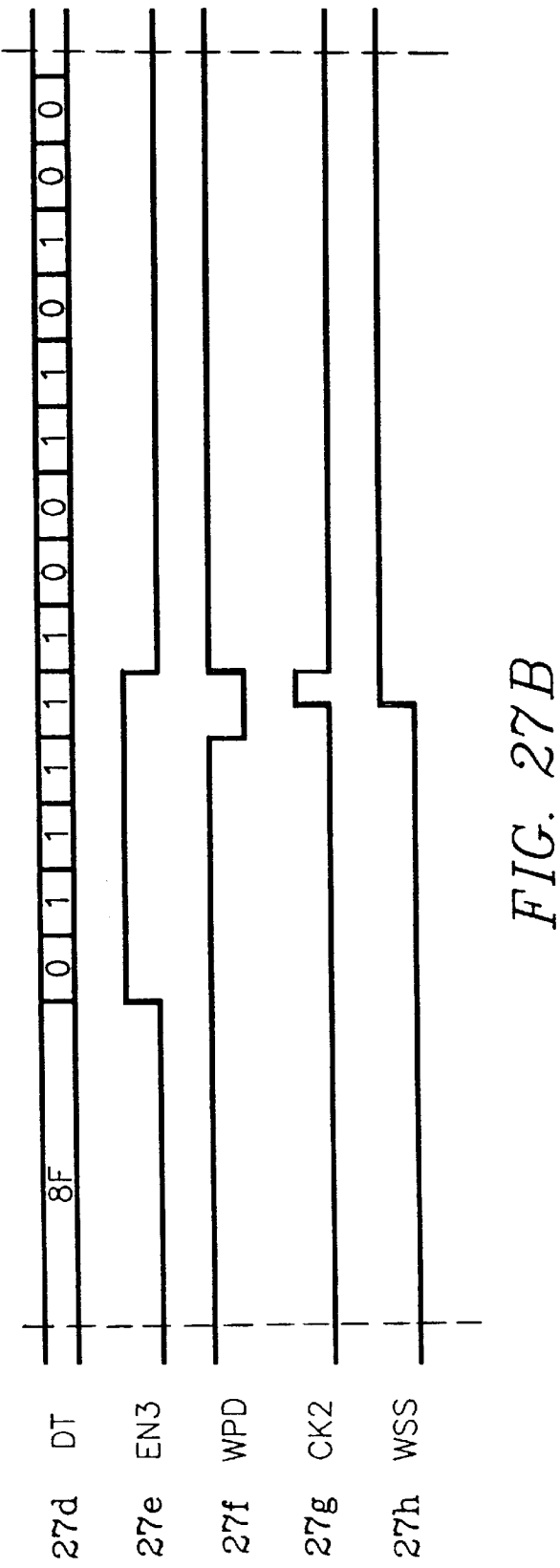

Hereinafter, the operation of detecting the wordsync pattern signal will be described with reference to FIGS. 25, 27A and 27B. 27a through 27h of FIGS. 27A and 27B represent timing characteristics of pattern detector 25 shown in FIG. 25.

Figure 25:
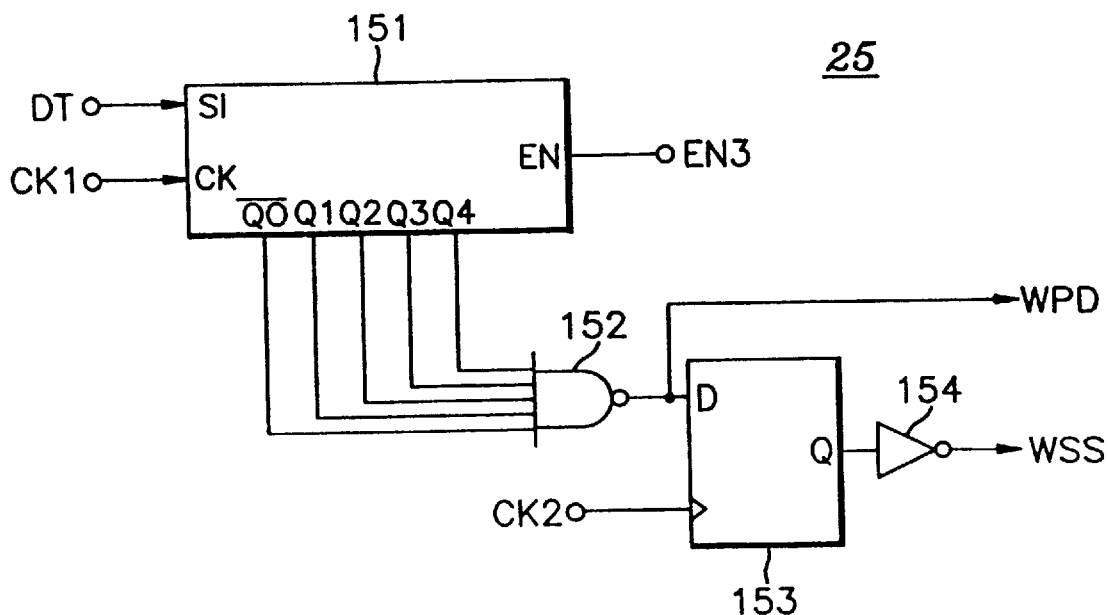
FIG. 25 is a circuit diagram showing a configuration of the pattern detector of the decoding unit in FIG. 4.

In FIG. 25, a shift register 151 is constituted by a 5-bit shift register to accurately detect the wordsync pattern signal comprised of five bits of data. Shift register 151 has an enable terminal EN to which third enable signal EN3 from controller 21 is applied, a serial input terminal SI which is connected with receiving unit 11, and a clock terminal CK which receives first clock signal CK1. Shift register 151 is activated in response to the third enable signal EN3 in the 5-bit period at the beginning of the wordsync period, and is provided to store the data received from receiving unit 11 in response to first clock signal CK1 in the wordsync pattern period set in accordance with the third enable signal EN3. Also, a decoder 152 generates the wordsync pattern detection signal WPD when the wordsync pattern signal is detected based on decoding the received data DT in the wordsync period.

Shift register 151 is enabled by the third enable signal EN3, shown by 27e of FIG. 27B, in the wordsync pattern period. The wordsync pattern period comprises the initial 5-bit period of the wordsync period. Shift register 151 receives the data DT, shown by 27d of FIG. 27B, in the wordsync pattern period and stores it in response to the first clock signal CK1. Decoder 152 decodes the 5 bits of output data Q0–Q4 from shift register 151 and detects when the 5-bits of output data Q0–Q4 represent the wordsync pattern signal, e.g. "01111". If the 5 bits of output data represent the wordsync pattern signal, decoder 152 generates the wordsync pattern detection signal WPD at a binary low level, as shown by 27f of FIG. 27B. If not, decoder 152 generates at a binary high level. Therefore, when the 5 bits of data received in the wordsync pattern period at the starting position of the wordsync period represent the wordsync pattern data, decoder 152 generates the wordsync pattern detection signal WPD. When the 5 bits of data do not represent the wordsync pattern data, decoder 152 does not generate the wordsync pattern detection signal WPD.

A flip-flop 153 latches the output signal from decoder 152 through an input terminal D in response to the second clock signal CK2, shown by 27g of FIG. 27B, received from wordsync period controlling unit 31. An inverter 154 inverts the output signal of flip-flop 153 to output an inverted signal as the wordsync selection signal WSS. Therefore, the wordsync selection signal WSS is at a binary high level, as shown by 27h of FIG. 27B, when the wordsync pattern signal is detected in the wordsync pattern period, and the wordsync selection signal WSS is at a binary low level when the wordsync pattern signal is not detected in the wordsync pattern period. The wordsync selection signal WSS is delayed during the remaining bits of the wordsync period upon generation of the wordsync pattern detection signal WPD, and is provided to match the word. This operation will now be described with reference to FIG. 26.

As described above, pattern detector 25 decodes data DT, shown by 27a of FIG. 27A, received during the wordsync pattern period of the wordsync period and detects the wordsync signal based on the decoding results, so that the wordsync selection signal WSS, shown by 27c of FIG. 27, and the wordsync pattern detection signal WPD, shown by 27b of FIG. 27A, can be generated at the same time.

Figure 23:
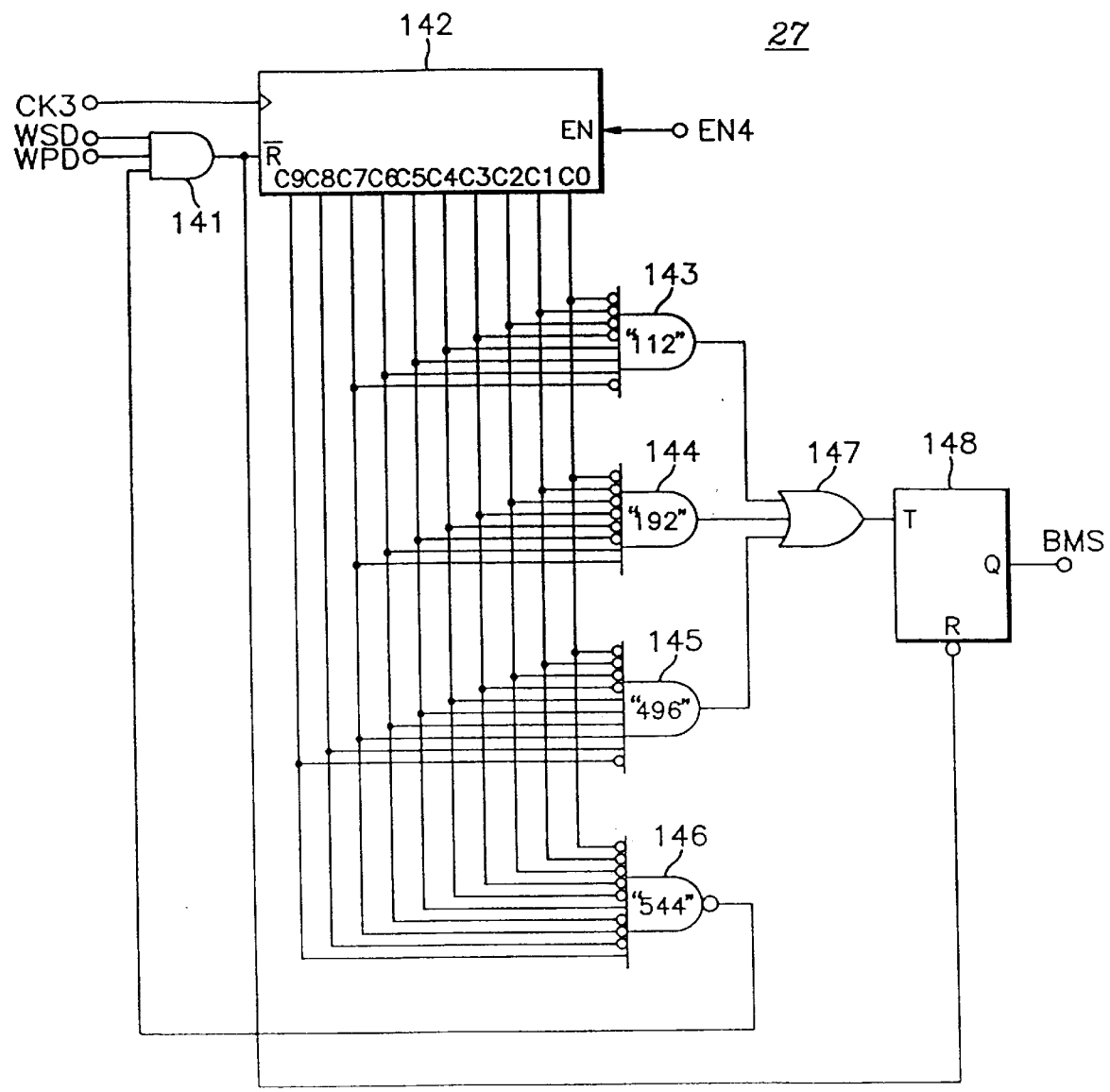
FIG. 23 is a circuit diagram showing a configuration of the batch mode executing unit for controlling the battery supply in the batch mode of the decoding unit of FIG. 4.
Figure 24:
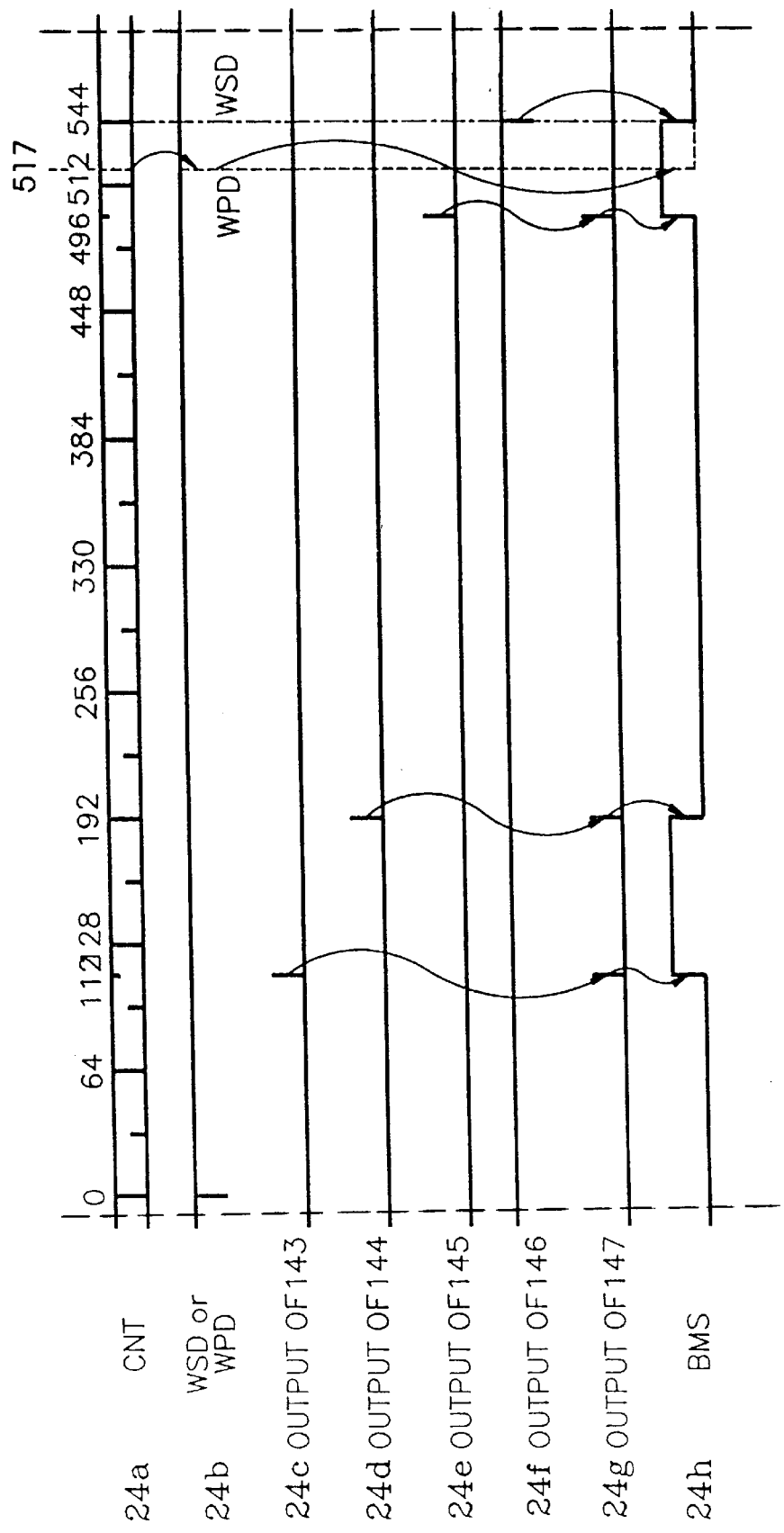
FIG. 24 is a chart showing timing characteristics of the batch mode executing unit of FIG. 23.

Hereinafter, the operation of generating the second battery supply signal BSS2 during the batch mode will be described with reference to FIGS. 23 and 24. 24a through 24h of FIG. 24 represent timing characteristics of batch mode executing unit 27 shown in FIG. 23.

Batch mode executing unit 27 of FIGS. 4 and 23 enables generation of the second battery supply signal BSS2 during the frame and wordsync periods. Thus, batch mode executing unit 27 performs the counting operation for the batch period in synchronization with the wordsync detection signal WSD, the wordsync pattern detection signal WPD, or the batch period signal during the batch mode to enable generation of the second battery supply signal BSS2 during the frame and wordsync periods. The second battery supply signal BSS2 is actually generated prior to the frame period or the wordsync period to accurately detect the frame data and the wordsync signal. In this embodiment, it is assumed that the second battery supply signal BSS2 is generated 16 bits prior to the beginning of the wordsync period and the frame period, which is set as the 3rd frame of data.

As shown by 2d and 2e of FIG. 2, the wordsync signal is comprised of 32 bits of data, and the frame signal is comprised of 64 bits data including a 32-bit address code word and a 32-bit message code word. The wordsync signal is provided to match the word of the corresponding batch of data, and the address code word is provided to evaluate received paging information. In the present invention, a repeated operation is performed wherein reception of a batch of data is synchronized using the wordsync detection signal WSD or the wordsync pattern detection signal WPD detected previously, the frame signal is detected during the set frame period, and then the wordsync detection signal WSD or the wordsync pattern signal WPD is detected during the wordsync period for the next batch of data. Thus, count data from a counter 142 (see FIG. 23) is decoded in a manner such that the operation of detecting a 1st frame period through an 8th frame period is carried out. The final period following the frame periods is used as the wordsync period of the next batch of data. Therefore, because one batch of data is comprised of 544 bits (8 frames*64 bits+32 bits of the wordsync signal=544 bits), the frame and wordsync periods can be determined from the above described batch data using the count data from counter 142. The count data of counter 142 may be described as follows:

| frame period | count data | power control period | remarks |
| --- | --- | --- | --- |
| 1st | 0–63 | 0–64 | |
| 2nd | 64–127 | 48–128 | |
| 3rd | 128–191 | 112–192 | (set frame period) |
| 4th | 192–255 | 176–256 | |
| 5th | 256–319 | 240–320 | |
| 6th | 320–383 | 304–384 | |
| 7th | 384–447 | 368–448 | |
| 8th | 448–511 | 430–512 | |
| wordsync | 512–543 | 496–544 | (wordsync period of period of next batch) |

Counter 142 for generating the above count data is enabled in response to the fourth enable signal EN4 from controller 21, and is reset by the wordsync detection signal WSD, the wordsync pattern detection signal WPD and a batch period termination signal received through an AND gate 141. That is, counter 142 is controlled by the fourth enable signal EN4 which is always maintained at an active state during the batch mode. When the wordsync detection signal WSD or wordsync pattern detection signal is WPD is received, counter 142 is reset in synchronization with the frame word to detect the frame of the next batch period before the counting operation of counter 142 is again performed. Also, during the batch mode, when the wordsync detection signal WSD or the wordsync pattern detection signal WPD is not received after termination of the counting operation of a corresponding batch period, a decoder 146 outputs the batch period termination signal, which is a counting termination signal for the batch period. Then, counter 142 is reset to generate the count data for the next batch.

As described above, counter 142 is reset in response to three signals. When the wordsync pattern signal WPD is generated, the counting operation of counter 142 is again performed at the terminating position of the wordsync pattern period. In this case, the count data from counter 142 is output 27 bits before the terminating position of the wordsync period. Synchronization of the count data is compensated in delaying unit 28 having the circuit construction shown in FIG. 26.

Also, when the wordsync detection signal WSD is generated, the counting operation of counter 142 is again performed at the terminating position of the wordsync period. In this case, because counter 142 again counts the frame period for the next batch at the terminating position of the wordsync period, an additional delaying operation is not necessary for synchronizing the word with respect to the next frame signal. Synchronization of the counted data is compensated in delaying unit 28 having the circuit construction shown in FIG. 26.

In addition, when neither the wordsync detection signal WSD nor the wordsync pattern detection signal WPD is generated, counter 142 is reset in response to the output signal of decoder 146 to start the counting operation. For example, even if the wordsync detection signal WSD and the wordsync pattern detection signal WPD are not detected during the batch mode, the invention normally executes the batch mode based on the battery supply signal obtained in the wordsync period and the frame period to process the paging information.

The count data from counter 142 is incremented in response to third clock signal CK3, and decoders 143–146 receive the count data to detect various preset values. Herein, decoders 143 and 144 are provided to detect the preset frame period for the paging receiver. In particular, decoder 143 detects the starting position of the preset frame period, and decoder 144 detects the terminating position of the preset frame period. In this embodiment, since it is assumed that the preset frame period is the third frame period, decoder 143 detects the counted value 16 bits before the starting position of the preset frame period. The third frame period of the respective batch period is between bit 128 and bit 192, as shown by 24a of FIG. 24, but the battery supply signal BSS is provided at bit 112 which is 16 bits before the starting position of the preset frame period. Therefore, when decoder 143 detects a value of 112 from the count data, as shown by 24a of FIG. 24, decoder 143 outputs a binary high level signal, as shown by 24c of FIG. 24. An OR gate 147 receives the output signals from decoders 143–145 and outputs a binary high level signal, as shown by 24g of FIG. 24. A flip-flop 148 is toggled by the output signal of OR gate 147 to generate a binary high level signal, shown by 24h of FIG. 24, as a batch mode signal BMS. The batch mode signal BMS is maintained until decoder 144 detects the terminating position of the preset frame period. That is, decoder 144 receives the count data, shown by 24a of FIG. 24, decodes the count data, and generates a binary high level signal, shown by 24d of FIG. 24, when the count data represents a value of 192. OR gate 147 also outputs a binary high level signal, as shown by 24g of FIG. 24, and then the output of flip-flop 148 is changed to a binary low level signal, as shown by 24h of FIG. 24. Also, flip-flop 148 is toggled by the output of decoder 143 to generate a binary high level signal, and flip-flop 148 is toggled by the output of decoder 144 to generate a binary low level signal. Therefore, the batch mode signal BMS, which is necessary for enabling generation of the second battery supply signal BSS2, is generated by flip-flop 148 during the preset frame period.

After generation of the batch mode signal BMS, shown by 24*h* of FIG. 24, during the preset frame period described above, batch mode signal BMS is also generated during the wordsync period. Decoder 145 detects the starting position of the wordsync period based on decoding the count data, shown by 24*a* of FIG. 24. The starting position of the wordsync period is bit 512 of the count data, but decoder 145 outputs a decoded signal at bit 496 which is 16 bits before bit 512. Decoder 145 also outputs a binary high level signal, shown by 24*e* of FIG. 24, when the count data represents a value of 496. Then, OR gate 147 outputs a binary high level signal, as shown by 24*g* of FIG. 24, and flip-flop 148 is toggled by the output of decoder 145 to generate the batch mode signal BMS at a binary high level at the starting position of the wordsync period, as shown by 24*h* of FIG. 24.

There are three cases where, after transition of the batch mode signal BMS to a binary high level in the wordsync period, the batch mode signal BMS is again changed to a binary low level. First, in the case where the wordsync pattern detection signal WPD is received, counter 142 is reset to enable the counting operation to be performed. Thus, the batch mode signal BMS to be generated during the wordsync period is enabled only in the 21-bit period corresponding to the period between bit 496 and bit 519 of the wordsync period. The batch mode signal BMS is generated at a position 27 bits before the terminating position of the wordsync period, and is delayed by delaying unit 28 to be generated as the second battery supply signal BSS2. Secondly, in the case where the wordsync detection signal WSD is received, counter 142 is reset and is able to restart the counting operation. Thus, the batch mode signal BMS is enabled for the 48-bit period corresponding to the period between bit 496 and bit 543 of the wordsync period. Finally, in the case where neither the wordsync pattern detection signal WPD nor the wordsync detection signal WSD is received, counter 142 is reset and is able to restart the counting operation in response to the output of decoder 146. Decoder 146 outputs a signal indicative of the terminating position of the final frame period of the batch period, which is the starting position of the wordsync period for the next batch of data. Therefore, even though the normal wordsync signal is not detected by decoder 146, the output of decoder 146 is used as a pseudo wordsync detection signal. It can be understood that the termination signal for the wordsync period is generated as the three types of signals described above.

Batch mode executing unit 27 of FIGS. 4 and 23 is provided to continuously carry out the batch mode operation if the batch mode is not changed to the idle mode by disabling the fourth enable signal EN4.

When the batch mode signal BMS is generated from the wordsync pattern detection signal WPD, it is processed in a manner different from when it is generated from the wordsync detection signal WSD. In the former case, batch mode signal BMS is delayed by 27 bits to be generated as the second battery supply signal BSS2. In the latter case, batch mode signal BMS is not delayed but instead is directly generated as the second battery supply signal BSS2. Also, even though the wordsync pattern detection signal WPD and the wordsync detection signal WSD are not generated, batch mode signal BMS is directly generated as the second battery supply signal BSS2.

Figure 26:
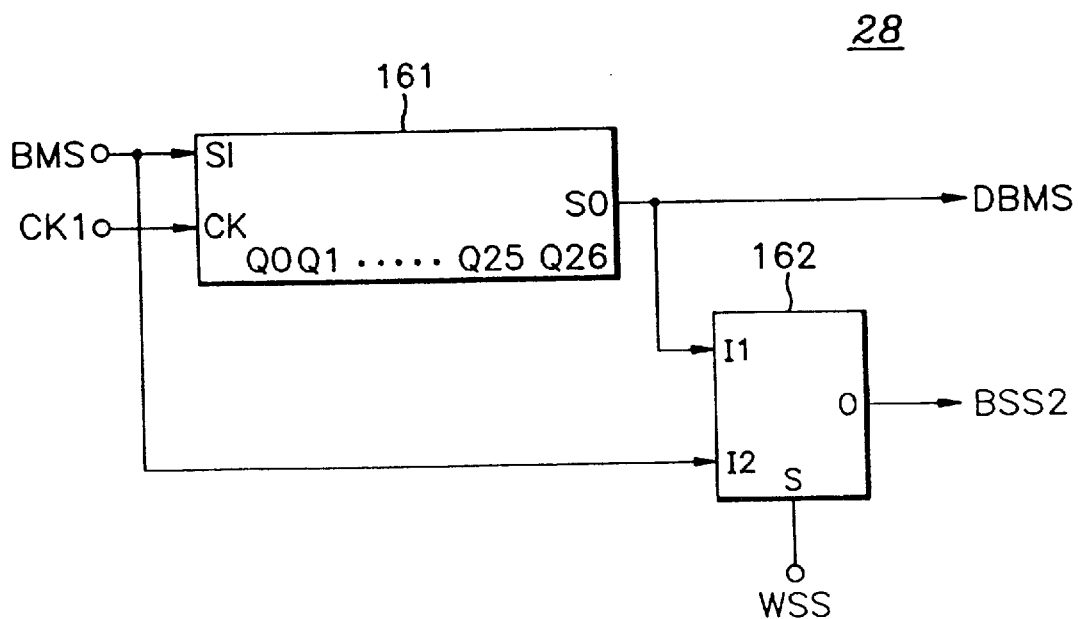
FIG. 26 is a circuit diagram showing a configuration of the delaying unit which delays the output of the batch mode executing unit until the terminating position of the wordsync period in order to synchronize the frame data.
Figure 30A:
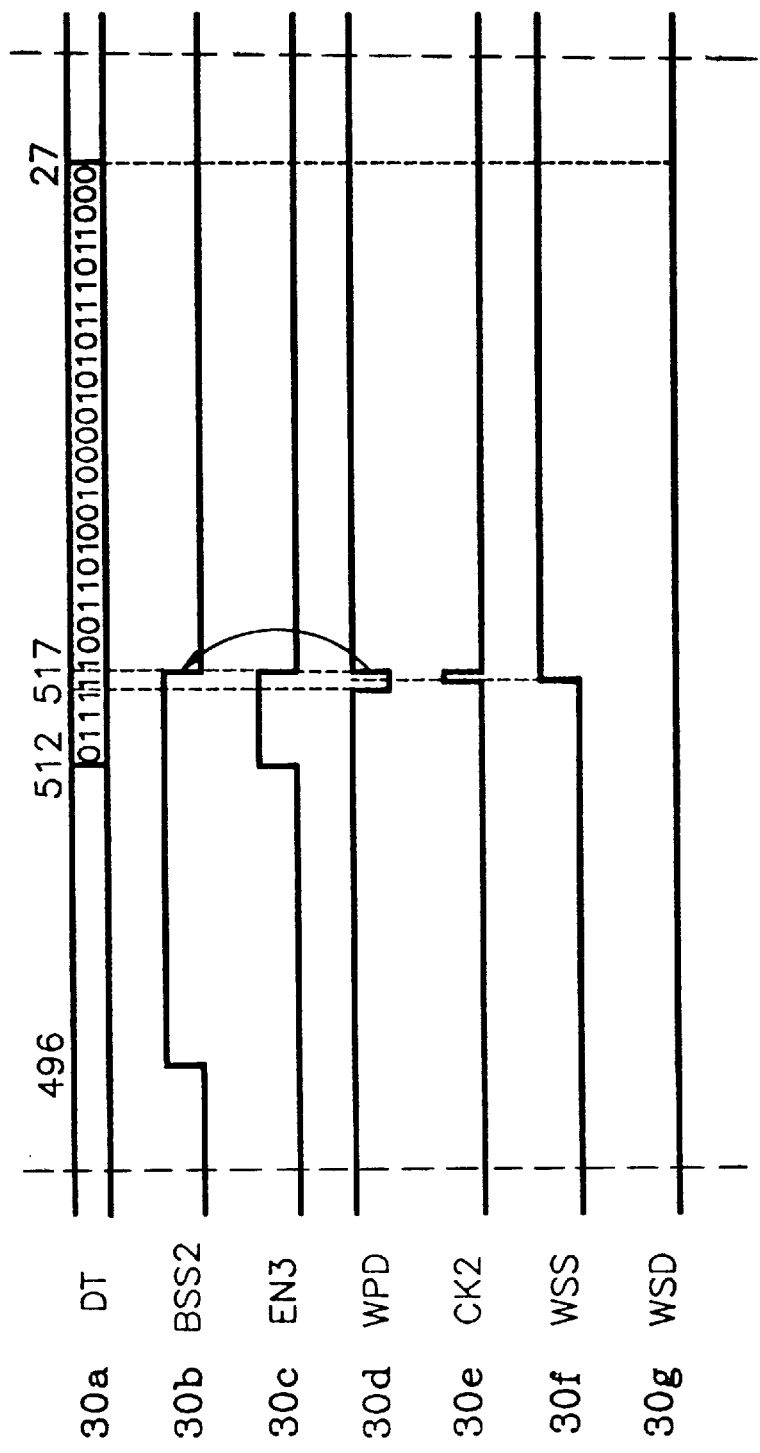

With reference to FIGS. 26, 30A and 30B, the delay operation performed by delaying unit 28 will be described hereinafter. 30*a* through 30*n* of FIGS. 30A and 30B represent timing characteristics for detecting wordsync data according to the principles of the present invention.

Delaying unit 28 delays the batch mode signal BMS generated by batch mode executing unit 27 and generates the delayed batch mode signal DBMS. Delaying unit 28 also selects either the delayed batch mode signal DBMS or the batch mode signal BMS in response to the wordsync selection signal WSS, to generate the selected signal as the second battery supply signal BSS2. In this embodiment, since it is assumed that the wordsync pattern signal is comprised of five bits, the actual terminating position of the wordsync period occurs 27 bits after these 5 bits.

Therefore, a shift register 161 is constituted by a 27-bit shift register and the output thereof is the delayed batch mode signal DBMS. Shift register 161 receives the batch mode signal BMS through a serial input terminal SI, and stores the batch mode signal BMS in response to the first clock signal CK1. Thus, the data from a serial output terminal SO of shift register 161 is the delayed batch mode signal DBMS comprised of the batch mode signal BMS delayed by 27 bits. As described above, the delayed batch mode signal DBMS is synchronized with the starting position of the first frame period following the terminating position of the wordsync period for the corresponding batch period.

In FIG. 26, a multiplexer 162 has a first input terminal for receiving the delayed batch mode signal DBMS and a second input terminal for receiving the batch mode signal BMS, and selects either the delayed batch mode signal DBMS or the batch mode signal BMS in response to the wordsync selection signal WSS. In particular, multiplexer 162 selects the delayed batch mode signal DBMS as the second battery supply signal BSS2 when the wordsync pattern data is detected, and selects the batch mode signal BMS as the second battery supply signal BSS2 when the wordsync data is detected or when the wordsync pattern data and the wordsync data are not detected.

With reference to FIG. 30A, the operation of generating the wordsync pattern detection signal WPD will now be described in detail.

When the data DT, shown by 30*a* of FIG. 30A, is received, batch mode executing unit 27 generates the batch mode signal BMS at a position 16 bits before the starting position of the wordsync period. Then, if the wordsync selection signal WSS is at a binary low level, as shown by 30*f* of FIG. 30A, multiplexer 162 selects the batch mode signal BMS through the second input terminal, as the second battery supply signal BSS2. Thus, the second battery supply signal BSS2 is generated at a binary high level.

Wordsync period controlling unit 31 of controller 21 outputs the third enable signal EN3, shown by 30*c* of FIG. 30A, at a binary high level at the starting position (bit 512) of the wordsync period and is maintained at the binary high level during the wordsync pattern period. Then, pattern detector 25 latches the wordsync pattern detection signal WPD in response to the second clock signal CK2, shown by 30*e* of FIG. 30A, and generates the wordsync selection signal WSS, shown by 30*f* of FIG. 30A. If the wordsync pattern detection signal WPD is generated, counter 142 of batch mode executing unit 27 is reset and restarts the counting operation. Therefore, the batch mode signal BMS generated from the batch mode execution unit 27 is changed to a binary low level, and multiplexer 162 enables the second battery supply signal BSS2 to be deactivated, as shown by 30*b* of FIG. 30A, based on the transition of the batch mode signal BSM. At the same time, receiving unit 11 is in an OFF state since the second battery supply signal BSS2 is deactivated during the wordsync period. Therefore, the data DT is not received, as shown by 30*a* of FIG. 30A.

On the other hand, if the wordsync pattern signal is detected, the operating power supplied to receiving unit 11 is interrupted, and thus the data DT is not analyzed in the wordsync period. Then, since wordsync detector 23 does not receive the data DT from receiving unit 11, the wordsync detection signal WSD is not generated therefrom until the wordsync period is terminated, as shown by 30g of FIG. 30A. Also, since counter 142 of the batch mode executing unit 27 can not perform the counting operation up to bit 544, the output of decoder 146 is not generated.

Multiplexer 162 of delaying unit 28 selects the delayed batch mode signal DBMS as the second battery supply signal BSS2 in response to generation of the wordsync selection signal WSS at a binary high level. This is because the wordsync pattern detection signal WPD is generated at a position 27 bits before the wordsync detection signal WSD, so as to be in synchronization with the word. Shift register 161 stores the batch mode signal BMS in response to the first clock signal CK1, and after providing a delay of 27 bits, outputs the delayed batch mode signal DBMS through output terminal SO to be applied to the first input terminal of multiplexer 162. Then, the wordsync selection signal WSS is activated to a binary high level, as shown by 30f of FIG. 30A, and thus multiplexer 162 selects the delayed batch mode signal DBMS as the second battery supply signal BSS2. The delayed batch mode signal DBMS from shift register 161 is generated at the starting position of the first frame period after completion of the wordsync period.

With reference to FIG. 30B, the operation of generating the wordsync detection signal WSD will now be described in detail.

If the data DT, shown by 30h of FIG. 30B, is received, batch mode executing unit 27 generates the batch mode signal BMS at the position 16 bits before the starting position (bit 512) of the wordsync period. Then, when the wordsync selection signal WSS is at a binary low level, as shown by 30m of FIG. 30B, multiplexer 162 selects the batch mode signal BMS received through the second input terminal and outputs it as the second battery supply signal BSS2. Thus, second battery supply signal BSS2 is generated at a binary high level, as shown by 30i of FIG. 30B.

Wordsync period controlling unit 31 of the controller 21 outputs the third enable signal EN3, shown by 30j of FIG. 30B, at a binary high level at the starting position (bit 512) of the wordsync period and maintains the third enable signal EN3 at the binary high level during the wordsync pattern period. Pattern detector 25 detects the wordsync pattern signal based on the data DT received during the wordsync pattern period. If the normal wordsync pattern signal is not detected due to data errors contained in the wordsync signal, pattern detector 25 does not generate the wordsync pattern detection signal WPD at a low logic level, during the wordsync pattern period, as by 30k of FIG. 30B. In this case, pattern detector 25 latches the high logic level from decoder 152 in response to the second clock signal CK2, shown by 301 of FIG. 30B, and generates the wordsync selection signal WSS at a binary low level, as shown by 30m of FIG. 30B. If the wordsync pattern detection signal WPD is not generated, counter 142 of the batch mode executing unit 27 continuously generates count data. Therefore, the batch mode signal BMS from the batch mode execution unit 27 is maintained even though the wordsync pattern period is completed, as shown by 30j of FIG. 30B, and multiplexer 162 selects the batch mode signal BMS in response to the wordsync selection signal WSS, as shown by 30m of FIG. 30B, and generates the batch mode signal BMS as the second battery supply signal BSS2.

Therefore, the receiving unit 11 is supplied with operational power during the wordsync period, and wordsync detector 23 analyzes the 32 bits of data DT received from the receiving unit 11. Then, when the wordsync signal and less than four error bits are generated from the data received in the wordsync period, wordsync detector 23 determines that the data is the wordsync signal and generates the wordsync detection signal WSD.

Therefore, even though the wordsync pattern signal has an error bit, the wordsync detection signal WSD is generated when less than four error bits are detected. If the wordsync detector 23 generates the wordsync detection signal WSD, as shown by 30n of FIG. 30B, batch mode executing unit 27 enables the batch mode signal BMS to be changed to a binary low level. Then, delaying unit 28 outputs the batch mode signal BMS as the second battery supply signal BSS2, and thus the second battery supply signal BSS2 represents an OFF state at the starting position of the first frame after completion of the wordsync period, as shown by 30i of FIG. 30B.

Also, if the wordsync pattern detection signal WPD and the wordsync selection signal WSD are not received, batch mode executing unit 27 generates the batch mode signal BMS which is reset at the terminating position of the batch period by means of decoder 146. In this case, processing is performed in the same manner as the operation described above for generating the wordsync detection signal WSD.

The present invention can supply battery power when the batch mode of the paging receiver is executed, and can serve the paging function during the batch mode even though the wordsync signal comprises an error signal. In the present invention, after detection of the 32-bit wordsync signal at the first batch of data in the batch mode, the preset frame signal is detected. Next, the wordsync pattern signal is detected between the second batch of data and the final batch of data to match the word, and then the preset frame signal is detected. One POCSAG code received from the paging receiver is comprised of several batches of data, and thus power can be preserved based on controlling the battery supply signal in the wordsync period of each batch.

Hereinafter, the battery saving operation in accordance with the principles of the present invention will be described with reference to FIGS. 28 and 29. 28a through 28h of FIG. 28 represent timing characteristics when controlling the battery supply in the batch mode of the present invention. In this embodiment, it is assumed that the data DT, shown by 28a of FIG. 28, is received.

Controller 21 determines that pattern detector 25 is not to be activated for a first batch of data after detection of the preamble signal. This is because, after detection of the preamble signal, it can not be determined that the wordsync signal exists at any position. Thus, wordsync detector 23 is activated for the first batch of data, and controller 21 generates fourth enable signal EN4 for enabling the batch mode to be activated. The operation is performed to generate the second battery supply signal BSS2 in the wordsync and preset frame periods in accordance with activation of the batch mode executing unit 27. In particular, batch mode executing unit 27 is reset when the wordsync detection signal WSD is generated, and generates the batch mode signal BMS, shown by 28e of FIG. 28, during the preset frame period based on the counting operation. Delaying unit 28 then selects the batch mode signal BMS from batch mode executing unit 27 and generates the batch mode signal BMS as the second battery supply signal BSS2, shown by 28h of FIG. 28.

As described above, when the batch mode is executed, controller 21 generates the word pattern period signal for the second batch of data. Pattern detector 25 then analyzes the data DT received from the starting position of the wordsync period through the wordsync pattern period. If the data DT is the wordsync pattern signal, pattern detector 25 generates the wordsync pattern signal WPD, as shown by 28b of FIG. 28. Then, batch mode executing unit 27 is reset to generate the batch mode signal BMS, as shown by 28e of FIG. 28. Since the wordsync selection signal WSS is then maintained at a binary low level, delaying unit 28 selects the batch mode signal BMS, shown by 28e of FIG. 28, and generates the batch mode signal as the second battery supply signal BSS2. Therefore, delaying unit 28 selects the batch mode signal BMS as the second battery supply signal BSS2.

With reference to 29a and 29b of FIG. 29, in the batch mode of the paging receiver constructed according to the principles of the present invention, if the POCSAG code is received, as shown by 29a of FIG. 29, the second battery supply signal BSS2 is blocked in the wordsync period to save battery power when the wordsync pattern signal is detected, and the battery power is provided normally during the preset frame period, as shown by 29b of FIG. 29.

Therefore, when one frame signal is detected, the power source must be provided so that three words, i.e. the 32-bit wordsync signal, the 32-bit address code word of the preset frame and the 32-bit message code word of the preset frame, can be detected. Herein, if the wordsync pattern signal is comprised of five bits, it is necessary to provide the power source to detect five bits and two words, i.e. 5-bit wordsync pattern signal, 32-bit message code word of the preset frame and the 32-bit address code word of the preset frame. Therefore, the power source to be supplied during the 27-bit period with respect to each batch of data can be saved. For example, a power savings of about 28.1% can be achieved for one batch of data. When the above described power saving function is used in the paging receiver of the present invention, only the data of the wordsync pattern period must be accurately analyzed at the starting position of the wordsync period. In cases where the wordsync pattern signal is not detected in the wordsync pattern period, synchronization is achieved based on analysis of the 32-bit wordsync signal. As described above, since one POCSAG code has between 30 and 60 batches of data, it can be seen that the paging receiver of the present invention has an effect of providing substantial battery savings when the batch mode is performed.

Figure 31:
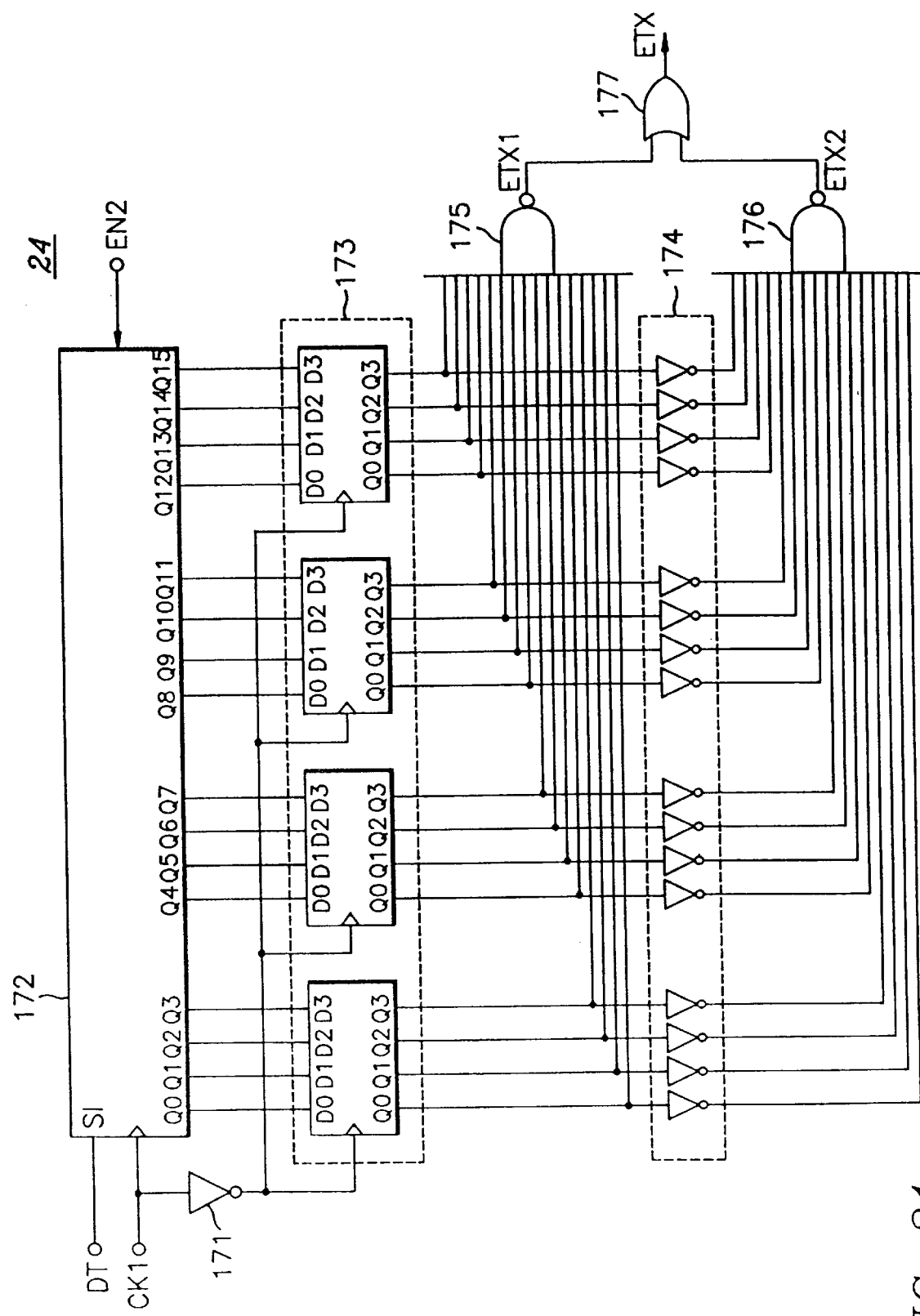
FIG. 31 is a circuit diagram showing a configuration of the transmission-terminating detector which detects whether data indicating a termination of data transmission is received at every wordsync period in the decoding unit of FIG. 4.

Operation of transmission-termination detector 24 will now be described with reference to FIG. 31 and FIGS. 32A through 32C. 32a through 32k of FIGS. 32A through 32C represent timing characteristics of transmission-termination detector 24 shown in FIG. 31. Transmission-termination detector 24 is operated by second enable signal EN2 which is activated in the wordsync period. Transmission-termination detector 24 analyzes the received data and generates the transmission-termination signal ETX after detecting the transmission-termination data. A shift register 172 is 16-bit shift register which is enabled by the second enable signal EN2 and stores the received data DT in accordance with a first clock signal CK1.

With a POCSAG code, data represented as binary 0's or 1's are successively transmitted as the transmission-termination data. In the present invention, when binary 0's or 1's are successively received over 16-bits in the wordsync period, transmission-termination detector 24 determines that the transmission-termination data is received and generates the transmission-termination signal ETX. Accordingly, shift register 172, which is a 16-bit shift register, is enabled by the received second enable signal EN2, as shown by 32b of FIG. 32A, stores the received data DT in the wordsync period according to the first clock signal CK1, and generates the transmission-termination signal ETX, as shown by 32c of FIG. 32A, when binary 0's or binary 1's are successively detected over a 16-bit period First, the procedure of generating the transmission-termination signal ETX by receiving a successive string of binary 0's will be described with reference to FIG. 32B.

If the data DT, as shown by 32d of FIG. 32B, is received in the wordsync period, shift register 172 stores the received data DT and a latch 173 latches 16-bit data output through the parallel output stage of shift register 172 in accordance with an inverted first clock signal CK1 provided by an inverter 171. A group of inverters 174 inverts the outputs of latch 173, and provides the inverted outputs to a decoder 176. In cases where the data DT is a successive string of binary 0's, the 16-bit data applied to decoder 176 is converted to a binary high level so that the second transmission-termination signal ETX2 is generated, as shown by 32e of FIG. 32B. Then, an OR gate 177 generates the transmission-termination signal ETX, as shown by 32g of FIG. 32B, based on the second transmission-termination signal ETX2.

Next, the procedure of generating the transmission-termination signal ETX by receiving a successive string of binary 1's will be described with reference to FIG. 32C.

If the data DT, as shown by 32h of FIG. 32C, is received in the wordsync period, shift register 172 stores the received data DT and latch 173 latches 16-bit data which is output through the parallel output stage of shift register 172 in accordance with the inverted first clock signal CK1 provided by inverter 171. In cases where the data DT is a successive string of binary 1's, 16-bit data applied to a decoder 175 is maintained at a binary high level so that the first transmission-termination signal ETX1 is generated, as shown by 32j of FIG. 32C. Then, OR gate 177 generates the transmission-termination signal ETX, as shown by 32k of FIG. 32C, based on the first transmission-termination signal ETX1.

The battery power control procedure for the paging receiver constructed according to the principles of the present invention will now be described with reference to FIG. 33 and FIGS. 34A through 34H. 34a through 34p of FIGS. 34A through 34H represent timing characteristics of the battery power control procedure. As described above, the idle mode refers to a mode of operation where in a period of 576 bits, the battery supply signal BSS is turned on for a period of 64 bits, the battery supply signal BSS is turned off for a period of 512 bits, and the preamble data is searched for. The batch mode refers to a mode of operation where in a batch period of 544 bits, the battery supply signal BSS is turned on in the wordsync period and the preset frame period, the battery supply signal BSS is turned off in remnant frame periods, and the preset frame data is searched for.

First, controller 21 activates the fifth enable signal EN5 to enable idle mode executing unit 26, and activates the first enable signal EN1 to enable preamble detector 22. In response, idle mode executing unit 26 executes step 311 through step 315 to generate the battery supply signal BSS in the idle mode until the preamble data detection signal PAD is generated. Thus, the idle mode executing unit 26 enables generation of the battery supply signal BSS in order to detect the preamble data in the idle mode where the fifth enable signal EN5 is activated. Receiving unit 11 receives the operational power for the period of 64 bits where the battery supply signal BSS is turned on, converts paging information into digital data, and outputs the converted digital data. Preamble detector 22 analyzes the data received from receiving unit 11 and detects whether or not the preamble data is received. The preamble data consists of 576 bits of a reversal code having a constant format. Accordingly, if preamble detector 22 detects only a portion of the 576 bits of preamble data, it determines that the preamble data is received. Therefore, the operation is repeatedly performed wherein the idle mode executing unit 26 turns on the battery supply signal BSS for a period of 64 bits, in step 311, and turns off the battery supply signal BSS for a period of 512 bits, in step 315, until the preamble data is detected in the idle mode, in step 313.

At this instant, if preamble detector 22 generates the preamble detection signal PAD, controller 21 recognizes the detection of the preamble data and determines whether or not the wordsync data is received, in step 317.

The procedure of executing the batch mode after receiving the preamble detection signal PAD will be described with reference to FIG. 34A. If the preamble detection signal PAD is generated, controller 21 recognizes this condition and activates second enable signal EN2.

At this time, the second enable signal EN2 is maintained during the period of performing the logical AND function on the fifth enable signal EN5 and the seventh enable signal EN7. The seventh enable signal EN7 is activated for the period of 576 bits in generating the preamble detection signal PAD. Also, idle mode executing unit 26 turns the battery supply signal BSS on during the period of performing the logical AND function on the fifth enable signal EN5 and the seventh enable signal EN7, as shown by 34*b* of FIG. 34A. The battery supply signal BSS is turned on for a maximum period of 576 bits and the wordsync data is detected via wordsync detector 23 during the supply of operational power in this manner, because it can not be known that the preamble detection signal PAD is detected at any position of the preamble data of 576 bits. Accordingly, if the preamble detection signal PAD is generated, controller 21 controls idle mode executing unit 26 to turn on the battery supply signal BSS from the detection of the preamble to the detection of the wordsync data, and controls wordsync detector 23 to determine whether or not the wordsync data is received, in step 317. At this time, if the wordsync data is not detected by wordsync detector 23 during the period of 576 bits, controller 21 disables the second enable signal EN2 and idle mode executing unit 26 turns off the battery supply signal BSS, in step 315. Then, idle mode executing unit 26 repeatedly performs step 315 and step 317 while executing the idle mode as described above.

However, if controller 21 receives the wordsync detection signal WSD from wordsync detector 23, in step 317, fifth enable signal EN5 is deactivated and fourth enable signal EN4 is activated. Then, idle mode executing unit 26 is disabled and interrupts generation of the battery supply signal BSS at the ending position of the wordsync period in the first batch of data, as shown by 34*b* of FIG. 34A. Batch mode executing unit 27 is enabled and generates the battery supply signal BSS based on the batch mode. Also, controller 21 activates the second enable signal EN2. The second enable signal EN2 is activated during the wordsync period of each of the batch periods of the POCSAG code.

If the fifth enable signal EN5 is activated, batch mode executing unit 27 turns the battery supply signal BSS on during the preset frame period and the wordsync period.

Accordingly, as described above, if the wordsync detection signal WSD of the first batch of data is generated following the generation of the preamble detection signal PAD, batch mode executing unit 27 turns on the battery supply signal BSS during the preset frame period. Thereafter, batch mode executing unit 27 turns the battery supply signal BSS on, in step 319, at the starting position of the preset frame period, and turns the battery supply signal BSS off, in step 323 or step 327, at the ending position of the preset frame period.

At this time, decoding unit 12 of the paging receiver consists largely of a portion for generating the battery supply signal BSS and a portion for decoding the received data. The present invention shows the portion for controlling the battery supply signal BSS of decoding unit 12 as described above. Accordingly, the portion of decoding unit 12 not illustrated decodes the received data and then compares the address code word of the received frame with the self address information in step 321, if the battery supply signal BSS turns on at the preset frame period as described above. At this instant, in cases where the address code word of the received frame is identical with the self address information, the message code word of the frame is transmitted and stored, in step 325. In cases where the address code word of the received frame is not identical with the self address information, the message code word of the received frame is disregarded. Accordingly, as described above, batch mode executing unit 27 turns the battery supply signal BSS on at the starting position of the preset frame period, as shown by 34*b* of FIG. 34A and turns the battery supply signal BSS off at the ending position of the predetermined frame period.

Controller 21 activates the second enable signal EN2 so as to analyze whether or not the wordsync data is received in the wordsync period of the second batch of data, and generates the third enable signal EN3 so as to analyze whether or not the wordsync pattern data is received. The second enable signal EN2 is activated in the wordsync period and the third enable signal EN3 is activated in the wordsync pattern period. The wordsync pattern data is composed of a predetermined number of bits of wordsync data at the starting position of the wordsync period.

Also, batch mode executing unit 27 turns the battery supply signal BSS on at the starting position of the wordsync period, in step 329, as shown by 34*b* of FIG. 34A, to detect the wordsync pattern data, in step 331. If the battery supply signal BSS turns on, operating power is supplied to receiving unit 11 so that the received paging data is converted into digital data and output. Then, preamble detector 22, wordsync detector 23, transmission-termination detector 24 and pattern detector 25 store the data output from receiving unit 11. At this time, pattern detector 25 is enabled during the wordsync pattern period as described above. Pattern detector 25 generates the wordsync pattern detection signal WPD and the wordsync selection signal WSS by receiving the wordsync pattern data in the wordsync pattern period. Then, the wordsync pattern detection signal WPD is recognized in step 331, and batch mode executing unit 27 turns the battery supply signal BSS off, in step 333. Delaying unit 28 consists of means for delaying the outputs received from batch mode executing unit 27 and means for receiving outputs from batch mode executing unit 27 and the delay means, selecting a signal based on the wordsync selection signal WSS, and outputting the selected input signal. Accordingly, the batch mode executing unit 27 turns the battery supply signal BSS off in generating the wordsync pattern detection signal WPD in the wordsync period, and then delaying unit 28 selects an output from the aforementioned delay means in accordance with the wordsync selection signal WSS. Accordingly, it is noted that the battery supply signal BSS output through delaying unit 28 turns on during the wordsync pattern period, as shown by 34b of FIG. 34A.

The wordsync pattern data contains a number of bits that is smaller than the total number of bits of wordsync data. Accordingly, in order to turn the battery supply signal BSS on during the preset frame period, the battery supply signal BSS should be delayed by a period corresponding to the total number of bits of wordsync data minus the number of bits of wordsync pattern data. Therefore, although it is recognized that the wordsync data has been received and the battery supply signal BSS is turned on in detecting the wordsync pattern data, the batch mode signal BMS should be delayed up to the ending position of the wordsync period in order to synchronize the words of the corresponding batch period. Accordingly, delaying unit 28 delays the output of batch mode executing unit 27 to synchronize the word up to the ending position of the wordsync period, in step 335 and step 337.

Just prior to the starting position of the next preset frame period, batch mode executing unit 27 turns the battery supply signal BSS on, as shown by 34b of FIG. 34A, in step 319. Thereafter, battery supply signal BSS turns off at an ending position of the preset frame period. For this second batch of data, the battery supply signal BSS turns on for the detection of the wordsync pattern data in the wordsync period, and thereafter turns off during the remainder of the wordsync period. Then, the battery supply signal BSS turns on again during the preset frame period.

Next, the operation where the wordsync data is received in a normal manner will be described. In the batch mode, batch mode executing mode 27 is initialized by the wordsync detection signal WSD, the wordsync pattern detection signal WPD or the batch period termination signal and generates the batch mode signal BMS for controlling the power source during the preset frame period and the wordsync period. In cases where the batch mode signal BMS is generated by the wordsync pattern detection signal WPD, the operation of delaying the batch mode signal BMS should be carried out in order to synchronize the words. As mentioned above, this is necessary because the wordsync pattern period is represented by a predetermined number of bits at the starting position of the wordsync period. Accordingly, if the wordsync pattern detection signal WPD is generated, the batch mode signal BMS is delayed up to the ending position of the wordsync period to synchronize the words, and then the battery supply signal BSS should be output during the preset frame period. The above operation will now be described with reference to the configuration of FIGS. 4, 23, 25 and 26, and the timing characteristics of the battery supply signal BSS shown in FIG. 34B.

Decoding unit 12 starts to concurrently analyze the wordsync pattern data and the wordsync data from a batch of data in the POCSAG code. At this time, if the wordsync pattern data is detected, the battery supply signal BSS turns off and the operation of detecting the wordsync data is interrupted. Also, if the wordsync pattern detection signal WPD is generated, the batch mode signal BMS is delayed up to the ending position of the wordsync period to synchronize the words, and then the battery supply signal BSS is generated for the preset frame period. That is, before the starting position of the wordsync period, the batch mode executing unit 27 generates the batch mode signal BMS for turning the battery supply signal BSS on, in step 329. Thus, decoder 145 of FIG. 23 toggles flip-flop 148 to generate the batch mode signal BMS at a binary high level, if it is the starting position of the wordsync period. At this time, decoder 152 of pattern detector 25 with the configuration shown in FIG. 25 can not generate the wordsync pattern detection signal WPD so that the wordsync selection signal WSS is at a binary low level, because the wordsync pattern data is not yet detected. Accordingly, the delaying unit 28 with the configuration shown in FIG. 27 selects the batch mode signal BMS from the batch mode executing unit 27 and outputs it as the battery supply signal BSS. Then, if decoder 152 of pattern detector 25 generates the wordsync pattern detection signal WPD at the ending position of the wordsync pattern period, in step 331, the wordsync pattern detection signal WPD at a binary low level is generated and flip-flop 153 and inverter 154 generate the wordsync selection signal WSS at a binary high level in accordance with the second clock signal CK2.

In this case, counter 142 of the batch mode executing unit 27 is initialized to shift the batch mode signal BMS from a binary high level to a binary low level, and again execute the counting operation. Multiplexer 162 of delaying unit 28 having the configuration shown in FIG. 26 selects the output of shift register 161 received at the first input terminal thereof in accordance with the wordsync selection signal WSS, and outputs second battery supply signal BSS2. Accordingly, in generating the wordsync pattern detection signal WPD in step 331, the battery supply signal BSS turns on during the wordsync pattern period of the wordsync period, and then turns off in the remaining portion of the wordsync period, in step 333. Therefore, if wordsync pattern data is detected, the battery supply signal BSS, as shown by 34d of FIG. 34B, is generated.

At this time, counter 142 of the batch mode executing unit 27 having the configuration shown in FIG. 23 generates the counted data during the remaining portion of the wordsync period. Accordingly, the counted data is delayed to synchronize the words up to the ending position of the wordsync period so that the battery supply signal BSS will turn on at the starting position of the preset frame period. To effectuate this, shift register 161 having the configuration shown in FIG. 26 delays the batch mode signal BMS output from the batch mode executing unit 27 in the remaining portion of the wordsync period to generate the delayed batch mode signal DBMS, and multiplexer 162 selects the delayed batch mode signal DBMS and outputs this signal as the second battery supply signal BSS2. Accordingly, in generating the wordsync pattern detection signal WPD, delaying unit 28 delays the batch mode signal BMS up to the ending position of the wordsync period, and then synchronizes the words of the frames of data, in steps 335 and 337. In achieving synchronization, it is noted that although counter 142 of the batch mode executing unit 27 starts to count in the wordsync period by the wordsync pattern detection signal WPD, the delayed batch mode signal DBMS output from shift register 161 is output at the ending position of the wordsync period.

The batch mode executing unit 27 generates the batch mode signal BMS for turning the battery supply signal BSS on for the preset frame period. Thus, decoder 143 of the batch mode executing unit 27 having the configuration shown in FIG. 23 detects the starting position of the preset frame period and decoder 144 detects the ending position of the preset frame period. Flip-flop 148 is toggled by decoders 143 and 144 to generate the batch mode signal BMS for turning the battery supply signal BSS on and off. Shift register 161 delays the batch mode signal BMS to generate the delayed batch mode signal DBMS, and multiplexer 162 selects the delayed batch mode signal DBMS and outputs the signal as the second battery supply signal BSS2. Accordingly, delaying unit 28 synchronizes the word, and then enables generation of the battery supply signal BSS in the preset frame period, as shown by 34d of FIG. 34B, in step 319.

Thereafter, at the wordsync period, the above procedure is repeatedly performed. Therefore, when the POCSAG code is received in a normal and accurate manner, as shown by 34c of FIG. 34B, the paging receiver of the present invention controls the operation of turning the battery supply signal BSS on/off for the wordsync period and the preset frame period, as shown by 34d of FIG. 34B. Accordingly, since the present invention reduces the amount of time during which power must be provided, battery power is advantageously conserved.

Next, an operation where an error bit is included in the wordsync data while receiving the POCSAG code will be described with reference to FIG. 34C. As described above, the wordsync data plays a role in synchronizing the words of the various frames of data within each batch of data. Therefore, it is often difficult to synchronize the words of the frame data in a corresponding batch of data when an error is generated in the wordsync data, perhaps due to the fading phenomenon. In this case, if an error is included in the wordsync data, pattern detector 25 can not properly detect the wordsync pattern data in the wordsync pattern period. The operation where wordsync data is received with errors while detecting the wordsync data will now be described with reference to FIGS. 18, 23, 25 and 26 and the timing characteristics of the battery supply signal BSS shown in 34f of FIG. 34C.

At the starting position of the wordsync period, batch mode executing unit 27 generates the batch mode signal BMS for turning the battery supply signal BSS on and delaying unit 28 selects the batch mode signal BMS in the wordsync period and outputs the signal as the second battery supply signal BSS2. Controller 21 generates the second enable signal EN2 and the third enable signal EN3 to drive the wordsync detector 23 and the pattern detector 25, respectively. Accordingly, wordsync detector 23 and pattern detector 25 receive and store data DT from receiving unit 11. During this time, the second enable signal EN2 is activated during the wordsync period and the third enable signal EN3 is activated during the wordsync pattern period.

When an error bit is included in the wordsync data received for a batch period, decoder 152 of pattern detector 25 having the configuration shown in FIG. 25 does not generate the wordsync pattern detection signal WPD. Due to this condition, the wordsync selection signal WSS is maintained at a binary low level. Therefore, multiplexer 162 of delaying unit 28 having the configuration shown in FIG. 27 selects the batch mode signal BMS received at the second input terminal 12 and outputs this signal as the second battery supply signal BSS2.

In this state, since the wordsync pattern detection signal WPD is not received, counter 142 of the batch mode executing unit 27 having the configuration shown in FIG. 23 continuously generates the count data, thereby continuously maintaining the batch mode signal BMS at the binary high level. The third enable signal EN3 is disabled so that the pattern detector 25 is not operated, and the second enable signal EN2 is enabled so that the wordsync detector 23 stores and analyzes the data DT received from receiving unit 11 during the wordsync period.

At this time, shift register 92 of the wordsync detector 23 having the configuration shown in FIG. 18 stores data DT of 32 bits received during the wordsync period in accordance with the first clock signal CK1, and latch 93 latches the output of shift register 92. Comparator 94, consisting of a plurality of exclusive-OR gates, compares the latched data and the wordsync data according to bit units and outputs compared data. Then, error detector 95 adds the number of bits in the compared data where an error is generated, and generates the total number of error bits. Error detector 96 generates the wordsync detection signal WSD when the number of error bits is below four. The wordsync detection signal WSD output from the error detector 96 is generated at the ending position of the wordsync period. Accordingly, when the number of error bits in the wordsync data received during the wordsync period is less than four, wordsync detector 23 determines that the received wordsync data is normal wordsync data and generates the wordsync detection signal WSD.

If the wordsync detection signal WSD is generated, controller 21 detects generation of the wordsync detection signal WSD, in step 343, and adjusts second enable signal EN2 to an OFF state. Batch mode executing unit 27 is reset in response to the wordsync detection signal WSD to shift the batch mode signal BMS to a binary low level, and restart the counting operation. The delaying unit 28 also selects the batch mode signal BMS as the second battery supply signal BSS2. Thus, if the wordsync signal WSD is detected, the battery supply signal BSS is interrupted at the terminating position of the wordsync period, in step 345. Subsequently, after synchronization of the word of the frame of data, in step 337, the operation again proceeds to step 319. For example, since the wordsync detection signal WSD is generated at the terminating position of the wordsync period, synchronization of the word of the frame data is performed without delaying the batch mode signal BMS. If generation of the wordsync detection signal WSD is not detected by controller 21, in step 343, the battery supply signal BSS is interrupted, in step 347.

After generation of the battery supply signal BSS in accordance with the wordsync detection signal WSD of the previous batch period, the operation of generating the battery supply signal BSS for a next batch period will be described with reference to FIG. 34D.

Before the starting position of the second wordsync period shown in 34h of FIG. 34D, batch mode executing unit 27 generates the batch mode signal BMS to adjust the battery supply signal BSS to the ON state, and delaying unit 28 selects the batch mode signal BMS at the wordsync period as the second battery supply signal BSS2. Controller 21 generates the second and third enable signals EN2 and EN3 to operate the wordsync detector 23 and the pattern detector 25, respectively. Thus, wordsync detector 23 and pattern detector 25 store the data DT received from receiving unit 11.

After generation of the battery supply signal BSS for detection of the wordsync pattern signal having an error bit in the first batch of data shown in 34h of FIG. 34D, decoder 152 of pattern detector 25 having the construction shown in FIG. 25 generates the wordsync pattern detection signal WPD in the wordsync pattern period of the second batch of data. As a result, the wordsync selection signal WSS is also generated at a binary high level at the terminating position of the wordsync period. Multiplexer 162 of the delaying unit 28 having the construction shown in FIG. 26 selects the delayed batch mode signal DBMS received through the first input terminal I1 at the terminating position of the wordsync period to generate the selected signal as the battery supply signal BSS.

In this state, counter 142 and flip-flop 148 of the batch mode executing unit 27 having the construction shown in FIG. 23 are reset in response to the wordsync pattern detection signal WPD. Then, counter 142 restarts the counting operation, and flip-flop 148 enables the batch mode signal BMS to be adjusted to a binary low level. Multiplexer 162 of delaying unit 28 having the construction shown in FIG. 26 selects the delayed batch mode signal DBMS from shift register 161 in response to the wordsync selection signal WSS to generate the second battery supply signal BSS2. Thus, the battery supply signal BSS is in an ON state in the wordsync pattern period of the wordsync period when the wordsync pattern detection signal WPD is generated, and in an OFF state during the remaining portion of the wordsync period. As a result, if the wordsync pattern data is detected, the battery supply signal BSS is generated, as shown by 34h of FIG. 34D. Also, synchronization of the word of the frame data is performed at the terminating position of the wordsync period.

As shown in FIGS. 34C and 34D, when the POCSAG code is received and the paging information is processed, operational power is provided during the wordsync period of the corresponding batch period when the normal wordsync signal is not properly received, and during the wordsync pattern period when the normal wordsync signal is properly received. However, if the error bits included in the wordsync signal are more than a predetermined number, the battery supply signal BSS is generated normally even though the wordsync pattern detection signal WPD and the wordsync detection signal WSD are not generated.

Hereinafter, the operation when wordsync pattern detection signal WPD and the wordsync detection signal WSD are not generated will be described with reference to FIG. 34E.

Batch mode executing unit 27 having the construction shown in FIG. 23 generates the batch mode signal BMS necessary for controlling the supply of power in the wordsync period and the preset frame period in response to the wordsync detection signal WSD and the wordsync pattern detection signal WPD. Then, decoder 145 of the batch mode executing unit 27 detects the starting position of the wordsync period, in step 329, to enable the batch mode signal BMS to be adjusted to a binary high level. If the wordsync pattern detection signal WPD is not generated from pattern detector 25, in step 331, and the wordsync detection signal WSD is not generated from wordsync detector 23, in step 343, counter 142 is not reset. Then, decoder 146 detects the terminating position of the batch period based on the counted data. For example, since one batch is comprised of 544 bits, decoder 146 generates a binary low level signal when the counted data represents a value of 544. Thus, counter 142 and flip-flop 148 are reset. Therefore, if the wordsync detection signal WSD is not generated, in step 343, decoder 146 of batch mode executing unit 27 outputs the terminating signal of the batch period. When the terminating signal of the batch period is detected, the batch mode signal BMS is adjusted to a binary low level so that the battery supply signal BSS for the wordsync period is in an OFF state, in step 347. Then, delaying unit 28 selects the batch mode signal BMS, which represents the battery supply signal BSS, shown by 34j of FIG. 34E.

Therefore, while processing the paging information after receiving the POCSAG code, the battery supply signal BSS is in an OFF state at the terminating position of the corresponding batch period if the wordsync signal is not detected at the corresponding batch. Also, when the preset frame period arrives at the batch period, the battery supply signal BSS is generated, as shown by 34j of FIG. 34E, to effectuate the paging function.

Hereinafter, the operation of detecting the transmission-termination signal ETX will be described with reference to FIGS. 34F and 34G.

In the batch mode, controller 21 outputs the second enable signal EN2 to wordsync detector 23 and transmission-termination detector 24 during the wordsync period. If the starting position of the wordsync period occurs, batch mode executing unit 27 enables the battery supply signal BSS to be in the ON state. Then, if the wordsync pattern detection signal WPD is not generated during the wordsync pattern period, batch mode executing unit 27 enables the battery supply signal BSS to be in the ON state. Thus, preamble detector 23 and transmission-termination detector 24 store the data DT received from receiving unit 11 in the wordsync period.

Upon termination of the POCSAG code, the transmission-termination signal ETX is generated, as shown by 34k in FIG. 34F or by 34m in FIG. 34G in succession to the final frame of data in the final batch. Then, transmission-termination detector 24 having the construction shown in FIG. 31 detects whether or not the transmission-termination signal ETX exists in the wordsync period. For example, if a continuous 16-bit signal of binary 0's, as shown by 34k of FIG. 34F, is received, decoder 176 enables generation of the transmission-termination signal ETX. Also, if a continuous 16-bit signal of binary 1's, as shown by 34m of FIG. 34G, is received, decoder 175 enables generation of the transmission-termination signal ETX. Controller 21 detects generation of the transmission-termination signal ETX, in step 341, and the fourth enable signal EN4 is inactivated and the fifth enable signal EN5 is activated. Therefore, batch mode executing unit 27 is disabled, and idle mode executing unit 26 is enabled to start the idle mode. The battery supply signal BSS is in the ON state, as shown by 34l of FIG. 34F or 34n of FIG. 34G, until the transmission-termination signal ETX is detected during the wordsync period, and then the idle mode begins.

As a result, if the transmission-termination signal ETX is generated during the batch mode, the batch mode is changed to the idle mode, and thereafter the battery supply signal BSS is generated based on outputs from idle mode executing unit 26.

Hereinafter, the operation of detecting the preamble signal in the wordsync period of the batch mode will be described in detail with reference to FIG. 34H.

Controller 21 outputs the first enable signal EN1 necessary for controlling the operation of preamble detector 22. The first enable signal EN1 is always activated in the idle mode and is enabled in the wordsync period of the batch mode. Thus, since preamble detector 22 is always maintained in an enabled state during the idle mode, and receiving unit 11 is supplied with operating power during a 64-bit period of a 576-bit period, preamble detector 22 analyzes the data received in the 64-bit period to detect the presence of the preamble signal (step 313). Also, since preamble detector 22 is enabled during the wordsync period of the batch mode, it detects whether or not the data received from receiving unit 11 is comprised of more than 16 bits of preamble data, in step 339, when the wordsync pattern signal is not detected.

Then, if the preamble signal shown in 34o of FIG. 34H is received, preamble detector 22 having the construction shown in FIG. 16 generates the preamble detection signal PAD for detection by controller 21. When the preamble detection signal PAD is generated, the operation loops to step 317 to detect the wordsync signal in the same manner as that shown in FIG. 34A.

Figure 33:
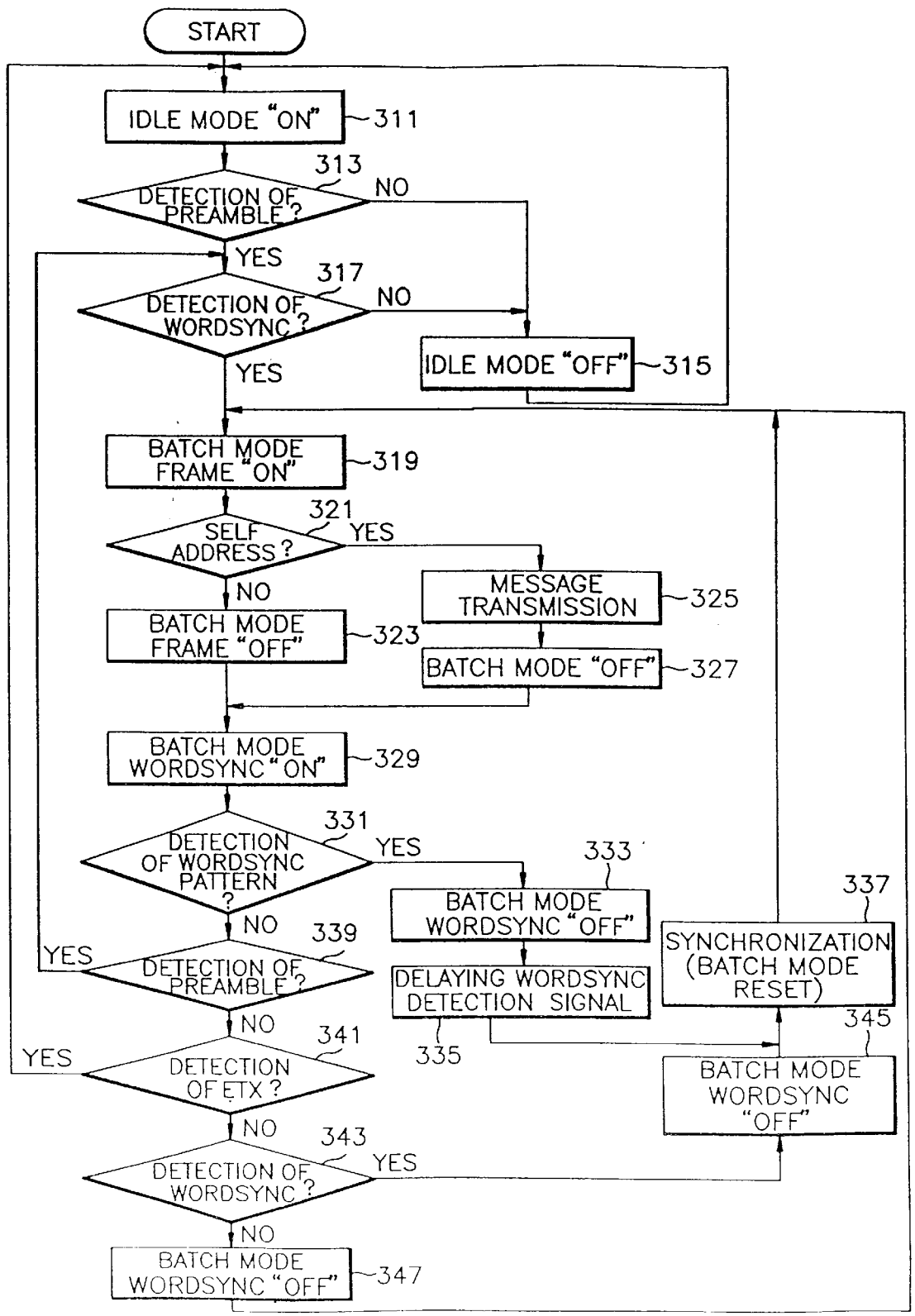
FIG. 33 is a flow chart showing the decoding unit which controls the operating battery supply in the idle mode and batch mode in the paging receiver constructed according to the principles of the present invention.

Therefore, decoding unit 12 of the present invention controls the supply of operating power in the paging receiver according to the procedure of FIG. 33. If the preamble signal indicating receipt of the POCSAG code is detected, the 1st wordsync signal is detected based on the supply of power in the wordsync period, and the power is supplied during the preset frame after synchronization is achieved. For a 2nd batch of data, power is supplied in the wordsync pattern period when the wordsync period starts, synchronization is achieved by delaying to the terminating position of the wordsync period (assuming the wordsync pattern data is detected), and power is supplied during the preset frame.

When the wordsync signal is normally and accurately received, power is supplied in the wordsync pattern period from the starting position of the wordsync period of each batch and is not supplied at the terminating position of the wordsync pattern period. Next, synchronization is achieved by creating a delay until the terminating position of the wordsync period. After supplying power in the preset frame period, an operation is performed to wait until the starting position of the next wordsync period.

On the other hand, if the wordsync signal has error data, after supplying power at the starting position of the wordsync period, it is detected whether the wordsync pattern signal is received in the wordsync pattern period. If the wordsync pattern signal is not detected, the supply of power is continuously provided and an operation is performed to detect whether the wordsync signal is received in the wordsync period. The method of detecting the wordsync signal is executed by performing a bit by bit comparison of the wordsync signal with the data received in the wordsync period, adding the number of error bits based on analysis of the comparison data, and if the resulting value based on the addition is less than a predetermined number, an operation is performed to detect whether or not the wordsync signal is detected. After synchronization, an operation is performed by waiting until the preset frame period. Then, after supplying power during the preset frame period, an operation is performed by waiting until the starting position of the wordsync period of the next batch of data.

When the normal wordsync signal is properly received after power is supplied during the entire wordsync period of the previous batch, an operation is performed to detect whether the wordsync pattern signal is detected in the wordsync pattern period at the starting position of the next wordsync period. Then, if the wordsync pattern signal is detected in the wordsync pattern period, power is interrupted at the terminating position of the wordsync pattern period. Word synchronization is performed before waiting until the starting position of the preset frame period. Power is supplied during the preset frame period, and then is interrupted until the starting position of the next wordsync period.

In the batch mode, if the wordsync pattern signal, wordsync signal, transmission-termination signal and preamble signal are not received, power is supplied at the starting position of the wordsync period and is not supplied when a signal is received indicating termination of the batch period. Word synchronization is performed before waiting to the starting position of the preset frame period. Also, power is again supplied during the preset frame period before waiting until the starting position of the wordsync period of the next batch. This operation is performed to continuously to execute the batch mode, since it is determined that a number of error bits are included in the wordsync signal.

Furthermore, if the transmission-termination signal ETX is detected in the wordsync period of the batch mode, power is supplied at the starting position of the wordsync period, and is not supplied upon detection of the transmission-termination signal ETX. As a result, the batch mode changes to the idle mode. For example, if the transmission-termination signal ETX is received in the wordsync period of the batch mode, an operation is performed to execute the idle mode for searching for the preamble signal, since it is determined that receipt of the POCSAG code is complete.

Finally, if the preamble signal is detected in the wordsync period of the batch mode, the idle mode is changed to the batch mode in the same manner as the method described above.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all of the features of patentable novelty that reside in the present invention, including all features that would be treated as equivalents by those skilled in the art in which the present invention pertains.

What is claimed is:

1. A power saving circuit in a paging receiver, comprising:
   power supply means for generating operating power for said paging receiver;
   means for receiving paging information and converting said paging information into a digital signal;
   switching means for providing said operating power to said receiving means in response to a power supply signal;
   wordsync pattern detecting means connected to said receiving means, for receiving said digital signal during batch periods, analyzing said digital signal received during an initial interval of a wordsync period of each of said batch periods, and generating a wordsync pattern detection signal when wordsync pattern data is detected from said digital signal received during said initial interval of said wordsync period, said wordsync pattern data being comprised of a predetermined sequence of data bits and said initial interval consisting of less than an entirety of said wordsync period; and
   power controlling means for counting clock pulses generated during said batch periods to enable generation of said power supply signal during said initial interval of said wordsync period and to disable generation of said power supply signal when said wordsync pattern detection signal is generated, and for synchronizing reception of frame data during each of said batch periods by enabling generation of said power supply signal during a frame data period of each said batch period.

2. The power saving circuit as defined in claim 1, wherein said wordsync pattern detecting means comprises:
   means for storing said digital signal received during said initial interval of said wordsync period to generate first count data and detecting a starting point and an ending point of said initial interval of said wordsync period based on said first count data; and
   means for decoding said first count data and generating said wordsync pattern detection signal when said first count data indicates detection of said wordsync pattern data.

3. The power saving circuit as defined in claim 2, wherein said power controlling means comprises:
   means for counting said clock pulses generated during said batch periods to generate second count data, said counting means being reset in response to generation of said wordsync pattern detection signal;

means for detecting starting and ending points of said frame data period and a starting point of said wordsync period by decoding said second count data;

means for selectively generating said power supply signal in response to an output signal from said detecting means; and means for receiving said power supply signal, and delaying said power supply signal by a period equal to said wordsync period minus said initial interval of said wordsync period to synchronize reception of said frame data.

4. The power saving circuit as defined in claim 1, wherein said predetermined sequence of data bits comprises five bits of data.

5. A power saving circuit in a paging receiver, comprising:

power supply means for generating operating power for said paging receiver;

means for receiving paging information and converting said paging information into a digital signal;

switching means for providing said operating power to said receiving means in response to a power supply signal;

wordsync detecting means connected to said receiving means, for receiving said digital signal during batch periods, analyzing said digital signal received during a wordsync period of each of said batch periods and generating a wordsync detection signal when said digital signal received during said wordsync period represents wordsync data;

wordsync pattern detecting means connected to said receiving means, for receiving said digital signal during said batch periods, analyzing said digital signal received during an initial interval of said wordsync period and generating a wordsync pattern detection signal when said digital signal received during said initial interval of said wordsync period represents wordsync pattern data, said wordsync pattern data being comprised of a predetermined sequence of initial bits of said wordsync data and said initial interval consisting of less than an entirety of said wordsync period; and power controlling means for counting clock pulses generated during said batch periods to enable generation of said power supply signal at a starting point of said wordsync period, to disable generation of said power supply signal when said wordsync pattern detection signal is generated, to enable generation of said power supply signal when said wordsync pattern detection signal is not generated, and to disable generation of said power supply signal when said wordsync detection signal is generated, and for synchronizing reception of data during each said batch period by enabling generation of said power supply signal during a data frame period of each of said batch periods.

6. The power saving circuit as defined in claim 5, wherein said wordsync pattern detecting means comprises:

means for storing said digital signal received during said initial interval of said wordsync period to generate first count data and detecting a starting point and an ending point of said initial interval of said wordsync period based on said first count data;

means for decoding said first count data and generating said wordsync pattern detection signal when said first count data indicates detection of said wordsync pattern data; and means for latching said wordsync pattern detection signal to generate a wordsync selection signal in response to a latch clock signal generated at said ending point of said initial interval of said wordsync period.

7. The power saving circuit as defined in claim 6, wherein said power controlling means comprises:

means for counting said clock pulses generated during said batch periods to generate second count data, said counting means being reset in response to generation of said wordsync pattern detection signal;

means for detecting starting and ending points of said frame data period and a starting point of said wordsync period by decoding said second count data;

means for selectively generating said power supply signal in response to an output signal from said detecting means;

means for generating a delayed power supply signal by delaying said power supply signal by a period equal to said wordsync period minus said initial interval of said wordsync period; and means for receiving said power supply signal and said delayed power supply signal, providing said delayed power supply signal as said power supply signal when said wordsync pattern detection signal has been generated and providing said power supply signal when said wordsync detection signal has been generated.

8. The power saving circuit as defined in claim 7, wherein said wordsync detecting means comprises:

means for storing said digital signal received during said wordsync period;

means for comparing said digital signal stored in said storing means with reference data to generate error data indicative of a number of error bits contained in said digital signal; and means for generating said wordsync detection signal when said number of error bits contained in said digital signal is less than a predetermined number.

9. The power saving circuit as defined in claim 5, wherein said wordsync pattern data comprises five bits of data and said wordsync data comprises thirty-two bits of data.

10. The power saving circuit as defined in claim 8, wherein said wordsync pattern data comprises five bits of data and said wordsync data comprises thirty-two bits of data.

11. A power saving circuit in a paging receiver using a Post Office Code Standardization Advisory Group (POCSAG) code wherein battery power is selectively supplied to said paging receiver during a wordsync period of each batch period in response to a power supply signal, each said batch period being comprised of 17 data words, each said data word being comprised of 32 bits, said circuit comprising:

controlling means for counting pulses of a data clock signal received during each said batch period to generate count data, generating a wordsync pattern period signal during a 5-bit period beginning at a starting point of said wordsync period based on said count data, and generating a wordsync period signal during a 32-bit period extending from said starting point of said wordsync period to an ending point of said wordsync period, said controlling means restarting said counting upon completion of each said batch period;

wordsync pattern detecting means for storing data received during said 5-bit period in response to said wordsync pattern period signal, and generating a wordsync pattern detection signal when said data received during said 5-bit period represents wordsync pattern data, said wordsync pattern data being comprised of a predetermined sequence of data bits;

batch mode executing means for counting said pulses of said data clock signal to enable generation of said power supply signal at said starting point of said wordsync period and disabling generation of said power supply signal in response to said wordsync pattern detection signal, said batch mode executing means restarting said counting in response to said wordsync pattern detection signal; and synchronizing means for delaying said power supply signal when said wordsync pattern detection signal is generated, and synchronizing reception of a first said data word during a preset frame period by generating said power supply signal during said preset frame period.

12. The power saving circuit as defined in claim 11, wherein said wordsync pattern detecting means comprises:

means for storing said data received during said 5-bit period in response to said wordsync pattern period signal; and means for decoding said data stored in said storing means and generating said wordsync pattern detection signal when said data stored in said storing means represents said wordsync pattern data.

13. A method for saving battery power in a paging receiver having means for detecting a wordsync pattern signal comprised of a predetermined number of initial bits contained in a wordsync signal received during a wordsync period, said method comprising the steps of:

providing battery power to said paging receiver at a starting point of said wordsync period while receiving said wordsync signal;

interrupting said battery power upon detection of said wordsync pattern signal during an initial interval of said wordsync period, with said initial interval consisting of less than an entirety of said wordsync period;

synchronizing reception of a frame signal by creating a delay period that extends from an ending point of said initial interval to an ending point of said wordsync period, said battery power being interrupted during said delay period;

maintaining interruption of said battery power from said ending point of said wordsync period to a starting point of a preset frame period;

providing said battery power to said paging receiver from said starting point of said preset frame period to an ending point of said preset frame period to enable said reception of said frame signal; and interrupting said battery power from said ending point of said preset frame period to a starting point of a next wordsync period.

14. The method for saving battery power as defined in claim 13, wherein said initial interval of said wordsync period represents a 5-bit period.

15. The method for saving battery power as defined in claim 14, wherein said wordsync period represents a 32-bit period.

16. A method for saving battery power in a paging receiver having means for detecting a wordsync pattern signal comprised of a predetermined number of initial bits contained in a wordsync signal, said method comprising the steps of:

providing said battery power to said paging receiver while a preamble signal is detected;

detecting whether a wordsync detection signal corresponding to a first batch of data is generated while providing said battery power to said paging receiver, said wordsync detection signal indicating detection of an ending point of a wordsync period corresponding to said first batch of data;

interrupting said battery power in response to generation of said wordsync detection signal;

maintaining interruption of said battery power from said ending point of said wordsync period corresponding to said first batch of data to a starting point of a preset frame period corresponding to said first batch of data;

providing said battery power to said paging receiver from said starting point of said preset frame period corresponding to said first batch of data to an ending point of said preset frame period corresponding to said first batch of data to enable reception of frame data corresponding to said first batch of data;

interrupting said battery power from said ending point of said preset frame period corresponding to said first batch of data to a starting point of a wordsync period corresponding to a second batch of data;

providing said battery power to said paging receiver at a starting point of said wordsync period corresponding to said second batch of data;

interrupting said battery power when said wordsync pattern signal is detected during an initial interval of said wordsync period corresponding to said second batch of data;

synchronizing reception of frame data corresponding to said second batch of data by creating a delay period that extends from an ending point of said initial interval to an ending point of said wordsync period corresponding to said second batch of data, said battery power being interrupted during said delay period;

maintaining interruption of said battery power from said ending point of said wordsync period corresponding to said second batch of data to a starting point of a preset frame period corresponding to said second batch of data;

providing said battery power to said paging receiver from said starting point of said preset frame period corresponding to said second batch of data to an ending point of said preset frame period corresponding to said second batch of data to enable said reception of said frame data corresponding to said second batch of data; and interrupting said battery power from said ending point of said preset frame period corresponding to said second batch of data to a starting point of a wordsync period corresponding to a third batch of data.

17. The method for saving battery power as defined in claim 16, wherein said initial interval of said wordsync period corresponding to said second batch of data represents a 5-bit period.

18. The method for saving battery power as defined in claim 17, wherein said wordsync period corresponding to said first, second and third batches of data represents a 32-bit period.

19. A power saving circuit in a paging receiver, comprising:

power supply means for generating operating power for said paging receiver;

means for receiving paging information and converting said paging information into a digital signal;

switching means for providing said operating power to said receiving means in response to a power supply signal;

wordsync pattern detecting means connected to said receiving means, for receiving said digital signal during batch periods, analyzing said digital signal received during a first 5-bit interval of a 32-bit wordsync period of each of said batch periods, and generating a wordsync pattern detection signal when wordsync pattern data is detected from said digital signal received during said first 5-bit interval of said 32-bit wordsync period, said wordsync pattern data being comprised of a predetermined sequence of data bits; and power controlling means for counting clock pulses generated during said batch periods to enable generation of said power supply signal during said first 5-bit interval of said 32-bit wordsync period and to disable generation of said power supply signal when said wordsync pattern detection signal is generated, and for synchronizing reception of frame data during each of said batch periods by enabling generation of said power supply signal during a frame data period of each of said batch periods.

20. The power saving circuit as defined in claim 19, wherein said wordsync pattern detecting means comprises:

means for storing said digital signal received during said first 5-bit interval of said 32-bit wordsync period to generate first count data and detecting a starting point and an ending point of said first 5-bit interval of said 32-bit wordsync period based on said first count data; and means for decoding said first count data and generating said wordsync pattern detection signal when said first count data indicates detection of said wordsync pattern data.

21. The power saving circuit as defined in claim 20, wherein said power controlling means comprises:

means for counting said clock pulses generated during said batch periods to generate second count data, said counting means being reset in response to generation of said wordsync pattern detection signal;

means for detecting starting and ending points of said frame data period and a starting point of said 32-bit wordsync period by decoding said second count data;

means for selectively generating said power supply signal in response to an output signal from said detecting means; and means for receiving said power supply signal, and delaying said power supply signal by a 27-bit period to synchronize reception of said frame data.

22. The power saving circuit as defined in claim 19, wherein said power controlling means comprises:

means for counting said clock pulses generated during said batch periods to generate second count data, said counting means being reset in response to generation of said wordsync pattern detection signal;

means for detecting starting and ending points of said frame data period and a starting point of said 32-bit wordsync period by decoding said second count data;

means for selectively generating said power supply signal in response to an output signal from said detecting means; and means for receiving said power supply signal, and delaying said power supply signal by a 27-bit period to synchronize reception of said frame data.

23. A method for saving battery power in a paging receiver, comprising the steps of: providing said battery power to said paging receiver at a starting point of a wordsync period while beginning reception of a 32-bit wordsync signal;

interrupting said battery power after detecting a wordsync pattern signal during an initial interval of said wordsync period, said wordsync pattern data being comprised of a predetermined sequence of a first 5 bits of said 32-bit wordsync signal and said initial interval consisting of less than an entirety of said wordsync period;

creating a delay period that extends from an ending point of said initial interval to an ending point of said wordsync period, said battery power being interrupted during said delay period;

maintaining interruption of said battery power from said ending point of said wordsync period to a starting point of a preset frame period;

providing said battery power to said paging receiver from said starting point of said preset frame period to an ending point of said preset frame period to enable reception of a 32-bit frame signal; and interrupting said battery power from said ending point of said preset frame period to a starting point of a next wordsync period.

24. A power saving circuit in a paging receiver, comprising:

power supply means for generating operating power for said paging receiver;

means for receiving paging information and converting said paging information into a digital signal;

switching means for providing said operating power to said receiving means in response to a power supply signal; and a decoding unit in communication with said receiving means and adapted to receive said digital signal during batch periods, analyze said digital signal received during an initial interval of a wordsync period of each of said batch periods, generate a wordsync pattern detection signal when wordsync pattern data comprising a predetermined sequence of data bits is detected from said digital signal received during said wordsync pattern period, generate said power supply signal during said wordsync pattern period of said wordsync period and disable generation of said power supply signal when said wordsync pattern detection signal is generated, and synchronize reception of frame data during each of said batch periods by enabling generation of said power supply signal during a frame data period of each of said batch periods, with said initial interval consisting of less than an entirety of said wordsync period.

25. The power saving circuit of claim 24, wherein said decoding unit includes:

a pattern detector in communication with said receiving means and adapted to respond to a pattern detector enabling signal by determining whether said digital signal received during said wordsync pattern period includes said wordsync pattern data and to generate a wordsync pattern detection signal when said wordsync pattern period includes said wordsync pattern data; and a controller in communication with said pattern detector and adapted to generate said pattern detector enabling signal during a batch mode of said power saving circuit.

26. The power saving circuit of claim 25, wherein said controller is further adapted to receive a wordsync detection signal during an idle mode of said power saving circuit and to generate a batch mode enabling signal in response thereto, and wherein said decoding unit further includes a batch mode executing unit in communication with said controller and adapted to respond to said batch mode enabling signal by generating a batch mode signal during said frame data period of each of said batch periods, with said batch mode signal synchronizing said reception of frame data during each of said batch periods by enabling said generation of said power supply signal during said frame data period.

* * * * *